United States Patent
Zheng et al.

(10) Patent No.: US 11,411,853 B2
(45) Date of Patent: Aug. 9, 2022

(54) LINK-STATE ADVERTISEMENT LSA SENDING METHOD, APPARATUS, AND SYSTEM

(71) Applicant: Huawei Technologies Co., Ltd., Shenzhen (CN)

(72) Inventors: Xiuli Zheng, Beijing (CN); Xiaohu Xu, Shenzhen (CN); Nongda Hu, Beijing (CN); Chuang Wang, Beijing (CN); Zhe Chen, Beijing (CN); Bingyang Liu, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 16/818,606

(22) Filed: Mar. 13, 2020

(65) Prior Publication Data
US 2020/0220803 A1   Jul. 9, 2020

Related U.S. Application Data

(63) Continuation of application No. PCT/CN2018/105326, filed on Sep. 12, 2018.

(30) Foreign Application Priority Data

Sep. 14, 2017  (CN) .......................... 201710829090.9

(51) Int. Cl.
*H04L 12/751* (2013.01)
*H04L 12/721* (2013.01)
(Continued)

(52) U.S. Cl.
CPC .......... *H04L 45/026* (2013.01); *H04L 45/123* (2013.01); *H04L 45/60* (2013.01)

(58) Field of Classification Search
CPC ...... H04L 45/026; H04L 45/123; H04L 45/60
(Continued)

(56) References Cited

U.S. PATENT DOCUMENTS

| | | | |
|---|---|---|---|
| 6,606,325 B1 * | 8/2003 | Cain | ...................... H04L 45/02 370/408 |
| 7,334,047 B1 | 2/2008 | Pillay-Esnault | |

(Continued)

FOREIGN PATENT DOCUMENTS

| | | |
|---|---|---|
| CN | 101150523 A | 3/2008 |
| CN | 102158397 A | 8/2011 |

(Continued)

OTHER PUBLICATIONS

Lapukhov, P., et al., "Use of BGP for Routing in Large-Scale Data Centers", Internet Engineering Task Force (IETF), RFC 7938, ISSN: 2070-1721, Aug. 2016, 35 pages.
(Continued)

*Primary Examiner* — Faisal Choudhury
(74) *Attorney, Agent, or Firm* — Slater Matsil, LLP

(57) ABSTRACT

This application discloses a link-state advertisement LSA sending method, an apparatus, and a system, to reduce a quantity of LSA sending times. The method includes: generating, by a first router, a first path table based on level location information of the first router, level location information of a second router, and level location information of at least one third router; sending, by the first router, a first link state update LSU message to the second router; receiving, by the second router, the first link state update LSU message from the first router; updating, by the second router, a link state database LSDB of the second router based on a first LSA; and sending, by the second router, the first LSA to a router corresponding to an identifier in the first path table.

13 Claims, 51 Drawing Sheets

(51) Int. Cl.
*H04L 45/02* (2022.01)
*H04L 45/12* (2022.01)
*H04L 45/60* (2022.01)

(58) Field of Classification Search
USPC ........................................................ 370/254
See application file for complete search history.

(56) References Cited

U.S. PATENT DOCUMENTS

| | | | |
|---|---|---|---|
| 2003/0026246 A1* | 2/2003 | Huang | H04L 45/00 370/352 |
| 2005/0111494 A1* | 5/2005 | Kecskemeti | H04L 61/6004 370/395.52 |
| 2005/0152286 A1* | 7/2005 | Betts | H04L 45/021 370/255 |
| 2006/0262735 A1* | 11/2006 | Guichard | H04L 12/66 370/254 |
| 2009/0067834 A1* | 3/2009 | Lu | H04L 45/16 398/45 |
| 2009/0086622 A1 | 4/2009 | Ng | |
| 2011/0058567 A1 | 3/2011 | Wijnands et al. | |
| 2013/0208624 A1 | 8/2013 | Ashwood-Smith | |
| 2014/0043956 A1 | 2/2014 | Mirtorabi et al. | |
| 2015/0032904 A1* | 1/2015 | Zhang | H04L 45/54 709/238 |
| 2016/0112265 A1 | 4/2016 | Chen et al. | |
| 2019/0273633 A1* | 9/2019 | Lin | H04L 45/02 |

FOREIGN PATENT DOCUMENTS

| | | |
|---|---|---|
| CN | 104038420 A | 9/2014 |
| CN | 104521192 A | 4/2015 |
| CN | 104935513 A | 9/2015 |
| CN | 107147576 A | 9/2017 |

OTHER PUBLICATIONS

Patel, K., et al., "Shortest Path Routing Extensions for BGP Protocol, draft-keyupate-idr-bgp-spf-01", Network Working Group, Oct. 31, 2016, 14 pages.

White, R., et al., "OpenFabric, draft-white-openfabric-00", Network Working Group, Mar. 3, 2017, 13 pages.

Przygienda, T., et al., "RIFT: Routing in Fat Trees, draft-przygienda-rift-00", Networking Working Group, Jan. 11, 2017, 39 pages.

* cited by examiner

| LS time to live | | | Option | 1 |
|---|---|---|---|---|
| Link state ID ||||| 
| Identifier of an advertisement router ||||| 
| Quantity of LS sequences ||||| 
| LS verification code ||| Length ||
| 0 | V | E | B | 0 | Link |
| Link ID ||||| 
| Link data ||||| 
| ... |||||

FIG. 4

| LS time to live | Option | 1 |
|---|---|---|
| Link state ID ||| 
| Identifier of an advertisement router |||
| Level location information of an advertisement router |||
| Quantity of LS sequences |||
| LS verification code || Length |
| 0 | V | E | B | 0 | Link |
| Link ID |||
| Level location information of a link ID |||
| Link data |||
| ... |||

FIG. 11

CONT.
FROM
FIG. 21A

S507 — Because routers 112, 212, and 312 at the level_1 are non-leaf nodes, the router 222 generates a path table for each of the neighbor routers 112 and 212, and the router 224 generates a path table for the neighbor router 312

S508 — The router 222 sends an LSU message to each of the southbound routers 112 and 212 at the level_1, where the LSU message includes the LSA and the path table generated for each of the neighbor routers 112 and 212, and the router 224 sends an LSU message to the southbound router 312 at the level_1, where the LSU message includes the LSA and the path table generated for the neighbor router 312

S509 — After receiving the LSU message, the routers 112, 212, and 312 at the level_1 update local LSDBs based on the LSA, and determine, based on information that the LSU message includes the path table, to forward the LSA

S510 — Because a router at the level_0 is a leaf node, the routers 112, 212, and 312 at the level_1 send an LSU message to southbound routers at the level_0 that are corresponding to identifiers in the path table

S511 — After receiving the LSU message, the routers at the level_0 determine, based on information that the LSU message includes no path table, not to forward the LSA, and only update local LSDBs based on the LSA End

FIG. 21B

CONT.
FROM
FIG. 23A

S609 — After receiving the LSU message, the routers 221 and 222 at the level_2 update local LSDBs based on the LSA, and determine, based on information that the LSU message includes the path table, to forward the LSA S610 — Because routers 112, 211, and 311 at the level_1 are non-leaf nodes, the router 221 generates a path table for neighbor routers 111, 211, and 311, and the router 222 generates a path table for neighbor routers 112, 212, and 312

S611 — The router 221 at the level_2 sends an LSU message to each of the southbound routers 111, 211, and 311 at the level_1, where the LSU message includes the LSA and the path table generated for each of the neighbor routers 111, 211, and 311, and the router 222 at the level_2 sends an LSU message to each of the southbound routers 112, 212, and 312 at the level_1, where the LSU message includes the LSA and a path table generated for the neighbor router 112

S612 — After receiving the LSU message, the routers 111, 211, 311, 112, 212, and 312 at the level_1 update local LSDBs based on the LSA, and determine, based on information that the LSU message includes the path table, to forward the LSA S613 — Because a router at the level_0 is a leaf node, the routers 111, 211, 311, 112, 212, and 312 at the level_1 send an LSU message to southbound routers at the level_0 that are corresponding to identifiers in the path table, where the LSU message includes only the LSA, and includes no path table S614 — After receiving the LSU message, the routers at the level_0 determine, based on information that the LSU message includes no path table, not to forward the LSA, and only update local LSDBs based on the LSA End

FIG. 23B

CONT.
FROM
FIG. 25A

S709 — After receiving the LSU message, the routers 221 to 224 at the level_2 update local LSDBs based on the LSA, and determine, based on information that the LSU message includes the path table, to forward the LSA S710 — Because routers 111, 112, 211, 311, and 312 at the level_1 are non-leaf nodes, the router 221 generates a path table for the neighbor routers 111 and 211, the router 222 generates a path table for the neighbor routers 112 and 212, the router 223 generates a path table for the neighbor router 311, and the router 224 generates a path table for the neighbor router 312

S711 — The routers 221 to 224 at the level_2 send an LSU message to each of the southbound routers at the level_1

S712 — After receiving the LSU message, the routers 111, 112, 211, 212, 311, and 312 at the level_1 update local LSDBs based on the LSA, and determine, based on information that the LSU message includes the path table, to forward the LSA S713 — Because a router at the level_0 is a leaf node, the routers 111, 112, 211, 212, 311, and 312 at the level_1 send an LSU message to southbound routers at the level_0 that are corresponding to identifiers in the path table S714 — After receiving the LSU message, the routers at the level_0 determine, based on information that the LSU message includes no path table, not to forward the LSA, and only update local LSDBs based on the LSA End

FIG. 25B

CONT.
FROM
FIG. 33A

Because routers 112, 212, and 312 at the level_1 are non-leaf nodes, the router 222 generates a path table for each of the neighbor routers 112 and 212, and the router 224 generates a path table for the neighbor router 312 — S1107

The router 222 sends an LSU message to each of the southbound routers 112 and 212 at the level_1, where the LSU message includes the LSA and the path table generated for each of the neighbor routers 112 and 212, and the router 224 sends an LSU message to the southbound router 312 at the level_1, where the LSU message includes the LSA and the path table generated for the neighbor router 312 — S1108

After receiving the LSU message, the routers 112, 212, and 312 at the level_1 update local LSDBs based on the LSA, and determine, based on information that the LSU message includes the path table, to forward the LSA — S1109

Because a router at the level_0 is a leaf node, the routers 112, 212, and 312 at the level_1 send an LSU message to southbound routers at the level_0 that are corresponding to identifiers in the path table — S1110

After receiving the LSU message, the routers at the level_0 determine, based on information that the LSU message includes no path table, not to forward the LSA, and only update local LSDBs based on the LSA — S1111

End

FIG. 33B

LINK-STATE ADVERTISEMENT LSA SENDING METHOD, APPARATUS, AND SYSTEM

CROSS-REFERENCE TO RELATED APPLICATIONS

This application is a continuation of International Application No. PCT/CN2018/105326, filed on Sep. 12, 2018, which claims priority to Chinese Patent Application No. 201710829090.9, filed on Sep. 14, 2017. The disclosures of the aforementioned applications are hereby incorporated by reference in their entireties.

TECHNICAL FIELD

This application relates to the communications field, and in particular, to a link-state advertisement (LSA) sending method, an apparatus, and a system.

BACKGROUND

As two special hierarchical and structured topologies, leaf-spine (Leaf-Spine) and fat-tree (Fat-Tree) are widely applied to data centers. FIG. 1 is a schematic topology diagram of leaf-spine, including a spine node 11 and a leaf node 12. FIG. 2 is a schematic structural diagram of fat-tree, including a core network 21, an aggregation network 22, and an edge network (a leaf node) 23. The edge network 23 and the aggregation network 22 may be divided into different pods (Pod), and a topology in each pod is equivalent to a leaf-spine topology.

The Open Shortest Path First (OSPF) protocol is an interior gateway protocol (IGP) that is currently most widely used in a network. A basic principle of the Open Shortest Path First protocol is as follows: Each router in the network establishes an adjacency relationship with a neighbor router of the router by using a hello packet. Each router sends an LSA to each neighbor router. After receiving LSAs, each neighbor router sequentially sends these LSAs to neighbor routers of the neighbor router, namely, flooding. Each router stores a backup of a received LSA in a link state database (LSDB) of the router, and LSDBs stored on all routers are the same. Each router calculates a shortest path to each node in the network based on a topology database by using a shortest path first (SPF) algorithm, and outputs a result to form a routing table.

For the leaf-spine topology or the fat-tree topology, there are a plurality of equivalent paths between each pair of leaf nodes. Therefore, an LSA flooding mechanism in the OSPF protocol in the prior art has the following problems: First, when LSA flooding occurs in a network, a large amount of repetition or redundancy is generated, further causing LSA bounce. Second, when a link between adjacent nodes is faulty, the adjacent nodes may still receive an LSA from each other by using another node; however, no data is transmitted between the two nodes, and therefore it is unnecessary to maintain an identical LSDB.

SUMMARY

Embodiments of this application provide an LSA sending method, an apparatus, and a system, to reduce a quantity of LSA sending times. To achieve the foregoing objective, the embodiments of this application use the following technical solutions.

According to a first aspect, a link-state advertisement (LSA) sending method is provided, where the method includes: generating, by a first router, a first path table based on level location information of the first router, level location information of a second router, and level location information of at least one third router, where the second router is a neighbor router that has a valid link with the first router, the third router is a router other than the first router in neighbor routers that have a valid link with the second router, the first path table includes an identifier of the at least one third router, the identifier in the first path table is used to instruct to send a first LSA to a corresponding router, the first LSA includes a valid link between an advertisement router and a neighbor router of the advertisement router, and the advertisement router is a router that generates an LSA when a link state changes or a link state is periodically updated; and sending, by the first router, a first link state update LSU message to the second router, where the first LSU message includes the first LSA and the first path table. According to the LSA sending method provided in this embodiment of this application, a router that sends an LSA generates a path table based on level location information of the router, level location information of a next-hop router, and level location information of a next-next-hop router, and when sending the LSA to the next-hop router, the router that sends the LSA also sends the path table. The path table includes an identifier of the next-next-hop router, the identifier is used to instruct the next-hop router to forward the LSA to the corresponding next-next-hop router, and forwarding is not performed after a router that serves as a leaf node receives the LSA. The router that sends the LSA instructs the next-hop router to selectively forward the LSA to the next-next-hop router. Therefore, a quantity of times of sending the LSA is reduced, and the next-next-hop router is prevented from repeatedly receiving the LSA.

In an implementation, the method further includes: receiving, by the first router, a second LSU message from a fourth router, where the second LSU message includes the first LSA, and the fourth router is a router other than the second router in neighbor routers that have a valid link with the first router; and updating, by the first router, a link state database LSDB of the first router based on the first LSA. In this implementation, a possible source of the first LSA is provided.

In an implementation, the sending, by the first router, a first link state update LSU message to the second router includes: when the second LSU message further includes a second path table, sending, by the first router, the first LSU message to the second router, where the second path table includes an identifier of at least one second router, and the identifier in the second path table is used to instruct to send the first LSA to a corresponding router. In this implementation, a possible condition for sending the LSU message is provided.

In an implementation, the first router is the advertisement router. In this implementation, a possible implementation of the first router is provided.

In an implementation, the first LSA includes level location information of the advertisement router and/or level location information of the neighbor router that has the valid link with the advertisement router. In this implementation, a possible manner of transmitting level location information of each router is provided.

In an implementation, before the generating, by a first router, a first path table based on level location information of the first router, level location information of a second router, and level location information of at least one third router, the method further includes: receiving, by the first router, a second LSA from the second router, where the second LSA includes the level location information of the second router and/or the level location information of the at least one third router. In this implementation, another possible manner of transmitting the level location information of each router is provided.

In an implementation, before the generating, by a first router, a first path table based on level location information of the first router, level location information of a second router, and level location information of at least one third router, the method further includes: sending, by the first router, a first Open Shortest Path First OSPF negotiation message to the second router; and receiving, by the first router, a second OSPF negotiation message from the second router, where the first OSPF negotiation message includes the level location information of the first router, the second OSPF negotiation message includes the level location information of the second router, and the first OSPF negotiation message and the second OSPF negotiation message are used to establish and maintain a neighbor relationship between the first router and the second router. In this implementation, still another possible manner of transmitting the level location information of each router is provided.

According to a second aspect, a link-state advertisement LSA sending method is provided, where the method includes: receiving, by a second router, a first link state update LSU message from a first router, where the first LSU message includes a first LSA and a first path table, the first LSA includes a valid link between an advertisement router and a neighbor router of the advertisement router, the advertisement router is a router that generates an LSA when a link state changes or a link state is periodically updated, the first path table includes an identifier of at least one third router, the second router is a neighbor router that has a valid link with the first router, and the third router is a router other than the first router in neighbor routers that have a valid link with the second router; updating, by the second router, a link state database LSDB of the second router based on the first LSA; and sending, by the second router, the first LSA to a router corresponding to the identifier in the first path table. According to the LSA sending method provided in this embodiment of this application, a router that sends an LSA generates a path table based on level location information of the router, level location information of a next-hop router, and level location information of a next-next-hop router, and when sending the LSA to the next-hop router, the router that sends the LSA also sends the path table. The path table includes an identifier of the next-next-hop router, the identifier is used to instruct the next-hop router to forward the LSA to the corresponding next-next-hop router, and forwarding is not performed after a router that serves as a leaf node receives the LSA. The router that sends the LSA instructs the next-hop router to selectively forward the LSA to the next-next-hop router. Therefore, a quantity of times of sending the LSA is reduced, and the next-next-hop router is prevented from repeatedly receiving the LSA.

In an implementation, the method further includes: generating, by the second router, a second path table based on level location information of the second router, level location information of the third router, and level location information of at least one fifth router, where the second path table includes an identifier of the at least one fifth router, the identifier in the second path table is used to instruct to send the first LSA to a corresponding router, and the fifth router is a router other than the second router in neighbor routers that have a valid link with the third router; and the sending, by the second router, the first LSA to a router corresponding to the identifier in the first path table includes: sending, by the second router, a second LSU message to the router corresponding to the identifier in the first path table, where the second LSU message includes the first LSA and the second path table. In this implementation, when the LSA is being sent, the path table may be further carried.

In an implementation, before the generating, by the second router, a second path table based on level location information of the second router, level location information of the third router, and level location information of at least one fifth router, the method further includes: receiving, by the second router, a second LSA from the third router, where the second LSA includes the level location information of the third router and/or the level location information of the at least one fifth router. In this implementation, a possible manner of transmitting level location information of each router is provided.

In an implementation, the first LSA includes level location information of the advertisement router and/or level location information of the neighbor router that has the valid link with the advertisement router. In this implementation, another possible manner of transmitting the level location information of each router is provided.

In an implementation, the first router is the advertisement router. In this implementation, a possible implementation of the first router is provided.

In an implementation, before the receiving, by a second router, a first link state update LSU message from a first router, the method further includes: sending, by the second router, a first Open Shortest Path First OSPF negotiation message to the first router; and receiving, by the second router, a second OSPF negotiation message from the first router, where the first OSPF negotiation message includes the level location information of the second router, the second OSPF negotiation message includes level location information of the first router, and the first OSPF negotiation message and the second OSPF negotiation message are used to establish and maintain a neighbor relationship between the first router and the second router. In this implementation, still another possible manner of transmitting the level location information of each router is provided.

According to a third aspect, a first router is provided, where the router includes: a generation unit, configured to generate a first path table based on level location information of the first router, level location information of a second router, and level location information of at least one third router, where the second router is a neighbor router that has a valid link with the first router, the third router is a router other than the first router in neighbor routers that have a valid link with the second router, the first path table includes an identifier of the at least one third router, the identifier in the first path table is used to instruct to send a first link-state advertisement LSA to a corresponding router, the first LSA includes a valid link between an advertisement router and a neighbor router of the advertisement router, and the advertisement router is a router that generates an LSA when a link state changes or a link state is periodically updated; and a sending unit, configured to send a first link state update LSU message to the second router, where the first LSU message includes the first LSA and the first path table. Based on a same invention idea, for a problem-resolving principle and beneficial effects of the first router, refer to the first aspect, the possible method implementations of the first aspect, and the brought beneficial effects. Therefore, for implementation of the first router, refer to the first aspect and the possible method implementations of the first aspect. No repeated description is provided.

According to a fourth aspect, a second router is provided, where the router includes: a receiving unit, configured to receive a first link state update LSU message from a first router, where the first LSU message includes a first link-state advertisement LSA and a first path table, the first LSA includes a valid link between an advertisement router and a neighbor router of the advertisement router, the advertisement router is a router that generates an LSA when a link state changes or a link state is periodically updated, the first path table includes an identifier of at least one third router, the second router is a neighbor router that has a valid link with the first router, and the third router is a router other than the first router in neighbor routers that have a valid link with the second router; an update unit, configured to update a link state database LSDB of the second router based on the first LSA; and a sending unit, configured to send the first LSA to a router corresponding to the identifier in the first path table. Based on a same invention idea, for a problem-resolving principle and beneficial effects of the second router, refer to the second aspect, the possible method implementations of the second aspect, and the brought beneficial effects. Therefore, for implementation of the second router, refer to the second aspect and the possible method implementations of the second aspect. No repeated description is provided.

According to a fifth aspect, an embodiment of this application provides a router, including a processor, a memory, a bus, and a communications bus, where the memory is configured to store a computer execution instruction, the processor and the memory are connected by using the bus, and when the router runs, the processor executes the computer execution instruction stored in the memory, so that the router performs the method according to any one of the first aspect or the implementations of the first aspect, or any one of the second aspect or the implementations of the second aspect.

According to a sixth aspect, an embodiment of this application provides a computer storage medium, including an instruction. When the instruction is executed on a computer, the computer performs the method according to any one of the first aspect or the implementations of the first aspect, or any one of the second aspect or the implementations of the second aspect.

According to a seventh aspect, an embodiment of this application provides a computer program product that includes an instruction. When the computer program product runs on a computer, the computer performs the method according to any one of the first aspect or the implementations of the first aspect, or any one of the second aspect or the implementations of the second aspect.

According to an eighth aspect, an embodiment of this application provides a communications system, including the first router according to the third aspect and the second router according to the fourth aspect.

In addition, for technical effects brought by the fifth aspect to the eighth aspect, refer to the technical effects brought by different designs in any one of the first aspect or the implementations of the first aspect, or any one of the second aspect or the implementations of the second aspect. Details are not described herein again.

BRIEF DESCRIPTION OF THE DRAWINGS

To describe the technical solutions in the embodiments of this application more clearly, the following briefly describes the accompanying drawings required for describing the embodiments.

FIG. 4 is a first schematic diagram of an LSA packet format according to an embodiment of this application;

FIG. 11 is a second schematic diagram of an LSA packet format according to an embodiment of this application;

FIG. 21A and FIG. 21B are an eleventh schematic flowchart of an LSA sending method according to an embodiment of this application;

FIG. 23A and FIG. 23B are a twelfth schematic flowchart of an LSA sending method according to an embodiment of this application;

FIG. 25A and FIG. 25B are a thirteenth schematic flowchart of an LSA sending method according to an embodiment of this application;

FIG. 33A and FIG. 33B are a seventeenth schematic flowchart of an LSA sending method according to an embodiment of this application;

DETAILED DESCRIPTION OF ILLUSTRATIVE EMBODIMENTS

The following describes the technical solutions in the embodiments of this application with reference to the accompanying drawings in the embodiments of this application.

Figure 1:
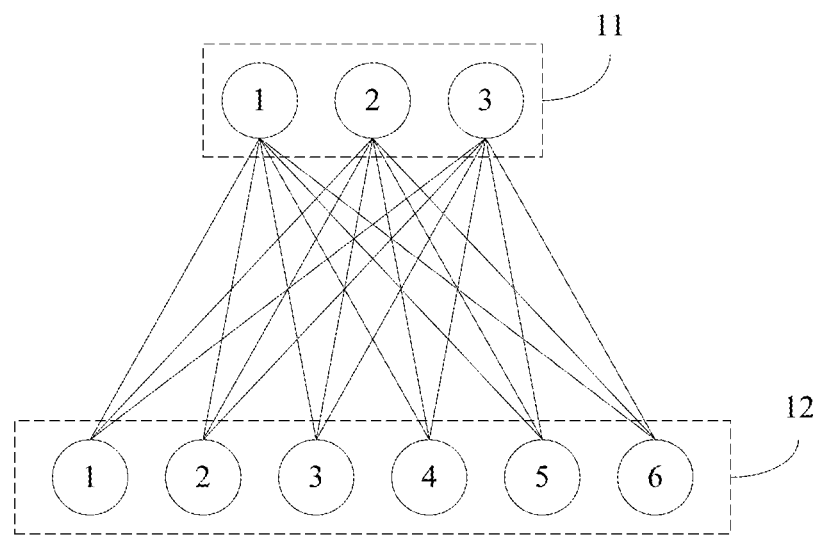
FIG. 1 is a schematic structural diagram of a communications system of a leaf-spine topology according to an embodiment of this application.
Figure 2:
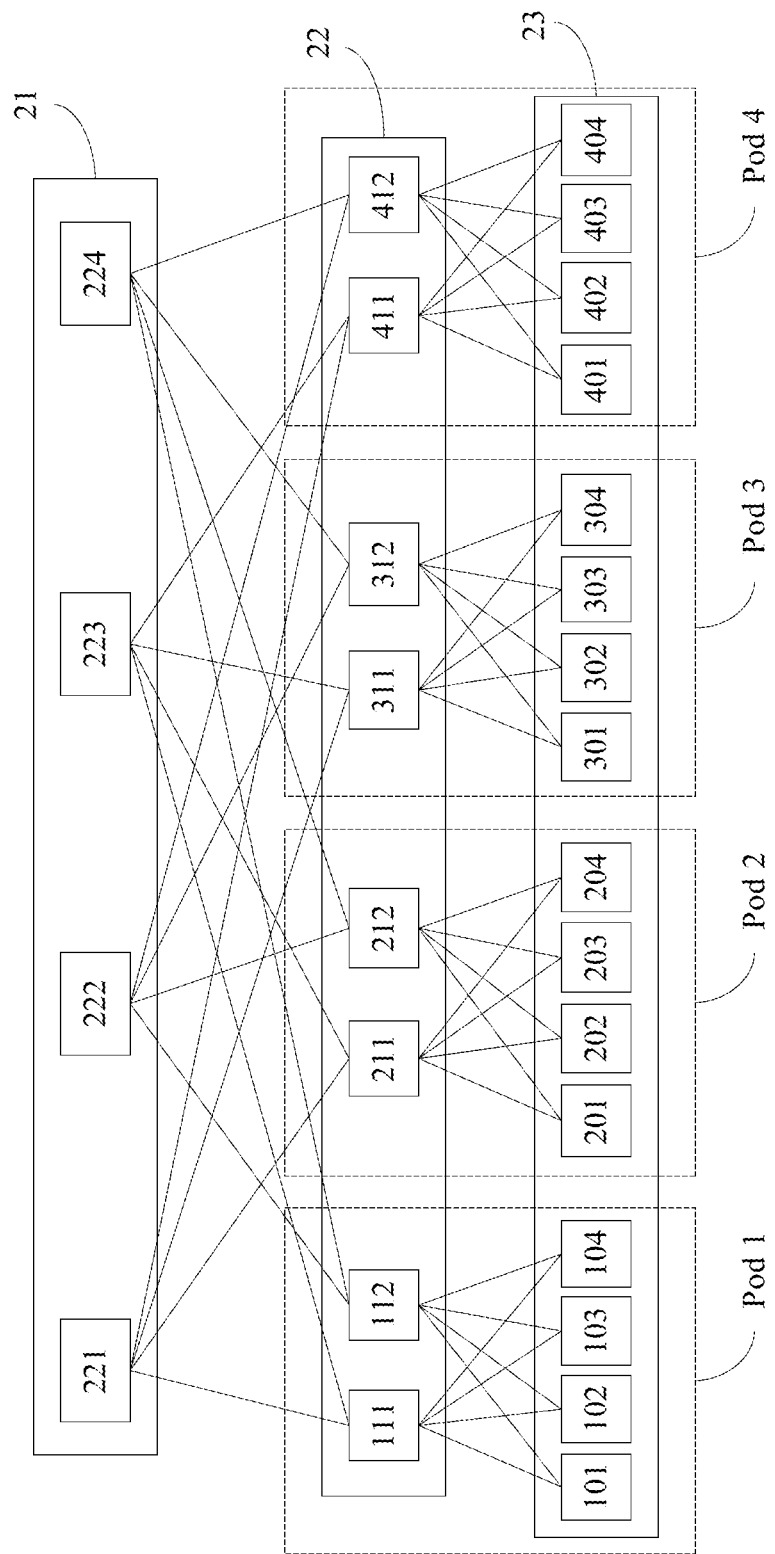
FIG. 2 is a schematic structural diagram of a communications system of a fat-tree topology according to an embodiment of this application.

For ease of description, in the embodiments of this application, in a fat-tree topology shown in FIG. 2, a core network 21 is referred to as a level 2 (Level_2), an aggregation network 22 is referred to as a level 1 (Level_1), and an edge network (a leaf node) 23 is referred to as a level 0 (Level_0). Because a topology in each pod of the fat-tree topology is equivalent to a leaf-spine topology shown in FIG. 1, a spine node 11 in the leaf-spine topology shown in FIG. 1 may be referred to as a level 1, and a leaf node 12 is referred to as a level 0. For example, in the embodiments of this application, LSA transmission in the fat-tree topology is used as an example for description. LSA transmission may also be applied to the leaf-spine topology or another topology that has a tree-like structure.

Level location information described in the embodiments of this application refers to a level location of a router in the foregoing hierarchical tree topology structure. For example, as shown in FIG. 2, level location information of a router 224 is a level 2 (Level_2), level location information of a router 412 is a level 1 (Level_1), and level location information of a router 404 is a level 0 (Level_0).

A complete topology described in the embodiments of this application is a topology that is networked based on a regular fat-tree topology. An incomplete topology described in the embodiments of this application is a topology in which some links or nodes are missed compared with the regular fat-tree topology. In the embodiments of this application, a northbound direction is a direction from Level_0 to Level_2, and a southbound direction is a direction from Level_2 to Level_0.

A first router, a second router, a third router, a fourth router, a fifth router, and the like that are described in the embodiments of this application are routers classified based on relative locations (for example, a next hop, a previous hop, a next-next hop, and a previous-previous hop) on an LSA transmission path. For example, as shown in FIG. 2, routers 404, 412, 224, 111, and 101 may constitute an LSA transmission path from the router 404 to the router 101, and routers 404, 411, 221, 111, and 101 may constitute another LSA transmission path from the router 404 to the router 101. In an actual transmission process, a path may be selected from the paths based on an algorithm, for transmission. The router 404 may choose to send an LSA to the router 411 or the router 412, in other words, each of the router 411 and the router 412 is a next-hop router of the router 404, and therefore the router 411 and the router 412 may be classified into one type of routers. For example, the router 404 may serve as a first router, and the router 411 and the router 412 may serve as second routers. In addition, it should be noted that the LSA transmission path may be a shortest path first (SPF) path.

A leaf node described in the embodiments of this application refers to a router node that no longer forwards an LSA on an LSA transmission path. A non-leaf node or an intermediate node described in the embodiments of this application is a router node that continues to forward an LSA on an LSA transmission path. For example, as shown in FIG. 2, routers 404, 412, 224, 111, and 101 may constitute an LSA transmission path from the router 404 to the router 101. In this case, the router 101 is a leaf node, and the routers 412, 224, and 111 are non-leaf nodes.

Periodic link state update described in the embodiments of this application means that a router periodically checks a status of a link between the router and a neighbor router. A neighbor router described in the embodiments of this application is a router directly connected to a router. For example, as shown in FIG. 2, routers 412 and 224 are neighbor routers, and routers 412 and 112 are not neighbor routers. A link state change described in the embodiments of this application includes disconnection of a link between neighbor routers, a fault of a router, network access by a router, and the like.

A path table described in the embodiments of this application may also be referred to as a flooding optimization reflector list (FORL).

An LSA sending method, an apparatus, and a system described in the embodiments of this application are applied to the foregoing fat-tree topology, the leaf-spine topology, or another similar tree topology structure. When a link state changes or a link state is periodically updated, an advertisement router generates an LSA. The LSA includes a valid link between the advertisement router and a neighbor router of the advertisement router. The advertisement router sends the LSA to the neighbor router. After updating an LSDB of the neighbor router based on the LSA, the neighbor router continues to forward the LSA. The embodiments of this application are intended to minimize a quantity of LSA sending times in an LSA forwarding process.

Figure 3:
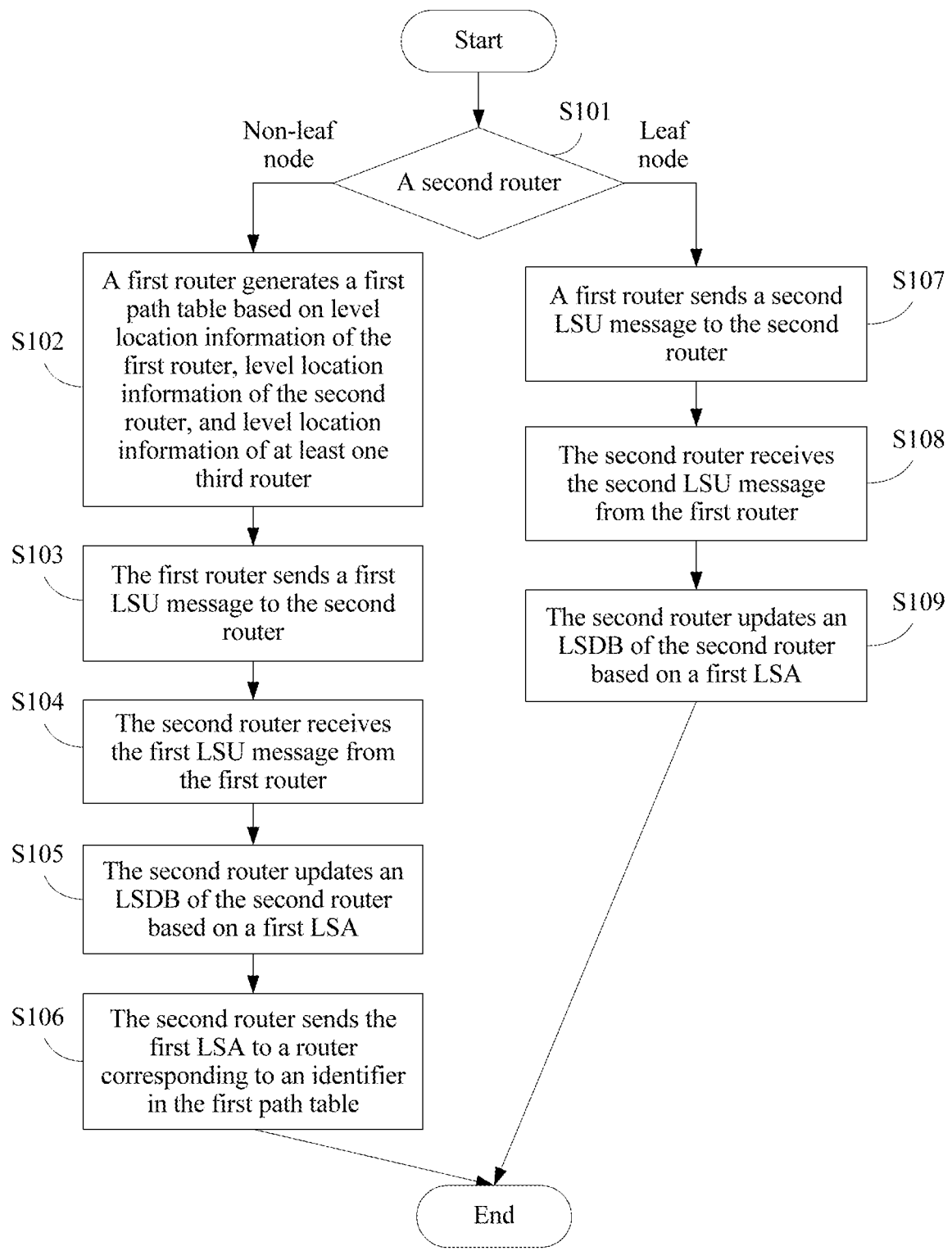
FIG. 3 is a first schematic flowchart of an LSA sending method according to an embodiment of this application.

An embodiment of this application provides an LSA sending method. As shown in FIG. 3, the method includes the following steps.

S101. When a first router determines that a second router is a non-leaf node, perform steps S102 to S106, or when the first router determines that the second router is a leaf node, perform steps S107 to S109.

The second router is a neighbor router that has a valid link with the first router. On an LSA transmission path, the first router serves as a router that sends an LSA, and the second router serves as a next-hop router that receives the LSA from the first router.

When the second router is a non-leaf node, the second router may further continue to forward the LSA sent by the first router. When the second router is a leaf node, the second router cannot continue to forward the LSA sent by the first router.

Whether the second router is a leaf node or a non-leaf node may be determined in the following manners: When the second router is located at level_0, the second router may serve as a leaf node. When the second router has no other neighbor router than the first router that has a valid link with the second router, the second router may serve as a leaf node. In addition to the first router, when the second router has another neighbor router that has a valid link with the second router, the second router may serve as a non-leaf node. On the LSA transmission path, if a plurality of second routers have a same next-hop neighbor router, at least one of the second routers may be selected as a non-leaf node, and the other second routers may serve as leaf nodes.

S102. The first router generates a first path table based on level location information of the first router, level location information of the second router, and level location information of at least one third router.

The third router is a router other than the first router in neighbor routers that have a valid link with the second router. On the LSA transmission path, the first router serves as a router that sends an LSA, the second router serves as a next-hop router that receives the LSA from the first router and forwards the LSA, and the third router serves as a next-next-hop router that receives the LSA from the second router and forwards the LSA.

It is specified that the third router is different from the first router, so that the LSA is prevented from being transmitted back to the first router after being forwarded by the second router. For example, as shown in FIG. 2, it is assumed that a router 404 is the first router, a router 412 is the second router, and a router 221 and a router 224 each may serve as the third router, but the router 404 cannot serve as the third router, so as to prevent the LSA from being transmitted back to the router 404.

The first path table includes an identifier of the at least one third router, and the identifier in the first path table is used to instruct to send a first LSA to a corresponding router. The first path table may include identifiers of some or all of third routers. The identifier in the first path table is actually corresponding to an identifier of a next-hop neighbor router of the second router. For example, as shown in FIG. 2, it is assumed that the router 404 is the first router, the router 412 is the second router, and the routers 221 and 224 are third routers. If the generated first path table includes only an identifier of the router 221, it indicates that the router 404 instructs the router 412 to forward the first LSA only to the router 221. If the generated first path table includes identifiers of the routers 221 and 224, it indicates that the router 404 instructs the router 412 to forward the first LSA to both the routers 221 and 224.

The first LSA includes a valid link between an advertisement router and a neighbor router of the advertisement router. The advertisement router is a router that generates an LSA when a link state changes or a link state is periodically updated. For example, as shown in FIG. 2, if a router 101 is the advertisement router, an LSA generated by the router 101 includes a valid link between the router 101 and a router 111 and a valid link between the router 101 and a router 112. FIG. 4 is a schematic diagram of an LSA packet format. The LSA includes an identifier of the advertisement router and an identifier (namely, a link ID in the figure), of the neighbor router that has the valid link with the advertisement router.

Optionally, the first router may be the advertisement router, in other words, the first LSA is generated by the first router, and in this case, the first LSA includes a valid link between the first router and a neighbor router of the first router. Alternatively, the first router may be a router at an intermediate node on the LSA transmission path, in other words, the first LSA is not generated by the first router, but is forwarded by the first router. For example, as shown in FIG. 2, it is assumed that the router 404 is the first router and the advertisement router. In this case, the first LSA includes an identifier of the router 404 and identifiers of neighbor routers 411 and 412 that have a valid link with the router 404. It is assumed that the router 412 is the first router, and the router 404 is the advertisement router. In this case, the first LSA also includes the identifier of the router 404 and the identifiers of the neighbor routers 411 and 412 that have a valid link with the router 404.

How the first router obtains the level location information of the second router and the level location information of the third router is described below in detail.

S103. The first router sends a first link state update (LSU) message to the second router, where the first LSU message includes a first LSA and the first path table.

Figure 5:
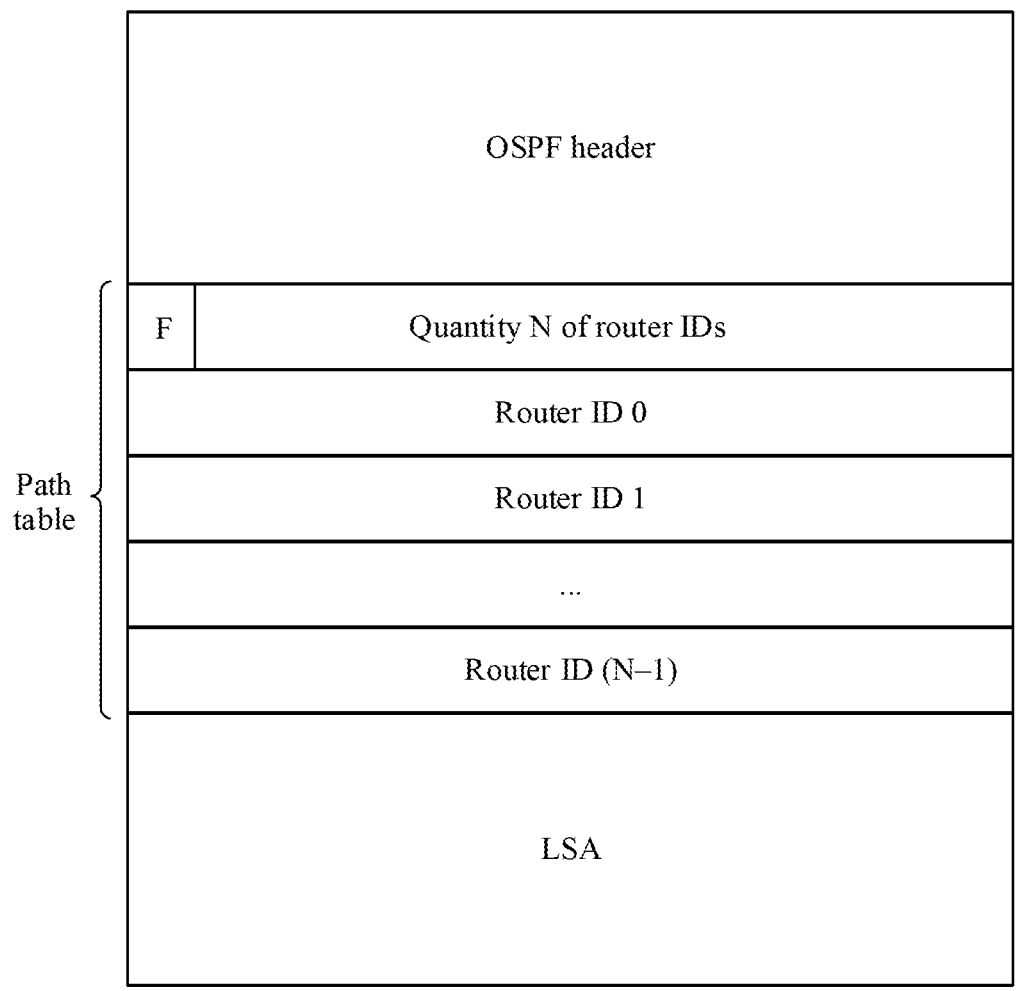
FIG. 5 is a schematic diagram of a packet format of an extended LSU message according to an embodiment of this application.

The LSU message is a packet in the OSPF protocol, and may be used to encapsulate an LSA. In this embodiment of this application, the LSU message is extended. As shown in FIG. 5, an extended LSU message packet includes an OSPF header, a path table, and an LSA. The path table includes a flag bit F, a quantity N of router IDs, and a router ID 0 to a router ID (N−1).

The flag bit F is used to indicate whether path table information is carried. For example, F=0 may indicate that no path table information is carried, and F=1 may indicate that the path table information is carried. Alternatively, F=1 may indicate that no path table information is carried, and F=0 may indicate that the path table information is carried.

The quantity N of router IDs is used to indicate a quantity of router IDs included in the path table.

The router ID 0 to the router ID (N−1) are used to indicate specific router IDs. As described above, the router ID 0 to the router ID (N−1) may include the identifiers of the some or all of the third routers.

It should be noted that the path table may alternatively be located after the LSA.

S104. The second router receives the first LSU message from the first router.

S105. The second router updates an LSDB of the second router based on the first LSA.

Specifically, the second router updates, by using the first LSA generated by the advertisement router, the LSDB stored on the second router. An entire network topology may be obtained by continuously updating the LSDB.

S106. The second router sends the first LSA to a router corresponding to an identifier in the first path table.

The first LSA may also be carried in the LSU message.

As described in the foregoing example, it is assumed that the router 404 is the first router, and the router 412 is the second router. If the first path table sent by the router 404 to the router 412 includes only the identifier of the router 221, the router 412 forwards the first LSA only to the router 221. If the first path table includes the identifiers of the routers 221 and 224, the router 412 forwards the first LSA to both the routers 221 and 224.

It should be noted that steps S105 and S106 are performed in no particular order.

When the second router is a non-leaf node, the foregoing steps S102 to S106 are performed. When the second router is a leaf node, the following steps S107 to S109 are performed.

S107. The first router sends a second LSU message to the second router, where the second LSU message includes a first LSA.

A difference between this step and step S103 lies in that because the second router does not need to forward the LSA based on a path table, the LSU message does not need to carry the path table.

S108. The second router receives the second LSU message from the first router.

S109. The second router updates an LSDB of the second router based on the first LSA.

This step is the same as S105.

According to the LSA sending method provided in this embodiment of this application, a router that sends an LSA generates a path table based on level location information of the router, level location information of a next-hop router, and level location information of a next-next-hop router, and when sending the LSA to the next-hop router, the router that sends the LSA also sends the path table. The path table includes an identifier of the next-next-hop router, the identifier is used to instruct the next-hop router to forward the LSA to the corresponding next-next-hop router, and forwarding is not performed after a router that serves as a leaf node receives the LSA. The router that sends the LSA instructs the next-hop router to selectively forward the LSA to the next-next-hop router. Therefore, a quantity of times of sending the LSA is reduced, and the next-next-hop router is prevented from repeatedly receiving the LSA.

Figure 6:
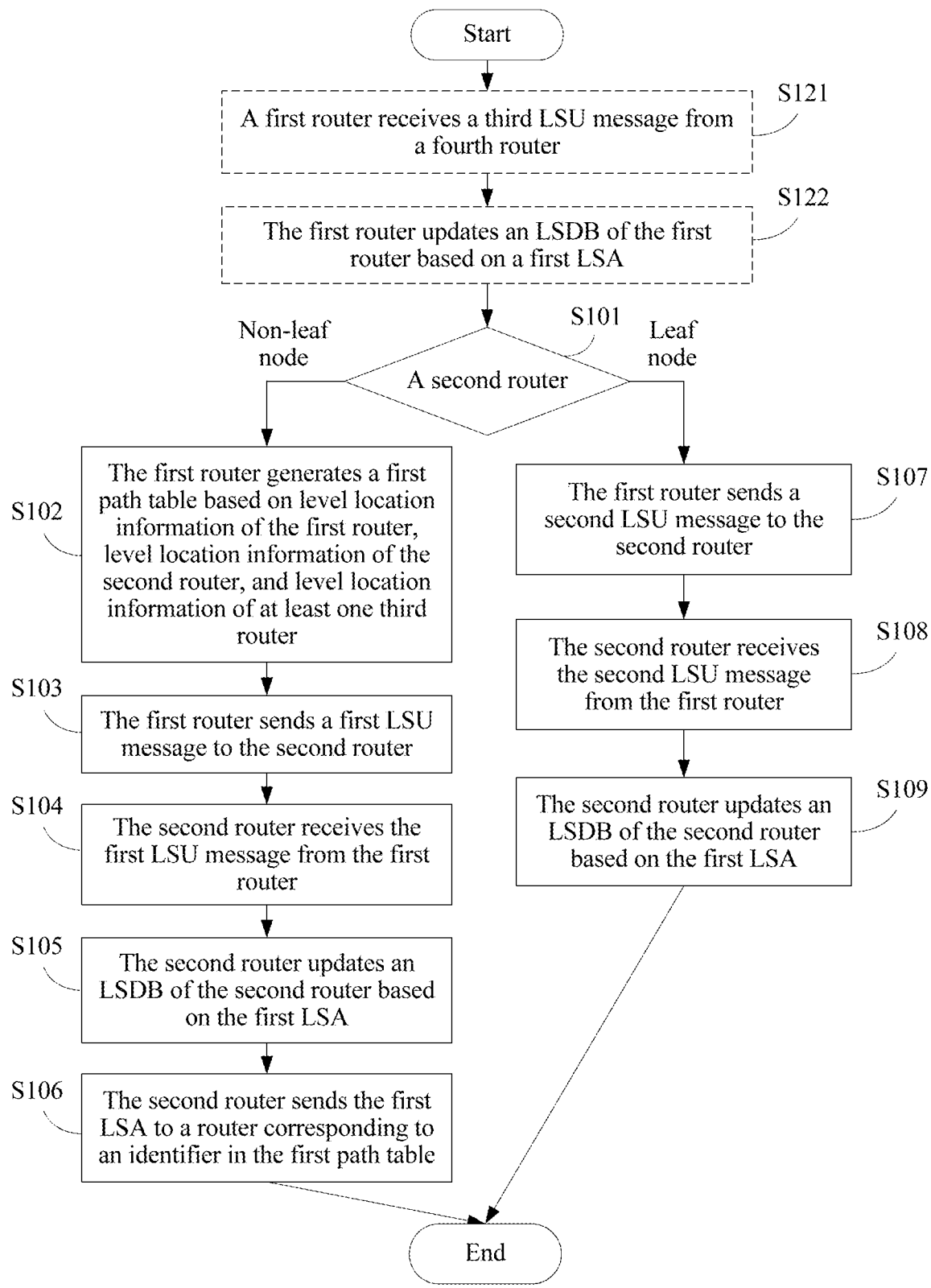
FIG. 6 is a second schematic flowchart of an LSA sending method according to an embodiment of this application.

Optionally, in an implementation, as shown in FIG. 6, when the first router is a router at an intermediate node on the LSA transmission path, the method further includes steps S121 and S122.

S121. The first router receives a third LSU message from a fourth receiver, where the third LSU message includes the first LSA, and the fourth router is a router other than the second router in neighbor routers that have a valid link with the first router.

The fourth router may be the advertisement router, and the first LSA is generated by the fourth router. Alternatively, like the first router, the fourth router is also a router at an intermediate node on the LSA transmission path, in other words, the first LSA is not generated by the fourth router, but is forwarded by the fourth router. Similar to a limitation on the third router in step S102, it is specified that the fourth router is different from the second router, so that the LSA is prevented from being transmitted back to the fourth router after being forwarded by the first router.

S122. The first router updates an LSDB of the first router based on the first LSA.

This step is similar to S105, and details are not described herein again. It should be noted that step S122 and steps S101 to S109 are performed in no particular order.

In this implementation, a manner of obtaining the LSA when the first router is not the advertisement router is provided.

Figure 7:
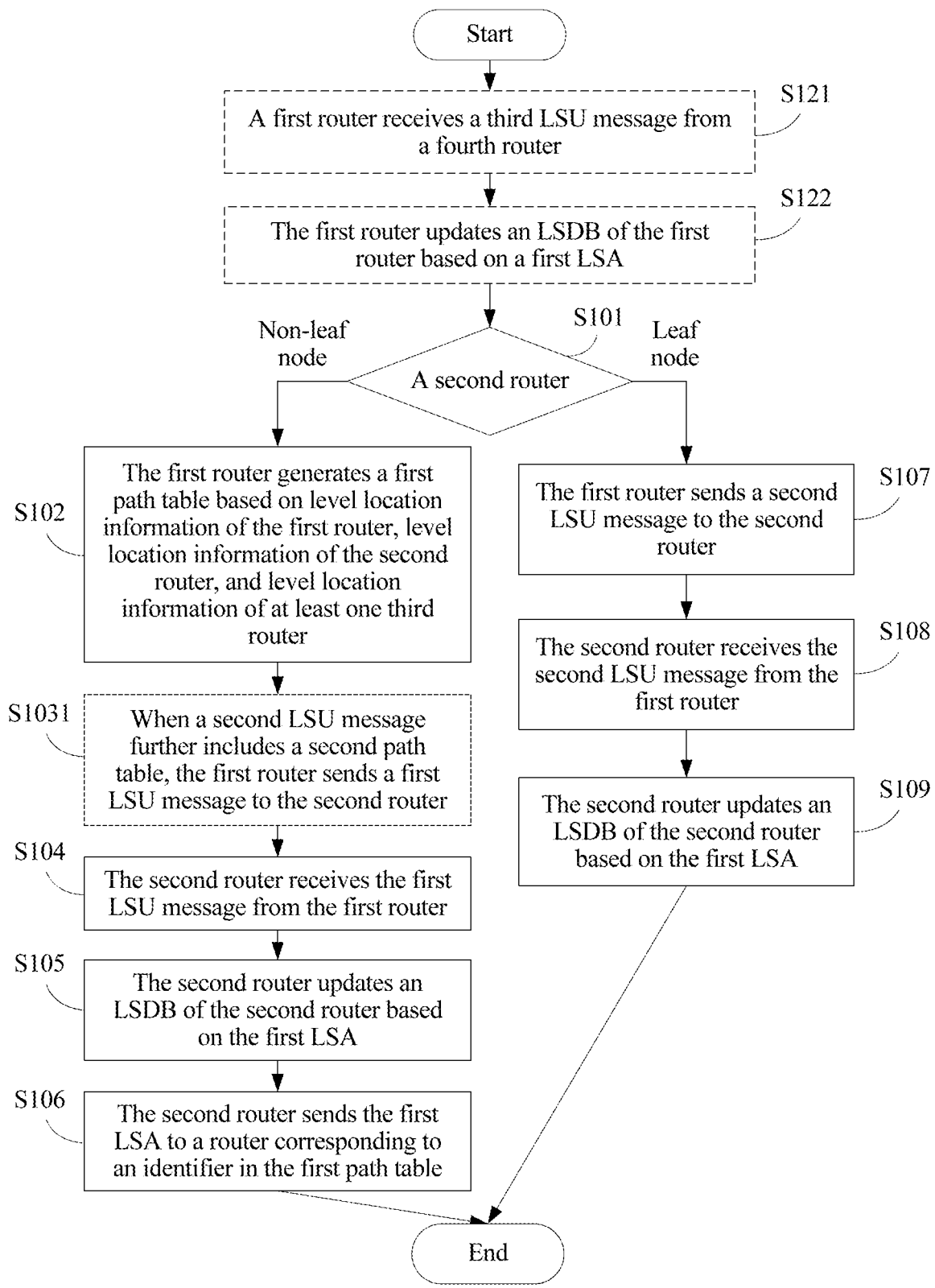
FIG. 7 is a third schematic flowchart of an LSA sending method according to an embodiment of this application.

Based on the method shown in FIG. 6, in an implementation, as shown in FIG. 7, step S103 specifically includes the following step:

S1031. When the second LSU message further includes a second path table, the first router sends the first LSU message to the second router, where the second path table includes an identifier of at least one second router, and the identifier in the second path table is used to instruct to send the first LSA to a corresponding router.

This step is equivalent to determining, by the first router based on whether there is a path table in the received LSU message, whether to continue to forward the LSA in the LSU message. When there is a path table in the received LSU message, the LSA in the LSU message is forwarded based on the path table. When there is no path table in the received LSU message, the LSA in the LSU message is not forwarded.

The second path table may include identifiers of some or all of second routers. The identifier in the second path table is actually corresponding to an identifier of a next-hop neighbor router of the first router.

Optionally, when the second LSU message does not include the second path table, the first router does not send the first LSU message to the second router, in other words, does not forward the LSA.

In this implementation, the first router determines, based on whether there is a path table in the received LSU message, whether to forward the LSA in the LSU message.

Figure 8A:
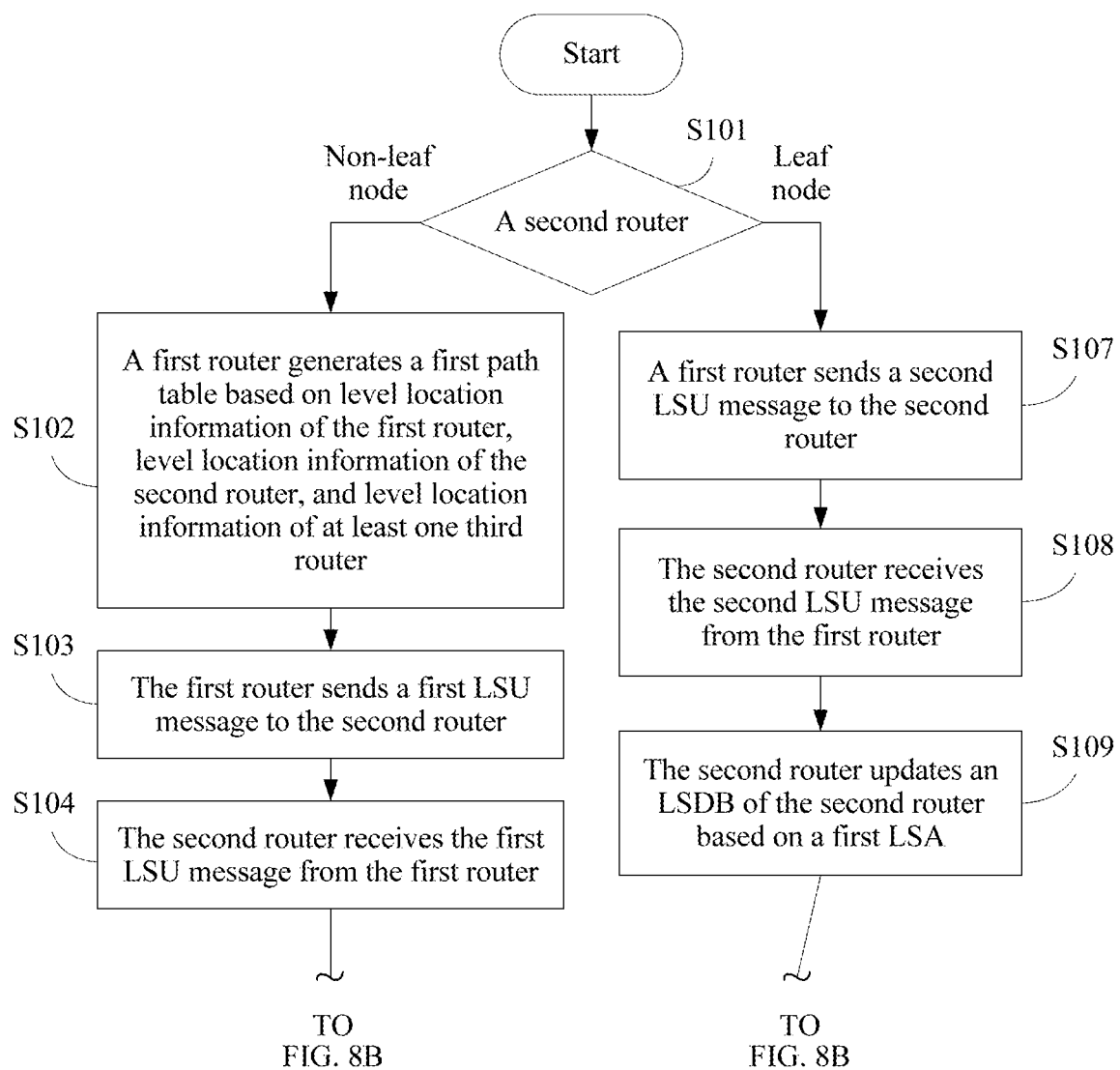
FIG. 8A and FIG. 8B are a fourth schematic flowchart of an LSA sending method according to an embodiment of this application.
Figure 8B:
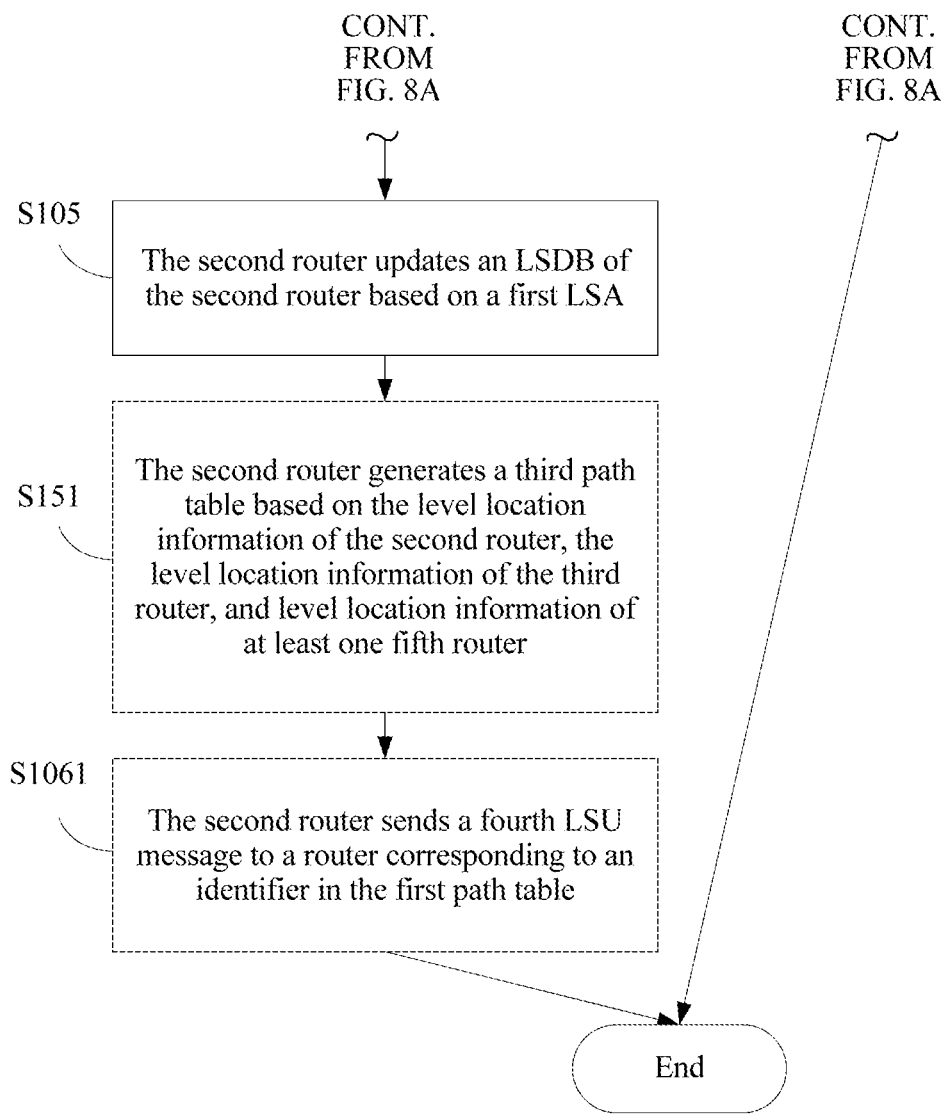

Optionally, in an implementation, as shown in FIG. 8A and FIG. 8B, the method further includes step S151, and step S106 specifically includes step S1061.

S151. The second router generates a third path table based on the level location information of the second router, the level location information of the third router, and level location information of at least one fifth router.

The third path table includes an identifier of the at least one fifth router, the identifier in the third path table is used to instruct to send the first LSA to a corresponding router, and the fifth router is a router other than the second router in neighbor routers that have a valid link with the third router.

This step is similar to S102, and details are not described herein again.

S1061. The second router sends a fourth LSU message to the router corresponding to the identifier in the first path table, where the fourth LSU message includes the first LSA and the third path table.

This step is similar to S103, and details are not described herein again.

In this implementation, a manner of sending, by the second router, the LSA and the path table to the third router is provided.

How a router obtains level location informations of another router is described below.

Optionally, in an implementation, for neighbor routers, an OSFP negotiation message, namely, a hello message, is extended in this embodiment of this application. The hello message is used to establish and maintain a neighbor relationship between the neighbor routers, and all interfaces of the router periodically send the hello message.

Figure 9:
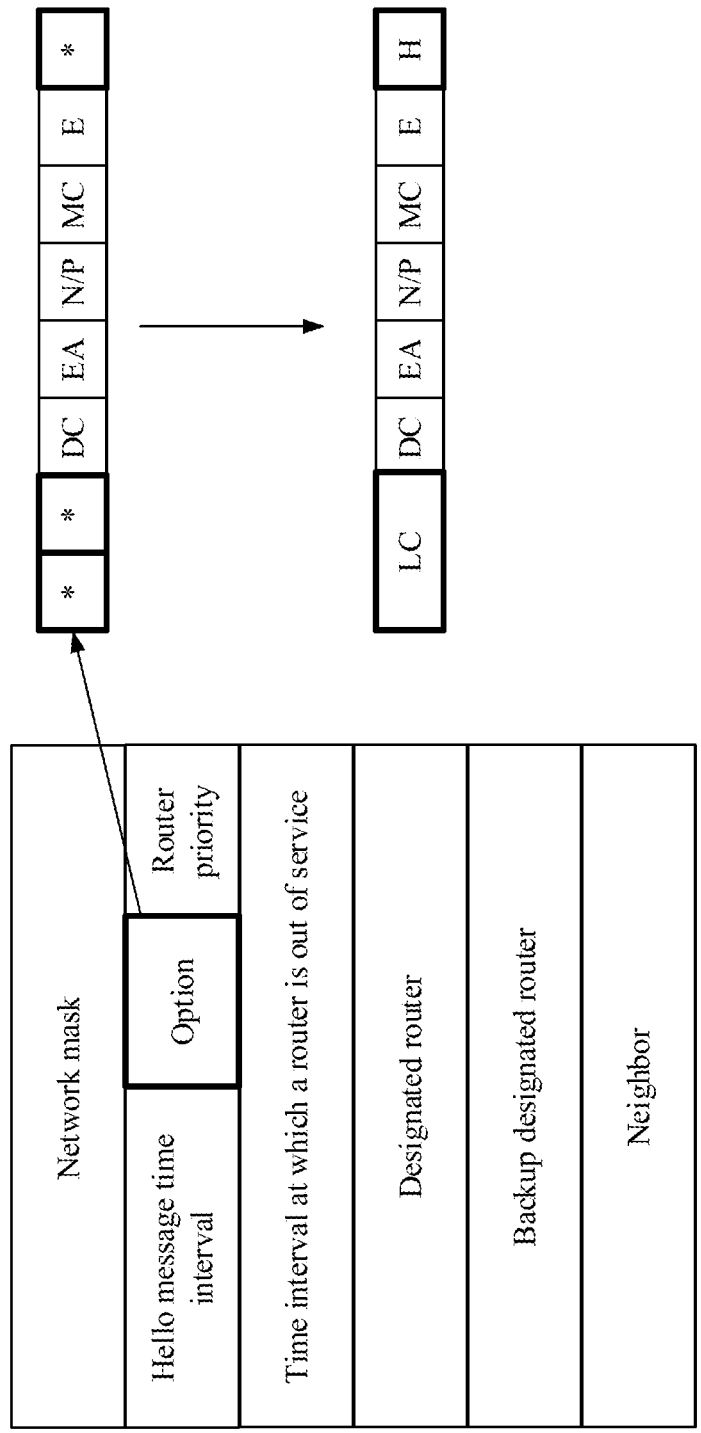
FIG. 9 is a schematic diagram of a packet format of a hello message according to an embodiment of this application.

FIG. 9 is a schematic diagram of a packet format of a hello message. An option occupies eight bits, five bits are used, and three bits are left unused (shown by * in the figure). In this embodiment of this application, two of the three unused bits are represented as level location information LC, and the remaining one bit is represented as a flag bit H.

The flag bit H is used to indicate whether the router needs to be disposed at a level. For example, H=0 may indicate that the router does not need to be disposed at a level, and H=1 may indicate that the router needs to be disposed at a level. Alternatively, H=0 may indicate that the router needs to be disposed at a level, and H=1 may indicate that the router does not need to be disposed at a level.

The level location information LC is used to indicate a level location of the router in a hierarchical tree topology structure. For example, LC=1 may indicate that the router is located at level_0, LC=2 may indicate that the router is located at level_1, and LC=3 may indicate that the router is located at level_2. Alternatively, LC may be different values from 0 to 3 to indicate, in another manner, that the router is located at different levels. This is not limited in this embodiment of this application.

Figure 10A:
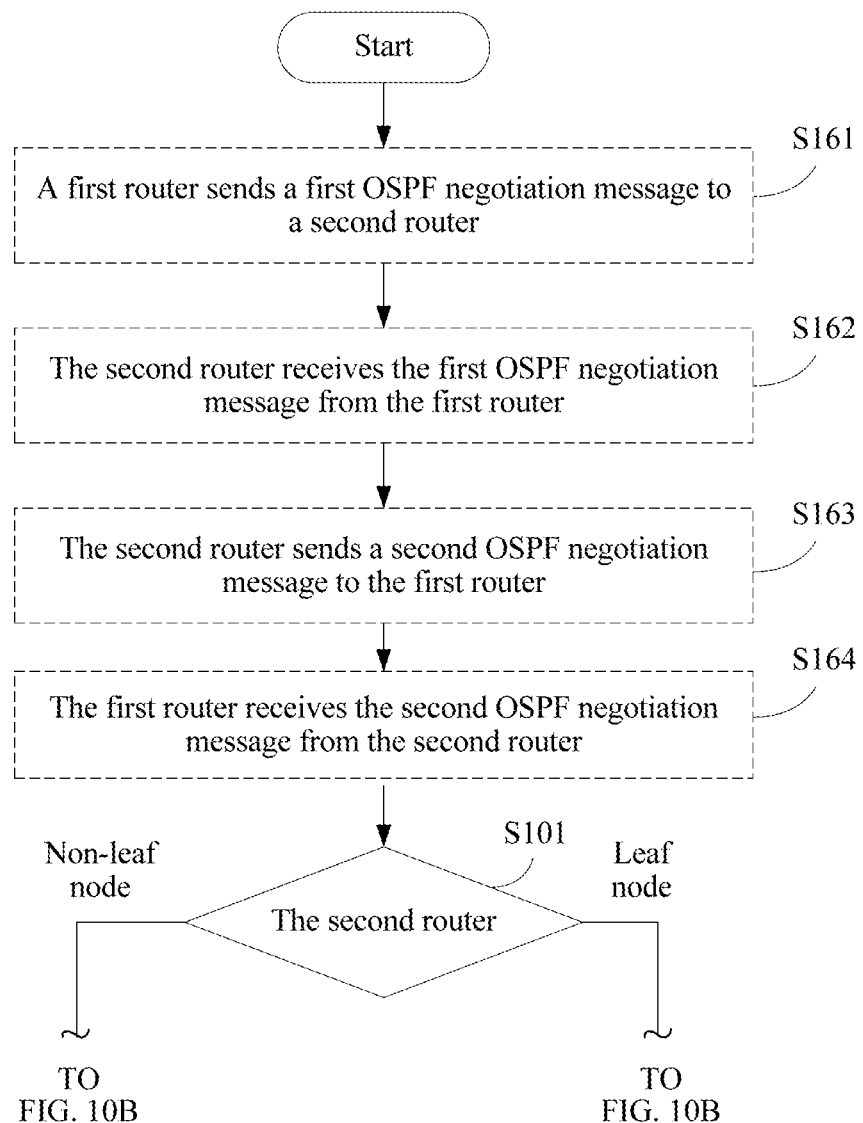
FIG. 10A and FIG. 10B are a fifth schematic flowchart of an LSA sending method according to an embodiment of this application.
Figure 10B:
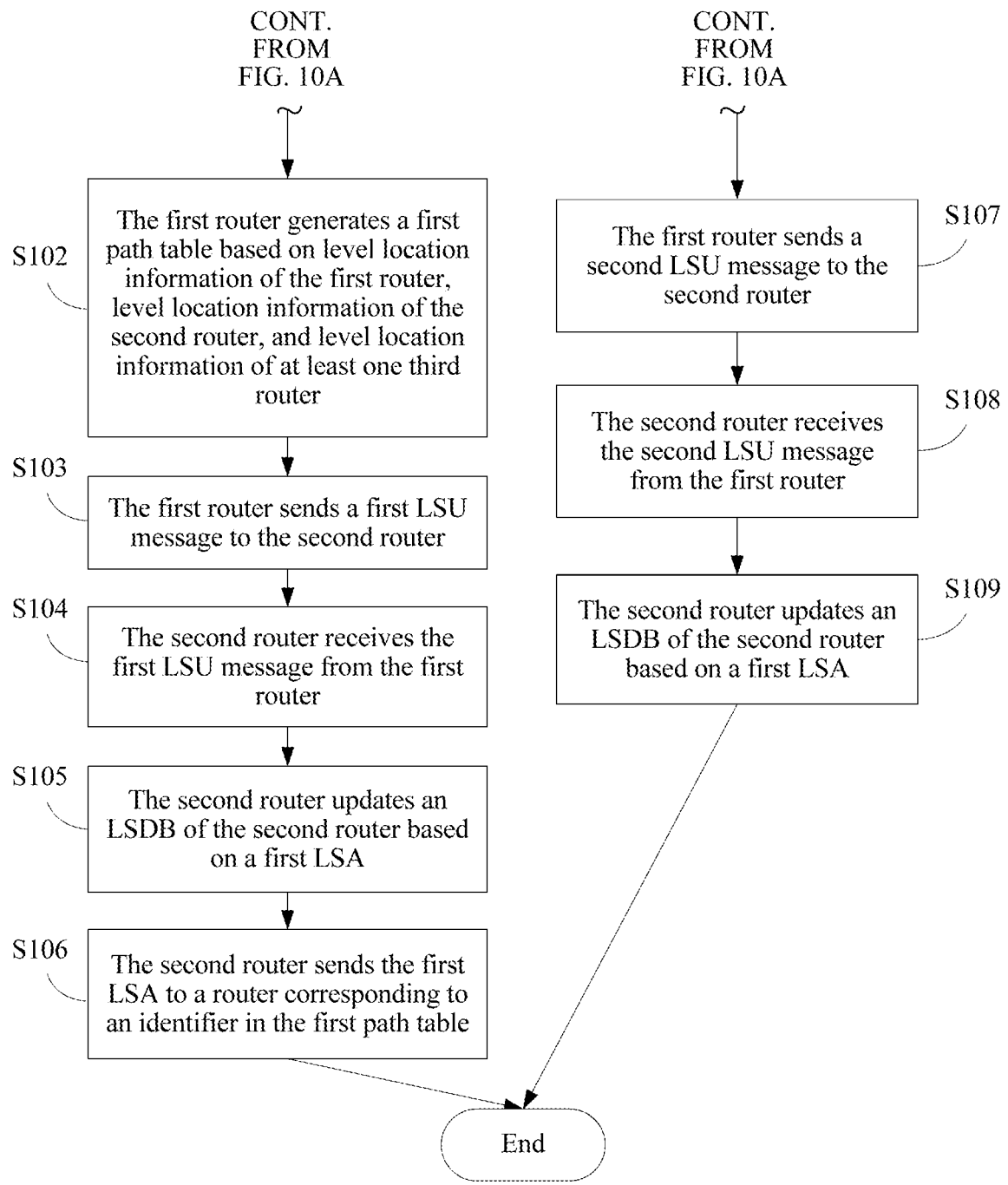

As shown in FIG. 10A and FIG. 10B, before step S101, the method further includes steps S161 to S164.

S161. The first router sends a first OSPF negotiation message to the second router.

The first OSPF negotiation message includes the level location information of the first router. The first OSPF negotiation message may be the foregoing hello message. In this step, the second router learns of the level location information of the first router.

S162. The second router receives the first OSPF negotiation message from the first router.

S163. The second router sends a second OSPF negotiation message to the first router.

The second OSPF negotiation message includes the level location information of the second router. The second OSPF negotiation message may be the foregoing hello message. The first OSPF negotiation message and the second OSPF negotiation message are used to establish and maintain a neighbor relationship between the first router and the second router. In this step, the first router learns of the level location information of the second router.

S164. The first router receives the second OSPF negotiation message from the second router.

It should be noted that in this embodiment of this application, although a manner in which the first router and the second router mutually send and receive hello messages to obtain the level location information of each other is merely described by using an example, it may be understood that routers that are neighbor routers of each other may obtain level location information of each other in this manner.

In this implementation, a manner of obtaining, by neighbor routers, level location information of each other is provided.

Optionally, in another implementation, for non-neighbor routers separated by a neighbor router, the LSA packet format shown in FIG. 4 is extended in this embodiment of this application. As shown in FIG. 11, a field of level location information of the advertisement router is added to the LSA. In addition, because the link ID is used to identify the identifier of the neighbor router that has the valid link with the advertisement router, a field of level location information may be added for each link ID, to indicate level location information of the neighbor router that has the valid link with the advertisement router. It should be noted that the LSA may include both of the two fields, or may include only one of the two fields, so that the LSA finally includes the level location information of the advertisement router and/or the level location information of the neighbor router that has the valid link with the advertisement router.

Figure 12:
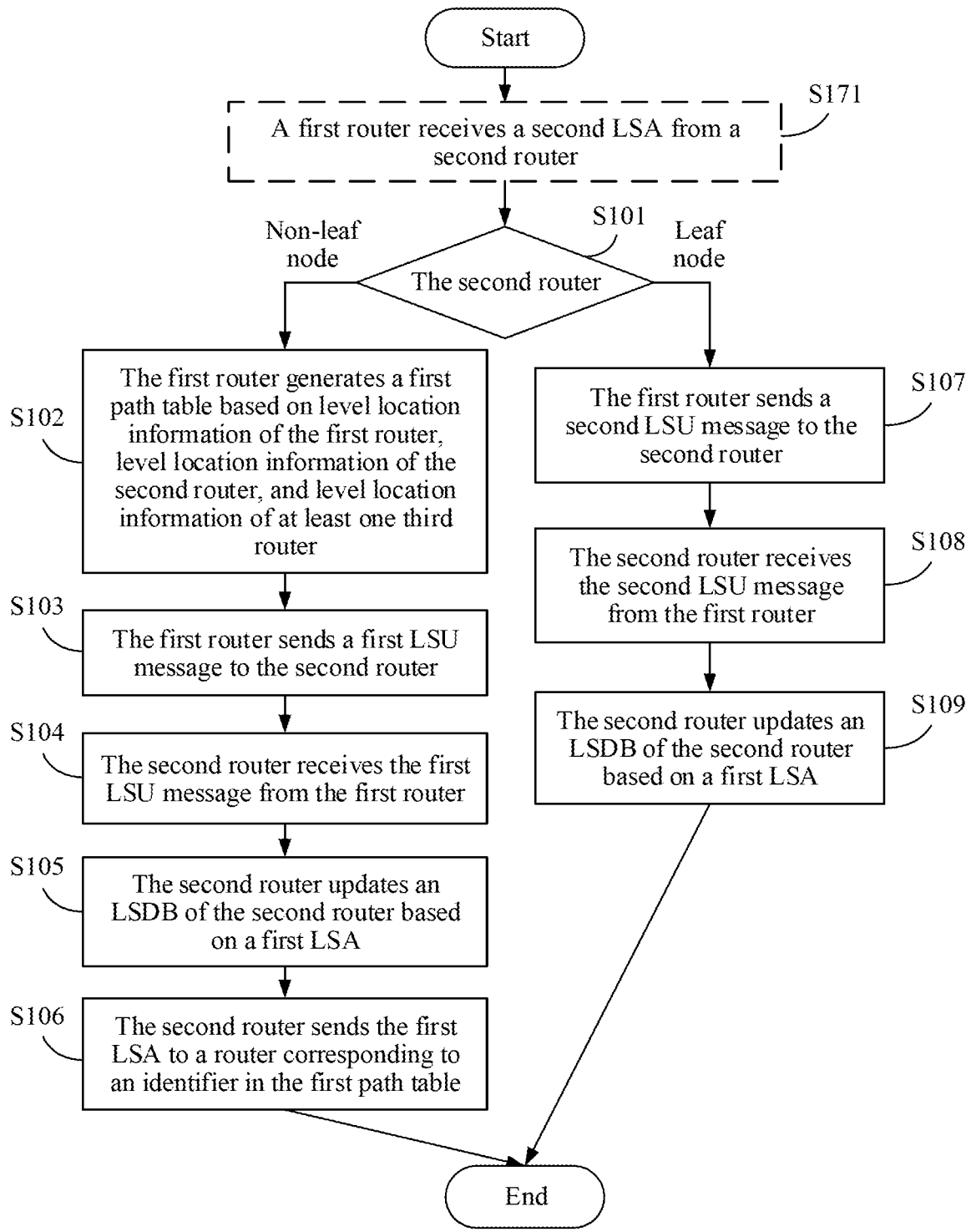
FIG. 12 is a sixth schematic flowchart of an LSA sending method according to an embodiment of this application.

For the level location information of the second router and the level location information of the third router obtained by the first router in step S102, optionally, as shown in FIG. 12, before step S102, the method further includes S171.

S171. The first router receives a second LSA from the second router, where the second LSA includes the level location information of the second router and/or the level location information of the at least one third router.

The second router may serve as the advertisement router, and the third router may serve as a neighbor router that has a valid link with the second router. The second router generates an LSA and sends the LSA to the first router. The LSA carries the level location information of the second router and/or the level location information of the at least one third router. Alternatively, the third router may serve as the advertisement router, and the second router may serve as a neighbor router that has a valid link with the third router. The second router forwards, to the first router, an LSA generated by the third router. The LSA carries the level location information of the second router and/or the level location information of the at least one third router.

Figure 13A:
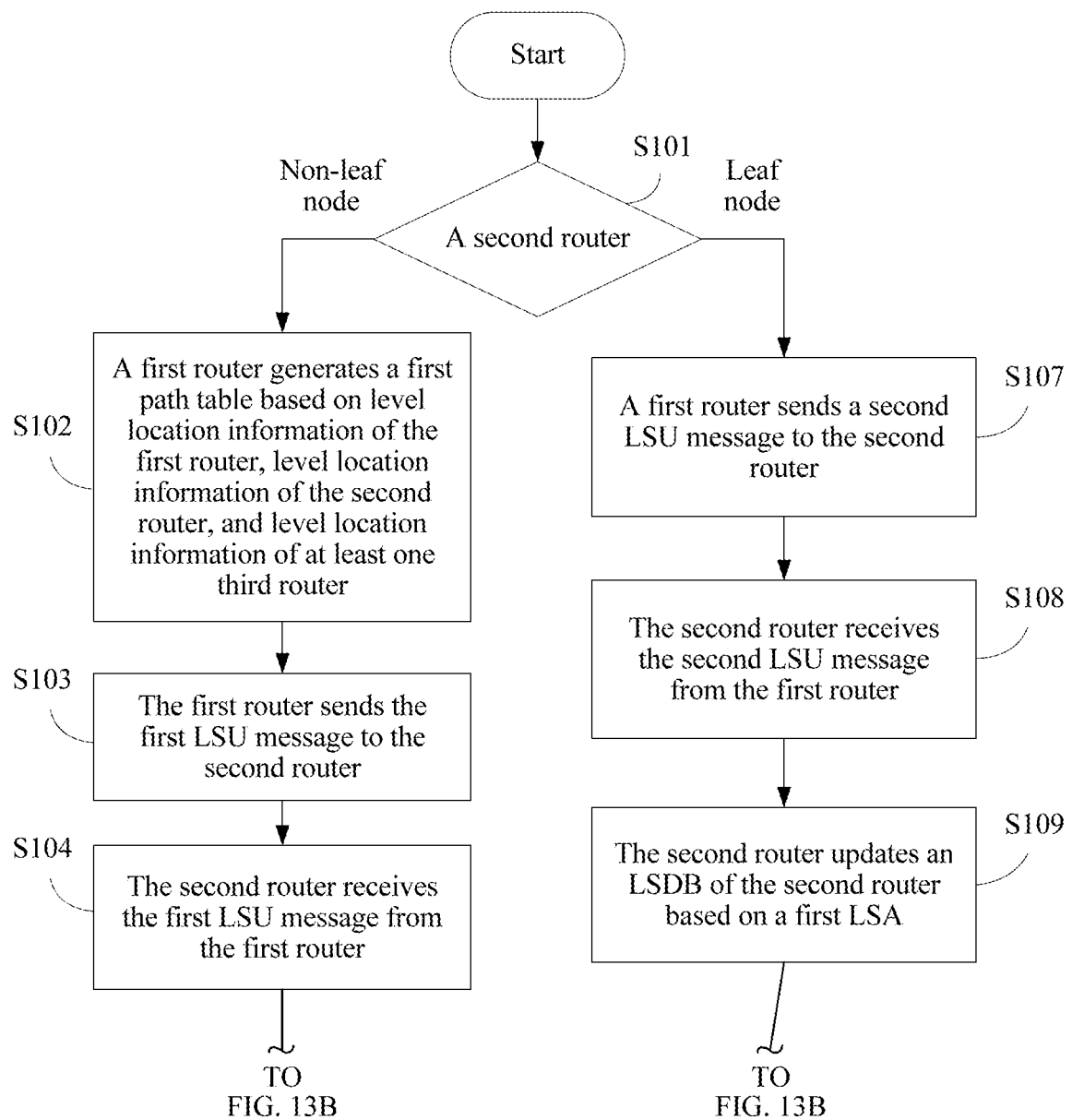
FIG. 13A and FIG. 13B are a seventh schematic flowchart of an LSA sending method according to an embodiment of this application.
Figure 13B:
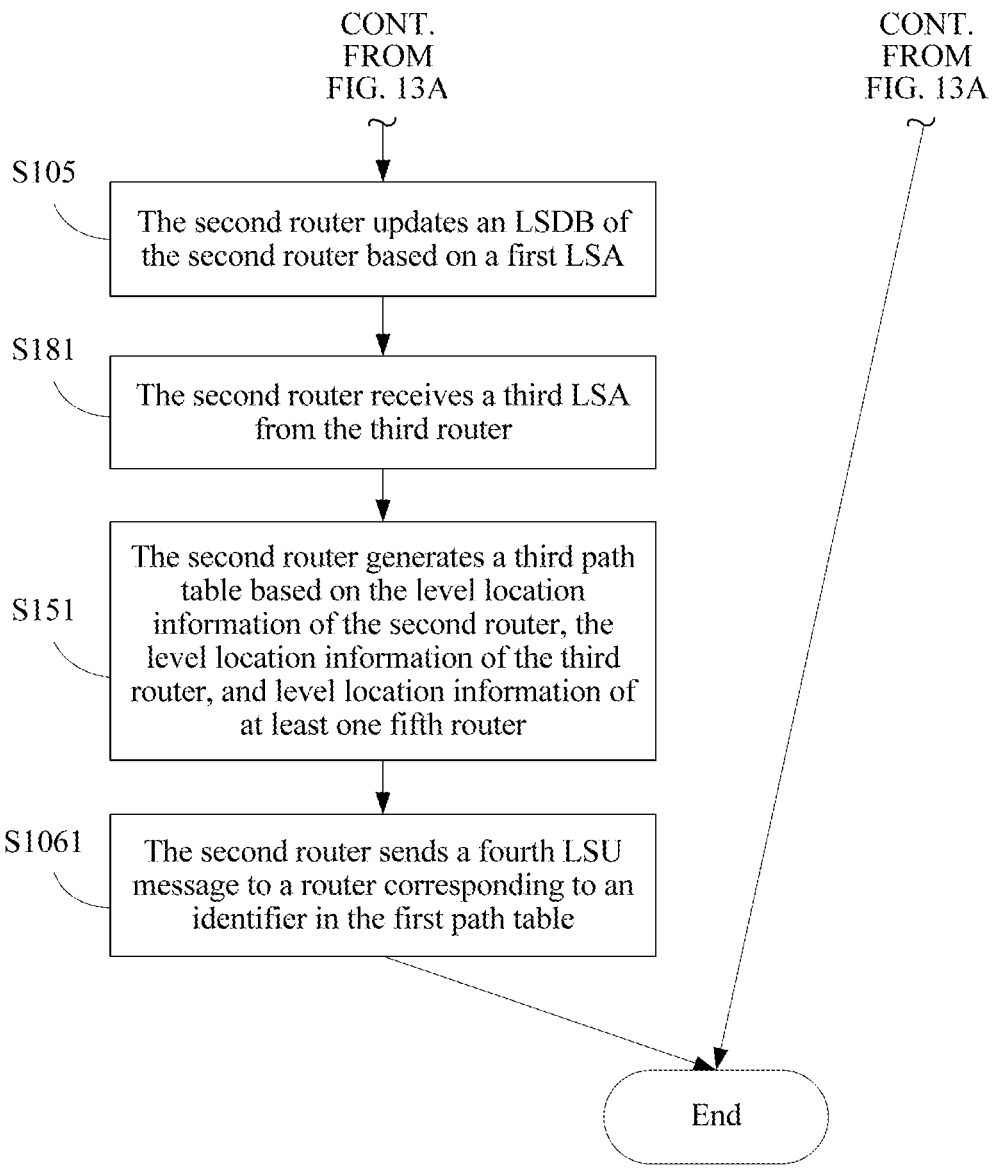

For the level location information of the third router and the level location information of the fifth router obtained by the second router in step S151, optionally, as shown in FIG. 13A and FIG. 13B, before step S151, the method further includes S181.

S181. The second router receives a third LSA from the third router, where the third LSA includes the level location information of the third router and/or the level location information of the at least one fifth router.

This step is similar to S171, and details are not described herein again.

In this implementation, a manner of obtaining, by non-neighbor routers separated by a neighbor router, level location information of each other is provided.

As shown in Table 1, the foregoing method is described below in detail with reference to some specific implementations.

TABLE 1

| Event description | | Level location of an advertisement router | Complete topology | Incomplete topology |
|---|---|---|---|---|
| Periodic update | — | Level_2 | Manner 1 | Manner 2 |
| | | Level_1 | Manner 3 | Manner 4 |
| | | Level_0 | Manner 5 | Manner 6 |
| Event trigger | A link between a router at level_1 and a router at level_2 is faulty. | Level_2 | Manner 7 | Manner 8 |
| | | Level_1 | Manner 7 | Manner 8 |
| | A link between a router at level_1 and a router at level_0 is faulty. | Level_1 | Manner 9 | Manner 10 |
| | A router at level_2 is faulty. | Level_1 | Manner 11 | — |
| | A router at level_1 is faulty. | Level_2 | Manner 12 | — |
| | A router at level_0 is faulty. | Level_1 | Manner 13 | — |

Figure 14:
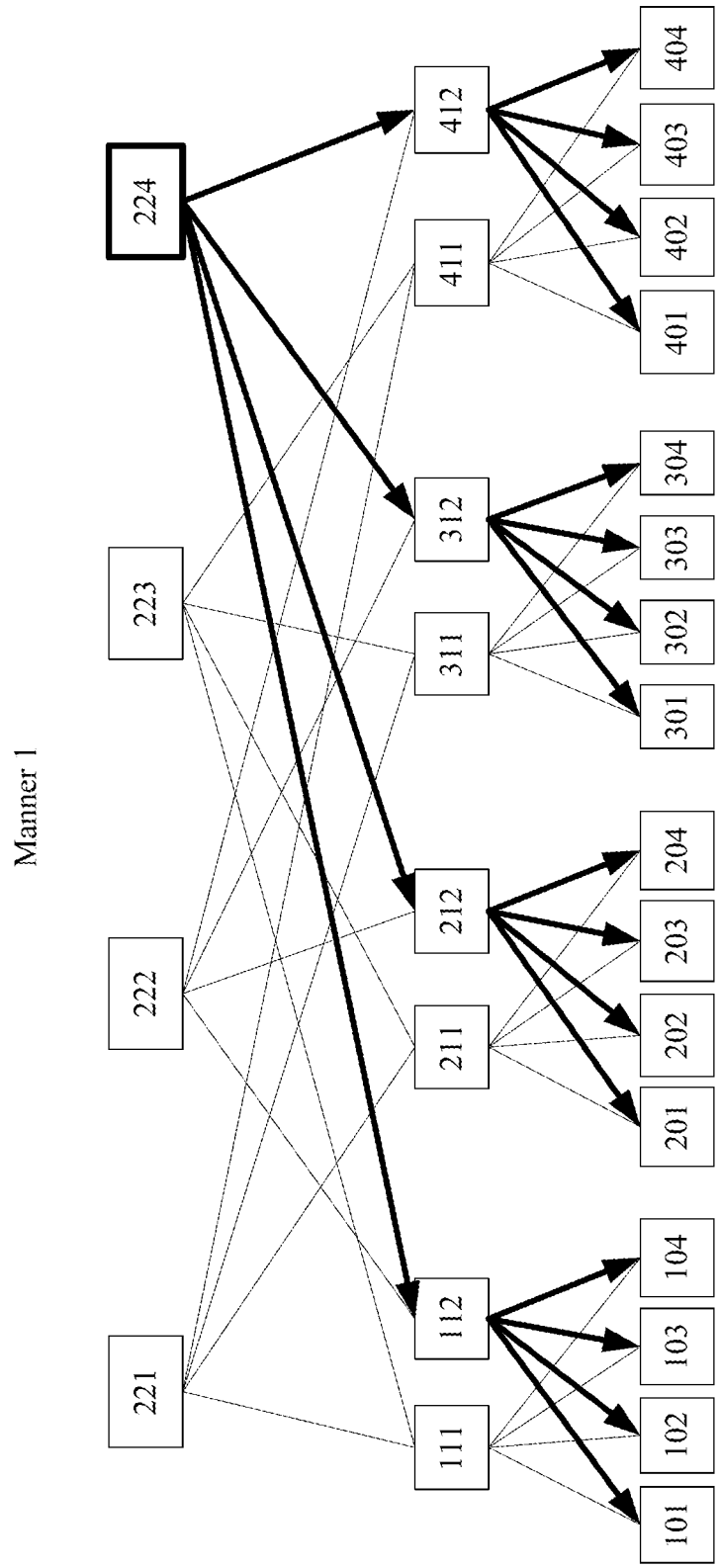
FIG. 14 is a schematic diagram of a process in which periodic LSA update is performed when a router at level_2 in a complete topology serves as an advertisement router according to an embodiment of this application.
Figure 15:
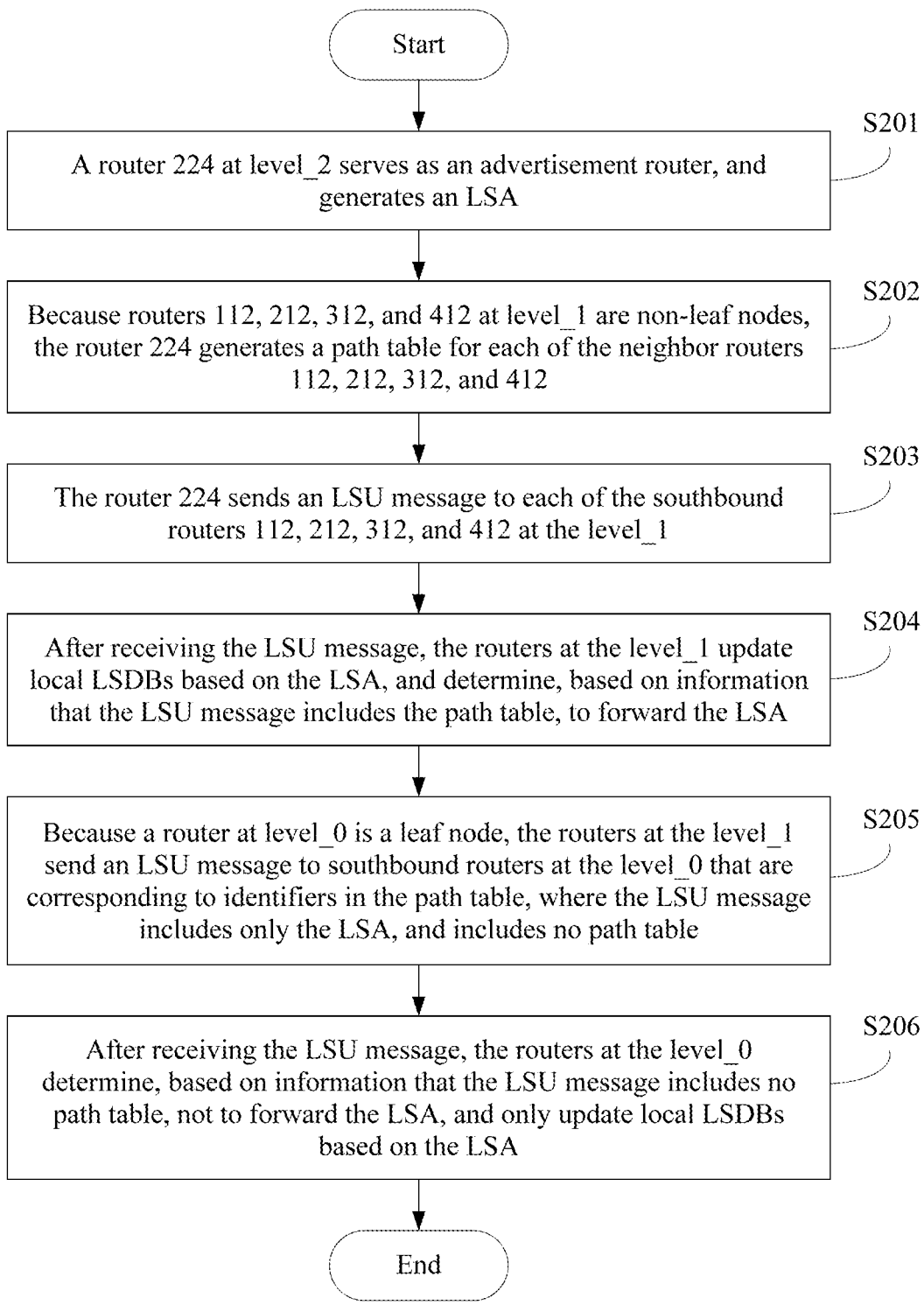
FIG. 15 is an eighth schematic flowchart of an LSA sending method according to an embodiment of this application.

Manner 1: FIG. 14 is a schematic diagram of a process in which periodic LSA update is performed when a router at level_2 in a complete topology serves as an advertisement router. As shown in FIG. 15, the LSA sending method may include the following steps.

S201. A router 224 at level_2 serves as an advertisement router, and generates an LSA.

The LSA includes an identifier of the router 224 and identifiers of routers 112, 212, 312, and 412. The LSA may further include level location information of the router 224 and level location information of the routers 112, 212, 312, and 412.

S202. Because routers 112, 212, 312, and 412 at level_1 are non-leaf nodes, the router 224 generates a path table for each of the neighbor routers 112, 212, 312, and 412.

In other words, a different path table is generated for each of the neighbor routers.

For example, for a path table generated for the router 112, the router 224 needs to generate the path table with reference to information that the router 224 is located at the level_2, the router 112 is located at the level_1, and routers 101 to 104 are located at level_0. The path table includes identifiers of the routers 101 to 104. A method for generating a path table for another neighbor router is similar to this, and details are not described again.

In this case, the router 224 at the level_2 is corresponding to the first router in step S102, the routers 112, 212, 312, and 412 at the level_1 are corresponding to the second router in step S102, and the routers 101 to 104 at the level_0 are corresponding to the third router in step S102.

S203. The router 224 sends an LSU message to each of the southbound routers 112, 212, 312, and 412 at the level_1, where the LSU message includes the LSA and the path table generated for each of the neighbor routers 112, 212, 312, and 412.

In other words, LSU messages sent to all the neighbor routers include a same LSA, but include different path tables.

For example, the path table in an LSU message sent by the router 224 to the router 112 includes the identifiers of the routers 101 to 104, a path table in an LSU message sent by the router 224 to the router 212 includes identifiers of routers 201 to 204, and so on.

In this case, the router 224 at the level_2 is corresponding to the first router in step S103, and the routers 112, 212, 312, and 412 at the level_1 are corresponding to the second router in step S103.

S204. After receiving the LSU message, the routers at the level_1 update local LSDBs based on the LSA, and determine, based on information that the LSU message includes the path table, to forward the LSA.

For example, after receiving the LSU message sent for the router 112, the router 112 updates a local LSDB based on the LSA.

In this case, the routers at the level_1 are corresponding to the second router in step S104 and step S105.

S205. Because a router at level_0 is a leaf node, the routers at the level_1 send an LSU message to southbound routers at the level_0 that are corresponding to identifiers in the path table, where the LSU message includes only the LSA, and includes no path table.

For example, after receiving the LSU message sent for the router 112, the router 112 at the level_1 updates the local LSDB based on the LSA. Because the router at the level_0 is a leaf node, the router 112 sends the LSU message to the routers 101 to 104. The LSU message includes the LSA, and includes no path table.

In this case, the router 112 at the level_1 may be corresponding to the second router in step S106, and the routers at the level_0 are corresponding to the third router in step S106. Alternatively, the router 112 at the level_1 may be corresponding to the first router in step S107, and the routers at the level_0 are corresponding to the second router in step S107.

S206. After receiving the LSU message, the routers at the level_0 determine, based on information that the LSU message includes no path table, not to forward the LSA, and only update local LSDBs based on the LSA.

For example, after separately receiving the LSA in the LSU message, the routers 101 to 104 only update the local LSDBs based on the LSA, and terminate further forwarding of the LSA.

In this case, the routers at the level_0 are corresponding to the second router in S108 and S109.

Technical effects in Manner 1 are as follows:

(1) It is ensured that a router at the level_0 knows routers that are in other pods (Pod), that are at the level_0, and that may be reached by using the router 224 at the level_2.

(2) Routers (including routers 111, 211, 311, and 411) at the level_1 that are not neighbors of the router 224 at the level_2 do not need to receive the LSA sent by the router 224 because routing entries on these routers do not change based on the LSA sent by the router 224, in other words, data packets processed by these routers do not pass through the router 224 at a next hop, and no data packet is directly received from the router 224.

(3) Other routers (including routers 221, 222, and 223) at the level_2 do not need to receive the LSA sent by the router 224 because routing entries on these routers do not change based on the LSA sent by the router 224, in other words, data packets processed by these routers do not pass through the router 224 at a next hop, and no data packet is directly received from the router 224.

In this embodiment, necessary update, in a network, of the LSA generated by the router 224 at the level_2 is ensured, and unnecessary repetition or redundancy is also avoided, thereby greatly reducing a quantity of times of transmitting the LSA in the fat-tree network, and reducing load of processing an LSU message by a router.

Improvements that differ Manner 1 from the prior art are as follows:

(1) It is unnecessary for each router to maintain same LSDB information.

(2) An LSA generated by a router does not necessarily need to be flooded to all other routers.

(3) A router is prevented from repeatedly receiving a same LSA.

Figure 16:
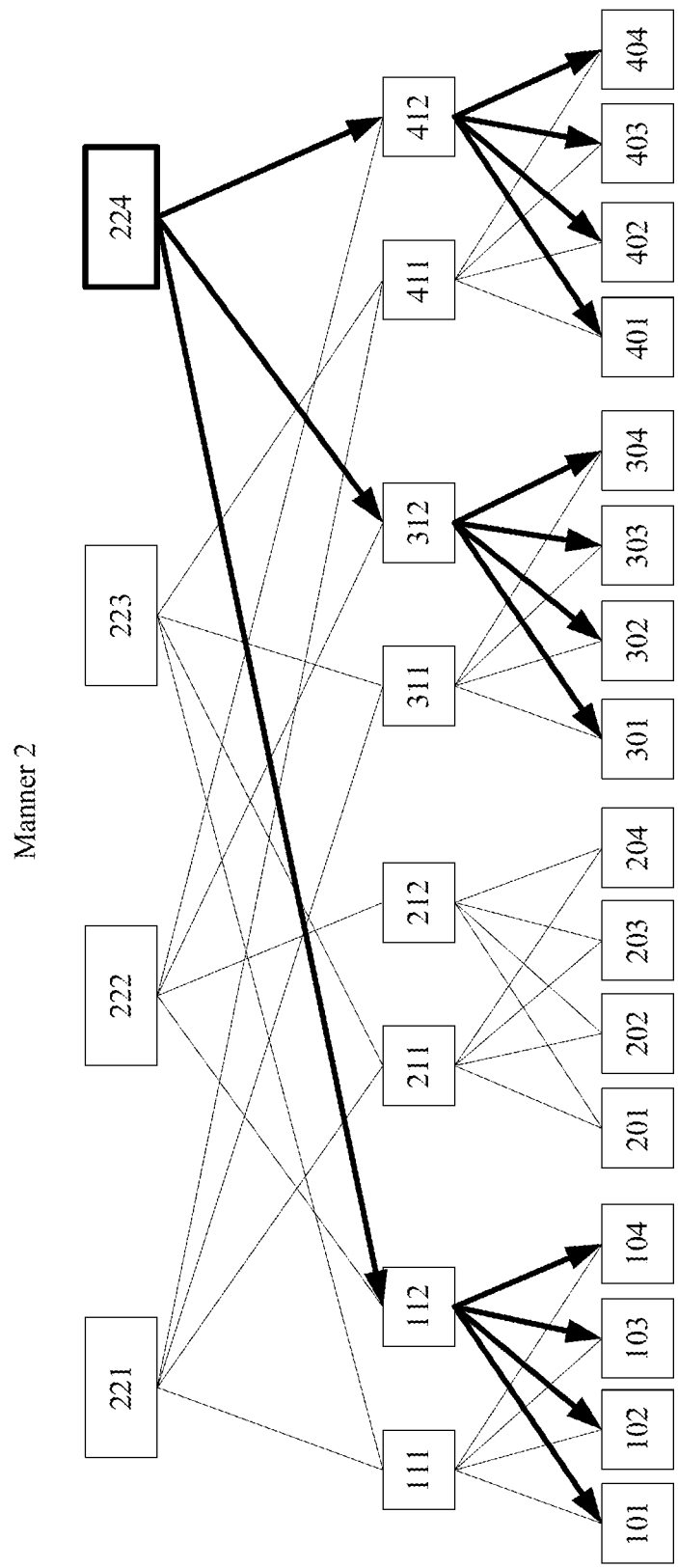
FIG. 16 is a schematic diagram of a process in which periodic LSA update is performed when a router at level_2 in an incomplete topology serves as an advertisement router according to an embodiment of this application.
Figure 17:
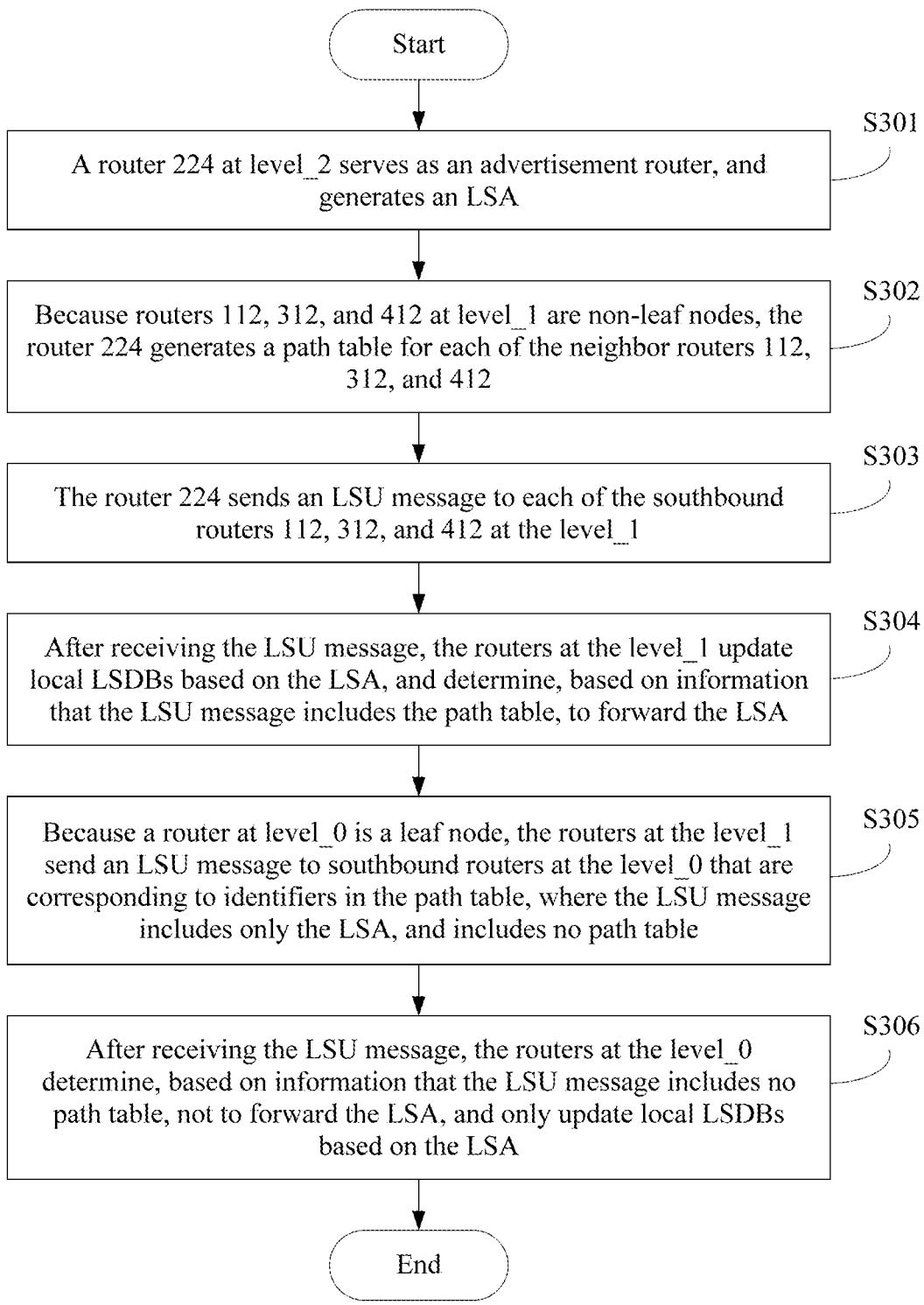
FIG. 17 is a ninth schematic flowchart of an LSA sending method according to an embodiment of this application.

Manner 2: FIG. 16 is a schematic diagram of a process in which periodic LSA update is performed when a router at level_2 in an incomplete topology serves as an advertisement router. In comparison with FIG. 14, there is no link between routers 224 and 212. As shown in FIG. 17, the LSA sending method may include the following steps.

S301. The router 224 at level_2 serves as an advertisement router, and generates an LSA.

The LSA includes an identifier of the router 224 and identifiers of routers 112, 312, and 412. The LSA may further include level location information of the router 224 and level location information of the routers 112, 312, and 412.

S302. Because routers 112, 312, and 412 at level_1 are non-leaf nodes, the router 224 generates a path table for each of the neighbor routers 112, 312, and 412.

A difference between this step and S202 lies in that no path table needs to be generated for the router 212.

S303. The router 224 sends an LSU message to each of the southbound routers 112, 312, and 412 at the level 1, where the LSU message includes the LSA and the path table generated for each of the neighbor routers 112, 312, and 412.

A difference between this step and S203 lies in that no LSU message needs to be sent to the router 212.

S304. After receiving the LSU message, the routers at the level_1 update local LSDBs based on the LSA, and determine, based on information that the LSU message includes the path table, to forward the LSA.

A difference between this step and S204 lies in that the router 212 receives no LSU message, and does not update a local LSDB.

S305. Because a router at level_0 is a leaf node, the routers at the level_1 send an LSU message to southbound routers at the level_0 that are corresponding to identifiers in the path table, where the LSU message includes only the LSA, and includes no path table.

A difference between this step and S205 lies in that the router 212 does not send the LSA to southbound neighbor routers at the level_0.

S306. After receiving the LSU message, the routers at the level_0 determine, based on information that the LSU message includes no path table, not to forward the LSA, and only update local LSDBs based on the LSA.

A difference between this step and S206 lies in that the routers 201 to 204 do not receive the LSA.

Technical effects in Manner 2 are as follows:

(1) It is ensured that a router at the level_0 knows routers that are in other pods (Pod) at the level_0 and that may be reached by using the router 224 at the level_2.

(2) Routers (including routers 201, 202, 203, and 204) at the level_0 that are not next-next-hop neighbors of the router at the level_2 do not need to receive the LSA sent by the router because data packets processed by these routers do not pass through the router 412 at a next-next hop, and no data packet sent from the router 412 is received at a next-next hop, in other words, data packets from these leaf nodes to other pods (Pod) are not forwarded by the router 412.

(3) Routers (including routers 111, 211, 212, 311, and 411) at the level_1 that are not neighbors of the router 224 at the level_2 do not need to receive the LSA sent by the router 224 because routing entries on these routers do not change based on the LSA sent by the router 224, in other words, data packets processed by these routers do not pass through the router 224 at a next hop, and no data packet is directly received from the router 224.

(4) Other routers (including routers 221, 222, and 223) at the level_2 do not need to receive the LSA sent by the router 224 because routing entries on these routers do not change based on the LSA sent by the router 224, in other words, data packets processed by these routers do not pass through the router 224 at a next hop, and no data packet is directly received from the router 224.

In this embodiment, necessary update, in a network, of the LSA generated by the router 224 at the level_2 is ensured, and unnecessary repetition or redundancy is also avoided, thereby greatly reducing a quantity of times of transmitting the LSA in the fat-tree network, and reducing load of processing an LSU message by a router.

For improvements that differ Manner 2 from the prior art, refer to Manner 1. Details are not described herein again.

Figure 18:
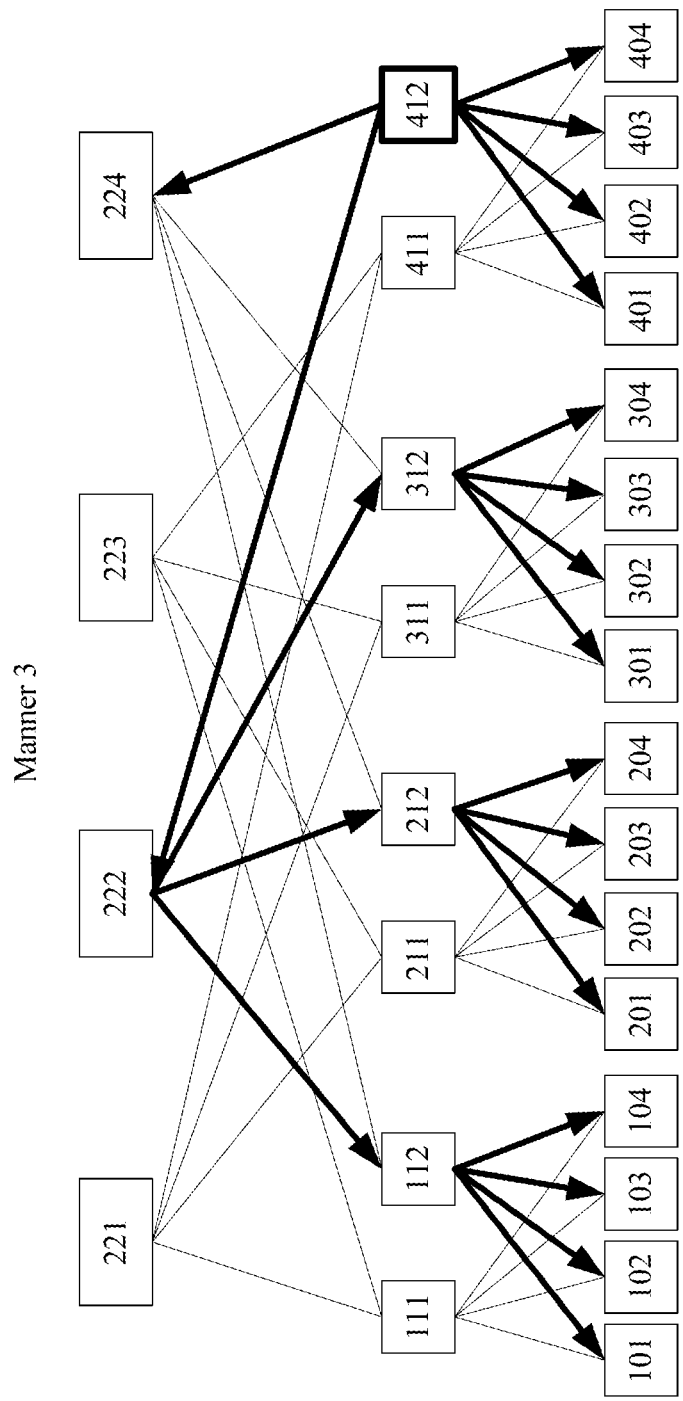
FIG. 18 is a schematic diagram of a process in which periodic LSA update is performed when a router at level_1 in a complete topology serves as an advertisement router according to an embodiment of this application.
Figure 19A:
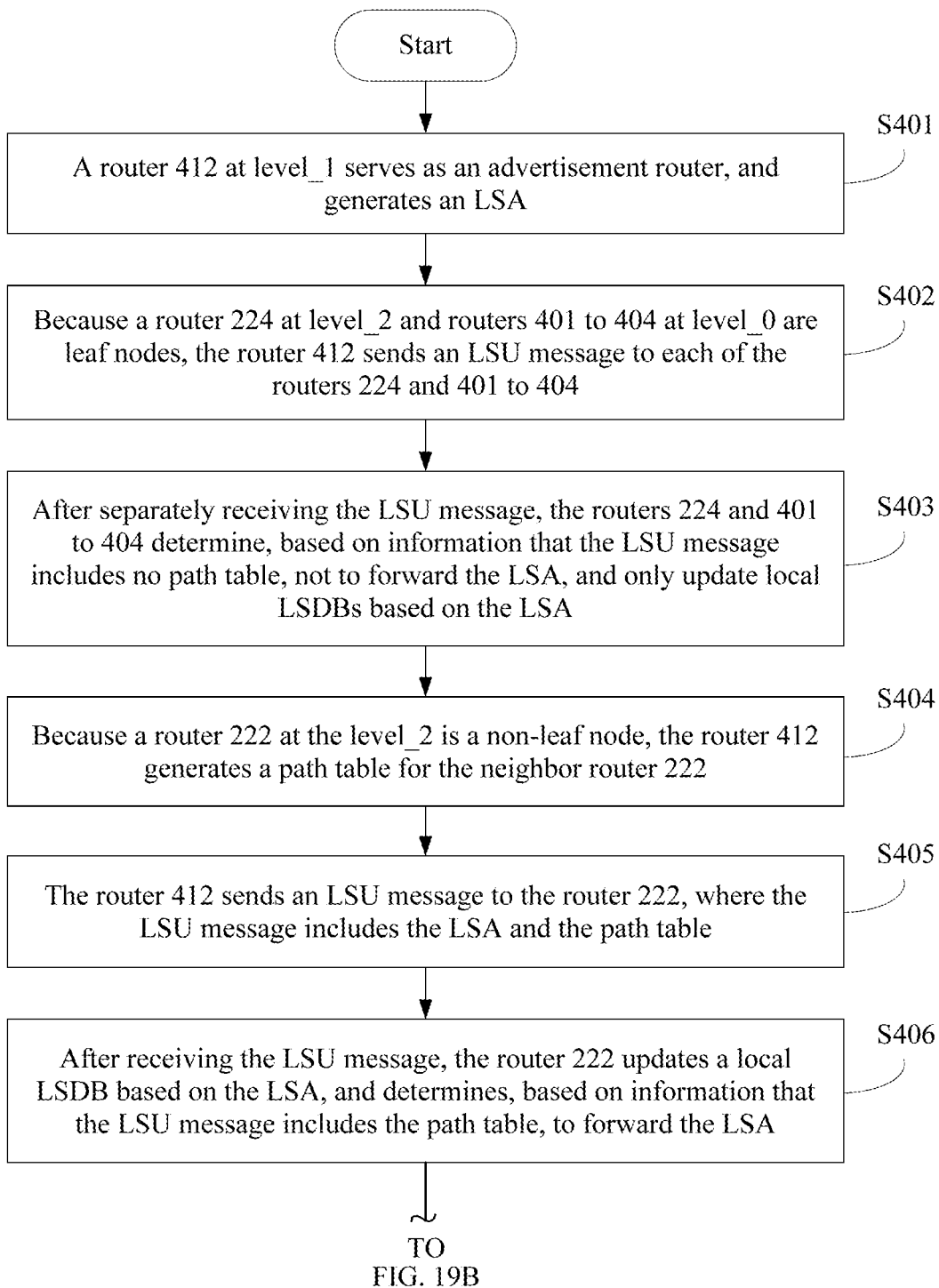
FIG. 19A and FIG. 19B are a tenth schematic flowchart of an LSA sending method according to an embodiment of this application.
Figure 19B:
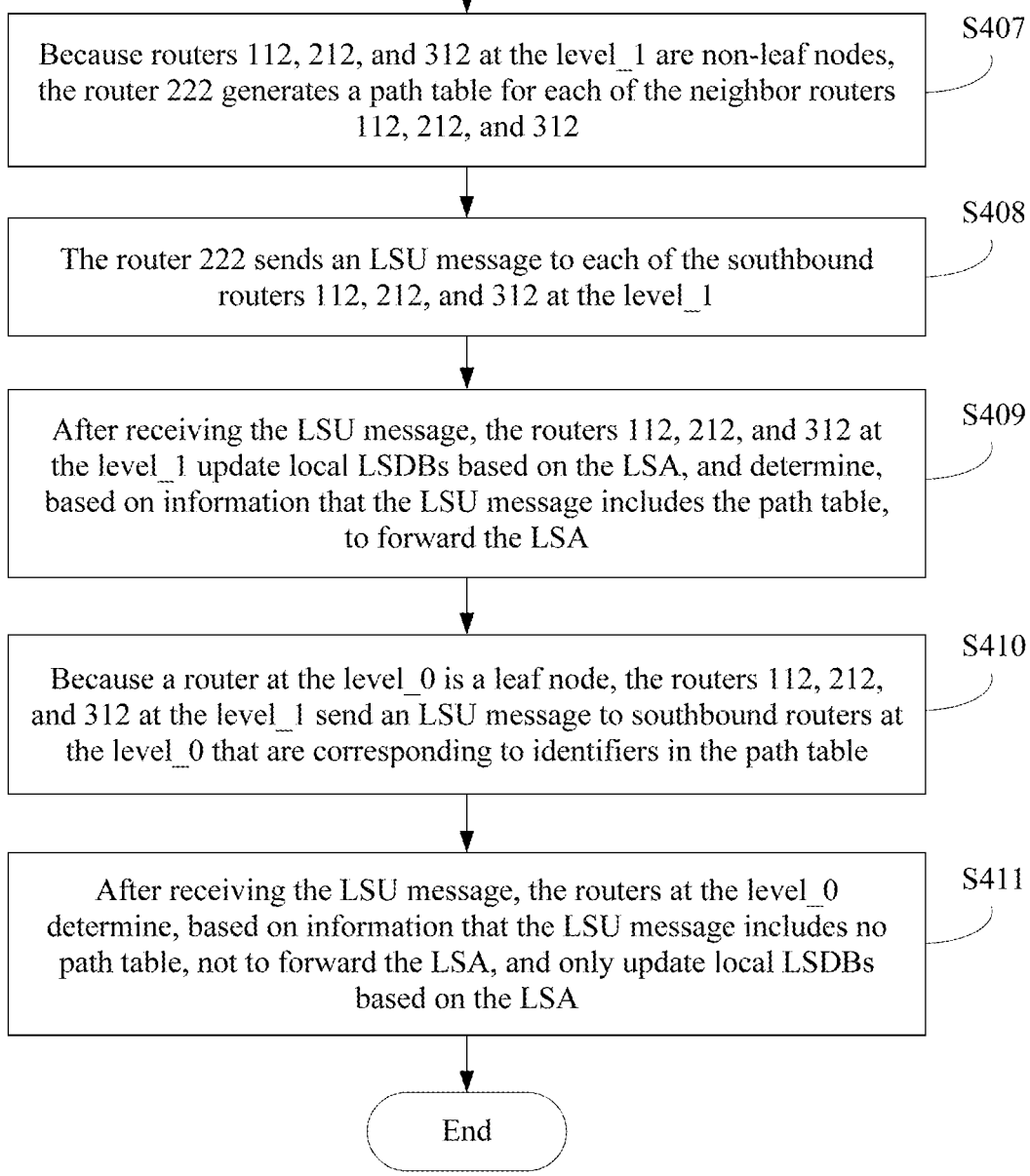

Manner 3: FIG. 18 is a schematic diagram of a process in which periodic LSA update is performed when a router at level_1 in a complete topology serves as an advertisement router. As shown in FIG. 19A and FIG. 19B, the LSA sending method may include the following steps.

S401. A router 412 at level_1 serves as an advertisement router, and generates an LSA.

The LSA includes an identifier of the router 412 and identifiers of routers 224, 222, and 401 to 404. The LSA may further include level location information of the router 412 and level location information of the routers 224, 222, and 401 to 404.

After generating the LSA, the router at the level_1 determines whether the LSA is an LSA update triggered because a link between the router at the level_1 and a northbound router at level_2 is faulty. If the LSA is an LSA update triggered because the link between the router at the level_1 and the router at the level_2 is faulty, the LSA does not need to be sent to the router at the level_2. If the LSA is not an LSA update triggered because the link between the router at the level_1 and the router at the level_2 is faulty, the LSA needs to be sent.

It should be noted that the router 222 is equivalent to the router 224, and therefore one of the routers 222 and 224 may be selected as a leaf node, and the other serves as a non-leaf node.

S402. Because a router 224 at level_2 and routers 401 to 404 at level_0 are leaf nodes, the router 412 sends an LSU message to each of the routers 224 and 401 to 404, where the LSU message includes only the LSA, and includes no path table.

In this case, the router 412 is corresponding to the first router in step S107, and the router 224 at the level_2 and the routers 401 to 404 at the level_0 are corresponding to the second router in step S107.

S403. After separately receiving the LSU message, the routers 224 and 401 to 404 determine, based on information that the LSU message includes no path table, not to forward the LSA, and only update local LSDBs based on the LSA.

In this case, the router 224 at the level_2 and the routers 401 to 404 at the level_0 are corresponding to the second router in step S108 and step S109.

S404. Because a router 222 at the level_2 is a non-leaf node, the router 412 generates a path table for the neighbor router 222.

For example, for the path table generated for the router 222, the router 412 needs to generate the path table with reference to information that the router 412 is located at the level_1, the router 222 is located at the level_2, and routers 112, 212, and 312 are located at the level_1. The path table includes identifiers of the routers 112, 212, and 312.

In this case, the router 412 at the level_1 is corresponding to the first router in step S102, the router 222 at the level_2 is corresponding to the second router in step S102, and the routers 112, 212, and 312 at the level_1 are corresponding to the third router in step S102.

S405. The router 412 sends an LSU message to the router 222, where the LSU message includes the LSA and the path table.

By using the path table, the router 412 instructs the router 222 to further send the received LSA to the southbound neighbor routers 112, 212, and 312 at the level_1 that are of the router 222.

In this case, the router 412 at the level_1 is corresponding to the first router in step S103, and the router 222 at the level_2 is corresponding to the second router in step S103.

S406. After receiving the LSU message, the router 222 updates a local LSDB based on the LSA, and determines, based on information that the LSU message includes the path table, to forward the LSA.

In this case, the router 222 at the level_2 is corresponding to the second router in step S104 and step S105.

S407. Because routers 112, 212, and 312 at the level_1 are non-leaf nodes, the router 222 generates a path table for each of the neighbor routers 112, 212, and 312.

For example, for a path table generated for the router 112, the router 222 needs to generate the path table with reference to information that the router 222 is located at the level_2, the router 112 is located at the level_1, and routers 101 to 104 are located at the level_0. The path table includes identifiers of the routers 101 to 104. A method for generating a path table for another neighbor router is similar to this, and details are not described again.

In this case, the router 222 at the level_2 is corresponding to the first router in step S102, the routers 112, 212, and 312 at the level_1 are corresponding to the second router in step S102, and the routers at the level_0 are corresponding to the third router in step S102.

S408. The router 222 sends an LSU message to each of the southbound routers 112, 212, and 312 at the level 1, where the LSU message includes the LSA and the path table generated for each of the neighbor routers 112, 212, and 312.

In this case, the router 222 at the level_2 is corresponding to the first router in step S103, and the routers 112, 212, and 312 at the level_1 are corresponding to the second router in step S103.

S409. After separately receiving the LSU message, the routers 112, 212, and 312 at the level_1 update local LSDBs based on the LSA, and determine, based on information that the LSU message includes the path table, to forward the LSA.

In this case, the routers 112, 212, and 312 at the level_1 are corresponding to the second router in step S104 and step S105.

S410. Because a router at the level_0 is a leaf node, the routers 112, 212, and 312 at the level_1 send an LSU message to southbound routers at the level_0 that are corresponding to identifiers in the path table, where the LSU message includes only the LSA, and includes no path table.

In this case, the routers 112, 212, and 312 at the level_1 are corresponding to the second router in step S106, and the routers at the level_0 are corresponding to the third router in step S106. Alternatively, the routers 112, 212, and 312 at the level_1 are corresponding to the first router in step S107, and the routers at the level_0 are corresponding to the second router in step S107.

S411. After receiving the LSU message, the routers at the level_0 determine, based on information that the LSU message includes no path table, not to forward the LSA, and only update local LSDBs based on the LSA.

In this case, the routers at the level_0 are corresponding to the second router in S108 and S109.

Technical effects in Manner 3 are as follows.

(1) It is ensured that a router at the level_0 knows latest status information of a router at the level_1, so as to adjust a routing entry from the router at the level_0 to another router at the level_0.

(2) Routers (including routers 221 and 223) at the level_2 that are not neighbors of the router 412 at the level_1 do not need to receive the LSA sent by the router 412 because routing entries on these routers do not change based on the LSA sent by the router 412, in other words, data packets processed by these routers do not pass through the router 412 at a next hop, and no data packet is directly received from the router 412.

(3) Routers (for example, routers 111, 211, and 311) at the level_1 that are not next-next-hop routers of the router 412 do not need to receive the LSA generated by the router 412 because routing entries on these nodes do not change based on the LSA generated by the router 412, in other words, data packets processed by these routers do not pass through the router 412 at a next-next hop, and no data packet sent from the router 412 is received at a next-next hop. Although a router 411 is a next-next-hop node of the router 412 in the topology, traffic in a pod (Pod)$_4$ actually is not transmitted in a roundabout manner of passing through a router at the level_0, the router 411, a router at the level_0, the router 412, and a router at the level_0. The traffic between routers at the level_0 in the pod (Pod)$_4$ is forwarded only by the router 411 or the router 412. Therefore, the router 411 does not need to receive the LSA generated by the router 412.

In this embodiment, necessary update, in a network, of the LSA generated by the router 412 at the level_1 is ensured, and unnecessary repetition/redundancy is also avoided, thereby greatly reducing a quantity of times of transmitting the LSA in the fat-tree network, and reducing load of processing an LSU message by a router.

For improvements that differ Manner 3 from the prior art, refer to Manner 1. Details are not described herein again.

Figure 20:
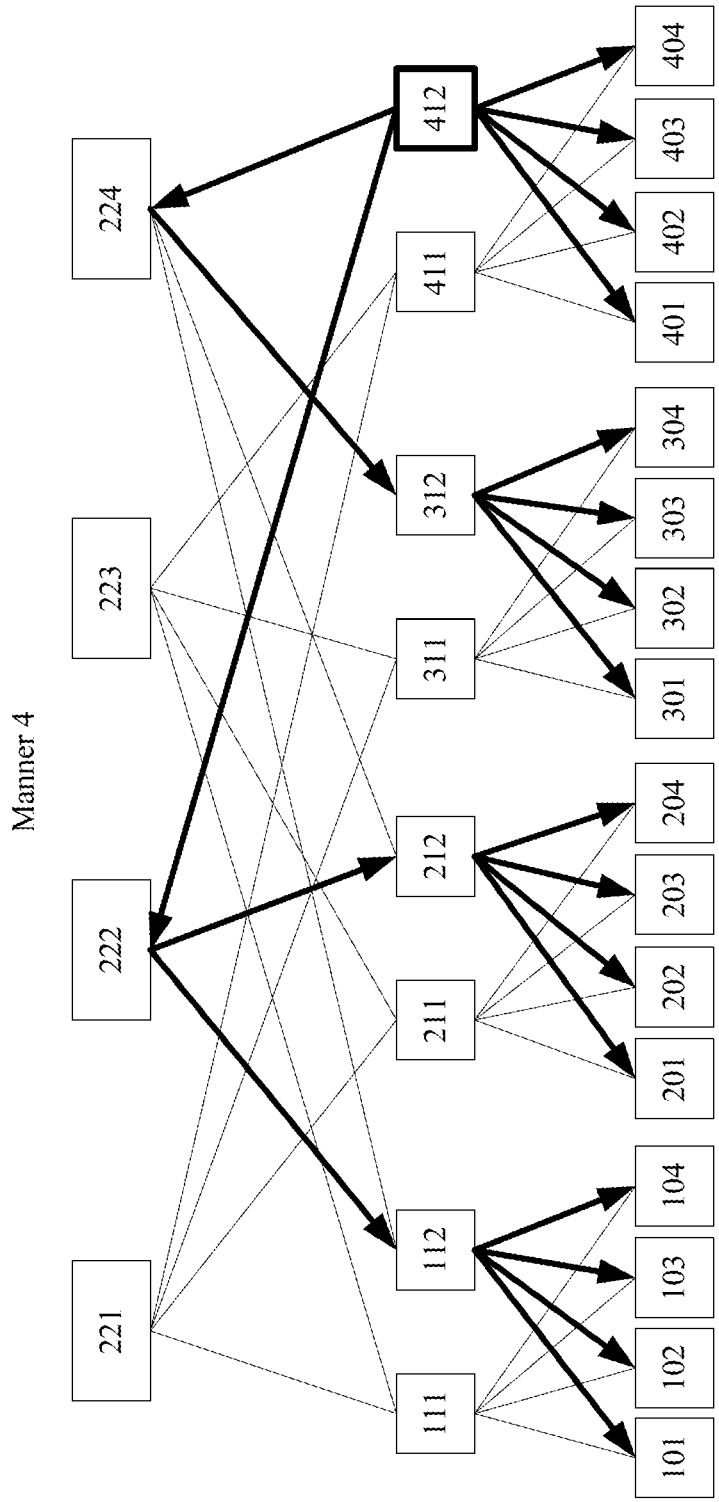
FIG. 20 is a schematic diagram of a process in which periodic LSA update is performed when a router at level_1 in an incomplete topology serves as an advertisement router according to an embodiment of this application.
Figure 21A:
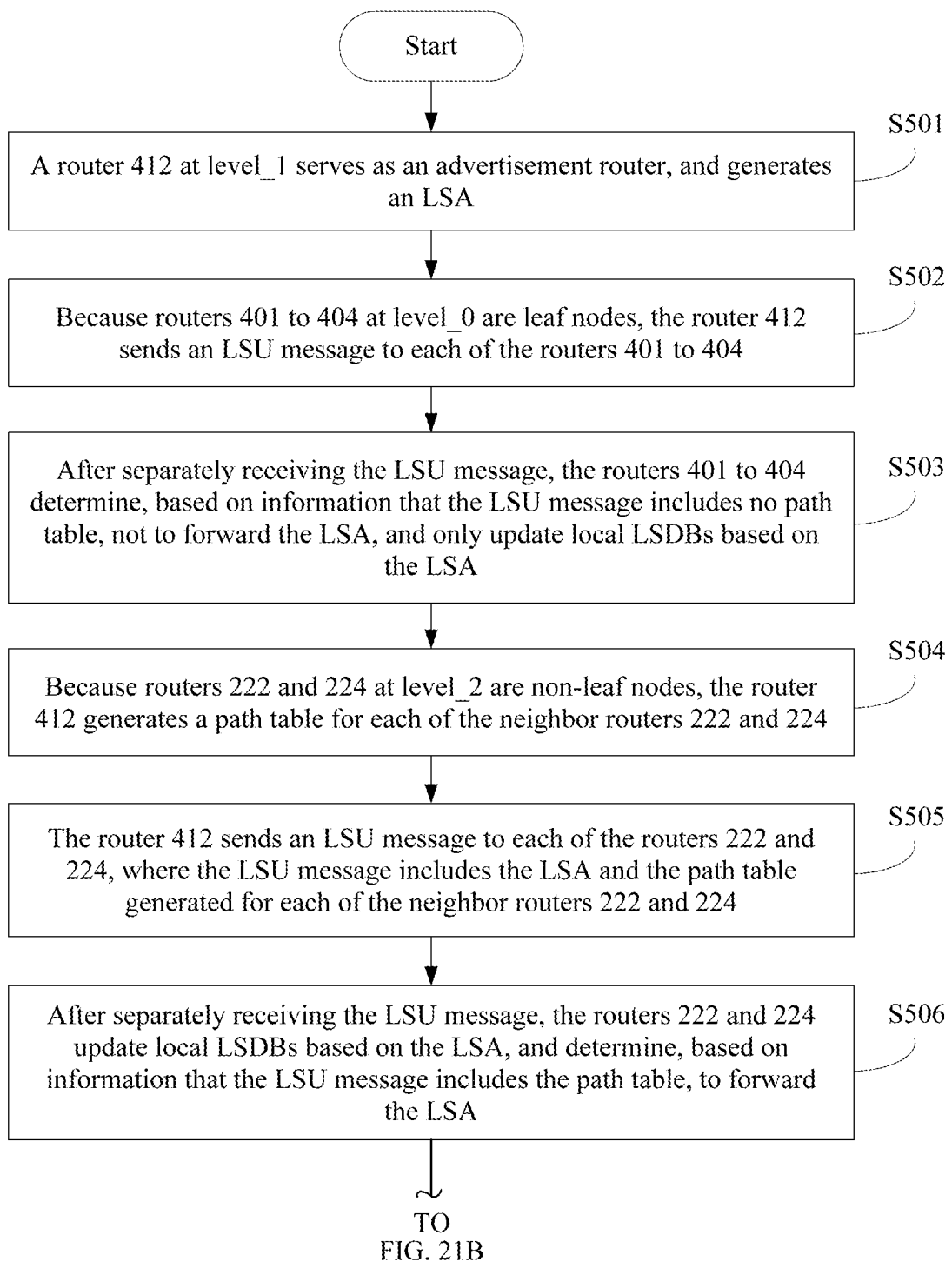

Manner 4: FIG. 20 is a schematic diagram of a process in which periodic LSA update is performed when a router at level_1 in an incomplete topology serves as an advertisement router. In comparison with FIG. 18, there is no link between routers 222 and 312. As shown in FIG. 21A and FIG. 21B, the LSA sending method may include the following steps.

S501. A router 412 at level_1 serves as an advertisement router, and generates an LSA.

This step is similar to S401, and details are not described herein again.

S502. Because routers 401 to 404 at level_0 are leaf nodes, the router 412 sends an LSU message to each of the routers 401 to 404, where the LSU message includes only the LSA, and includes no path table.

A difference between this step and S402 lies in that because there is no link between the routers 222 and 312, and there is a link only between routers 224 and 312, the router 224 serves as a non-leaf node.

S503. After separately receiving the LSU message, the routers 401 to 404 determine, based on information that the LSU message includes no path table, not to forward the LSA, and only update local LSDBs based on the LSA.

A difference between this step and S403 lies in that in this case, the router 224 does not receive the LSU message.

S504. Because routers 222 and 224 at level_2 are non-leaf nodes, the router 412 generates a path table for each of the neighbor routers 222 and 224.

A difference between this step and S404 lies in that in this case, the router 412 further needs to generate a path table for the router 224.

S505. The router 412 sends an LSU message to each of the routers 222 and 224, where the LSU message includes the LSA and the path table generated for each of the neighbor routers 222 and 224.

A difference between this step and S405 lies in that in this case, the LSU message sent by the router 412 to the router 224 includes the path table.

S506. After separately receiving the LSU message, the routers 222 and 224 update local LSDBs based on the LSA, and determine, based on information that the LSU message includes the path table, to forward the LSA.

A difference between this step and S406 lies in that in this case, the router 224 receives the LSU message.

S507. Because routers 112, 212, and 312 at the level_1 are non-leaf nodes, the router 222 generates a path table for each of the neighbor routers 112 and 212, and the router 224 generates a path table for the neighbor router 312.

A difference between this step and S407 lies in that in this case, the router 312 is a next hop of the router 224.

S508. The router 222 sends an LSU message to each of the southbound routers 112 and 212 at the level_1, where the LSU message includes the LSA and the path table generated for each of the neighbor routers 112 and 212, and the router 224 sends an LSU message to the southbound router 312 at the level_1, where the LSU message includes the LSA and the path table generated for the neighbor router 312.

A difference between this step and S408 lies in that in this case, the router 312 is a next hop of the router 224.

Steps S509 to S511 are the same as steps S409 to S411, and details are not described herein again.

Technical effects in Manner 4 are as follows:

(1) It is ensured that a router at the level_0 knows latest status information of a router at the level_1, so as to adjust a routing entry from the router at the level_0 to another router at the level_0.

(2) Routers (including routers 221 and 223) at the level_2 that are not neighbors of the router 412 at the level_1 do not need to receive the LSA sent by the router 412 because routing entries on these routers do not change based on the LSA sent by the router 412, in other words, data packets processed by these routers do not pass through the router 412 at a next hop, and no data packet is directly received from the router 412.

(3) Routers (for example, routers 111, 211, and 311) at the level_1 that are not next-next-hop routers of the router 412 do not need to receive the LSA generated by the router 412 because routing entries on these routers do not change based on the LSA generated by the router 412, in other words, data packets processed by these routers do not pass through the router 412 at a next-next hop, and no data packet sent from the router 412 is received at a next-next hop. Although a router 411 is a next-next-hop router of the router 412 in the topology, traffic in a pod $(Pod)_4$ actually is not transmitted in a roundabout manner of passing through a router at the level_0, the router 411, a router at the level_0, the router 412, and a router at the level_0. The traffic between routers at the level_0 in the pod $(Pod)_4$ is forwarded only by the router 411 or the router 412. Therefore, the router 411 does not need to receive the LSA generated by the router 412.

In this embodiment, necessary update, in a network, of the LSA generated by the router 412 at the level_1 is ensured, and unnecessary repetition or redundancy is also avoided, thereby greatly reducing a quantity of times of transmitting the LSA in the fat-tree network, and reducing load of processing an LSU message by a router.

For improvements that differ Manner 4 from the prior art, refer to Manner 1. Details are not described herein again.

Figure 22:
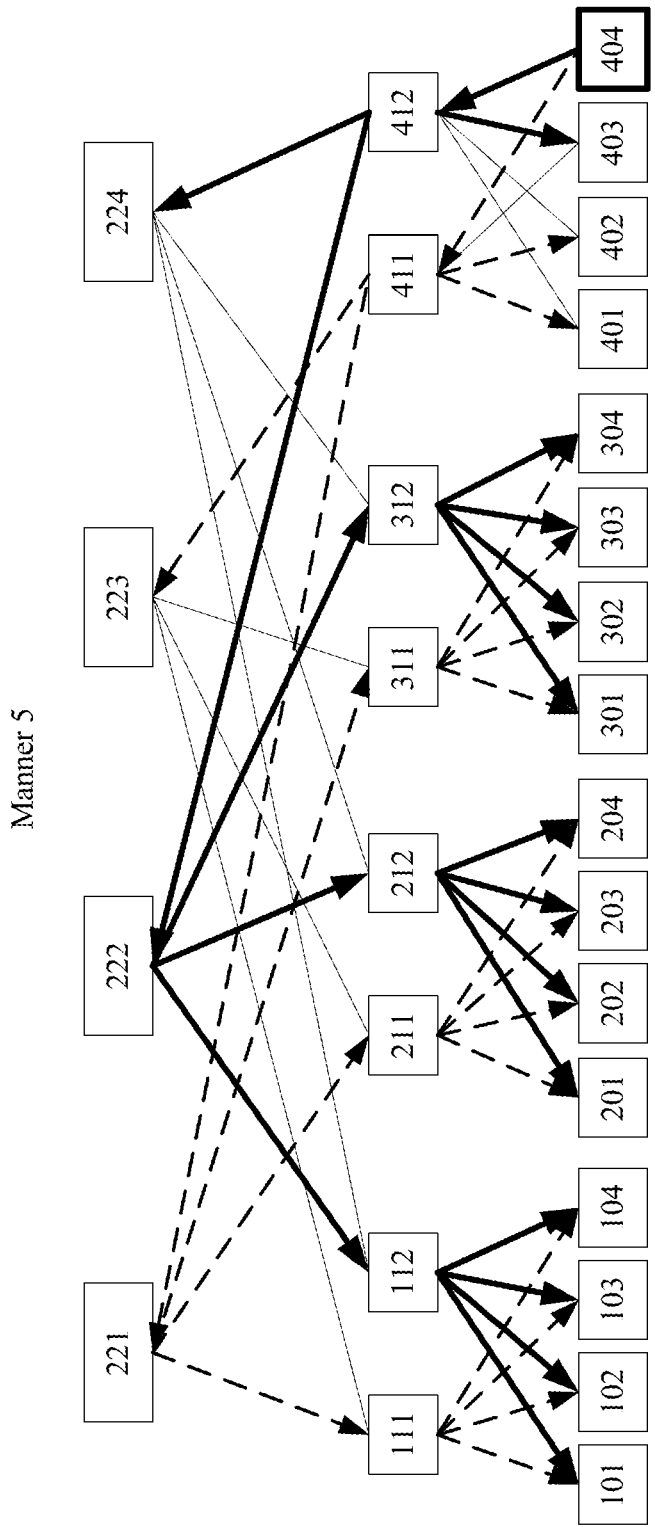
FIG. 22 is a schematic diagram of a process in which periodic LSA update is performed when a router at level_0 in a complete topology serves as an advertisement router according to an embodiment of this application.
Figure 23A:
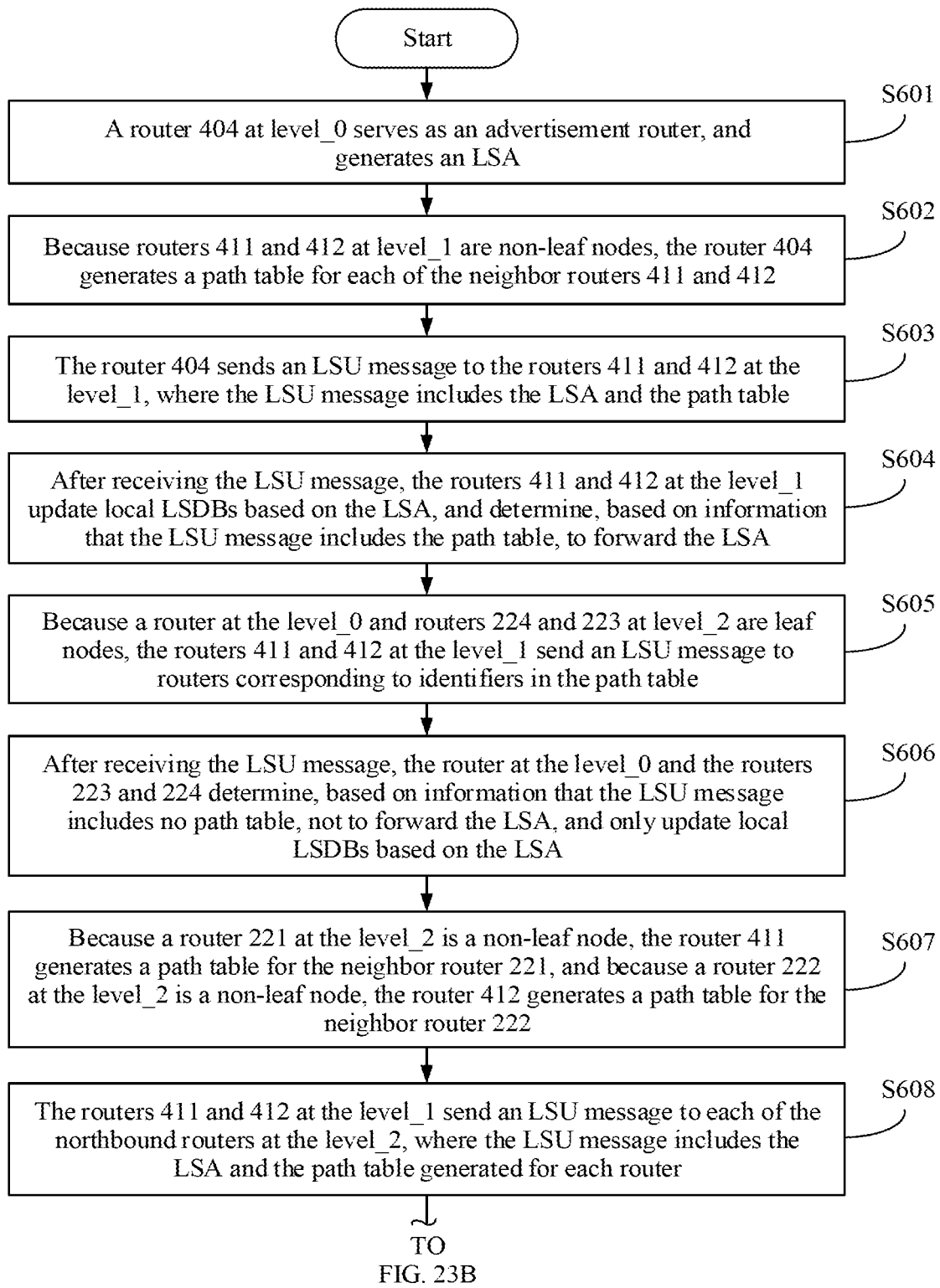

Manner 5: FIG. 22 is a schematic diagram of a process in which periodic LSA update is performed when a router at level_0 in a complete topology serves as an advertisement router. As shown in FIG. 23A and FIG. 23B, the LSA sending method may include the following steps.

S601. A router 404 at level_0 serves as an advertisement router, and generates an LSA.

The LSA includes an identifier of the router 404 and identifiers of routers 411 and 412. The LSA may further include level location information of the router 404 and level location information of the routers 411 and 412.

S602. Because routers 411 and 412 at level_1 are non-leaf nodes, the router 404 generates a path table for each of the neighbor routers 411 and 412.

For example, for a path table generated for the router 412, the router 404 needs to generate the path table with reference to information that the router 404 is located at the level_0, the router 412 is located at the level 1, routers 222 and 224 are located at level_2, and a router 403 is located at the level_0. The path table includes identifiers of the routers 222, 224, and 403.

In this case, the router 404 at the level_0 is corresponding to the first router in step S102, the router 411 at the level_1 is corresponding to the second router in step S102, routers 221 and 223 at the level_2 and routers 401 and 402 at the level_0 are corresponding to the third router in step S102, the router 412 at the level_1 is corresponding to the second router in step S102, and the routers 222 and 224 at the level_2 and the router 403 at the level_0 are corresponding to the third router in step S102.

It should be noted that the routers 401 to 403 are equivalent, and the routers 411 and 412 are equivalent, and therefore, the routers 401 to 403 and the routers 411 and 412 are randomly combined. For example, the routers 401 to 403 may be combined with the router 411. Alternatively, the routers 401 and 403 are combined with the router 411, and the router 402 is combined with the router 422. The router 222 is equivalent to the router 224, and therefore one of the routers 222 and 224 may be selected as a leaf node, and the other serves as a non-leaf node. The router 221 is equivalent to the router 223, and therefore one of the routers 221 and 223 may be selected as a leaf node, and the other serves as a non-leaf node.

S603. The router 404 sends an LSU message to the routers 411 and 412 at level 1, where the LSU message includes the LSA and the path table.

By using the path table, the router 404 instructs the router 411 to further send the received LSA to the northbound neighbor routers 221 and 223 at the level_2 and the southbound neighbor routers 401 and 402 of the router 404 at the level_0, and the router 404 instructs the router 412 to further send the received LSA to the southbound neighbor router 403 at the level_0 and the northbound neighbor routers 222 and 224 of the router 404 at the level_2.

In this case, the router 404 at the level_0 is corresponding to the first router in step S103, the routers 411 and 412 at the level_1 are corresponding to the second router in step S103, and the routers 221 to 224 at the level_2 and the routers 401 to 403 at the level_0 are corresponding to the third router in step S103.

S604. After receiving the LSU message, the routers 411 and 412 at the level_1 update local LSDBs based on the LSA, and determine, based on information that the LSU message includes the path table, to forward the LSA.

In this case, the routers 411 and 412 at the level_1 are corresponding to the second router in step S104 and step S105.

S605. Because a router at the level_0 and routers 224 and 223 at level_2 are leaf nodes, the routers 411 and 412 at the level_1 send an LSU message to routers corresponding to identifiers in the path table, where the LSU message includes only the LSA, and includes no path table.

The router 411 at the level_1 sends the LSU message to the routers 401 and 402 and the northbound router 223 at the level_2 that are corresponding to the identifiers in the path table. The LSU message includes only the LSA, and includes no path table. The router 412 at the level_1 sends the LSU message to the southbound router 403 at the level_0 and the northbound router 224 at the level_2 that are corresponding to the identifiers in the path table. The LSU message includes only the LSA, and includes no path table.

In this case, the routers 411 and 412 at the level_1 are corresponding to the second router in step S106, and the routers 401 to 403 at the level_0 and the routers 224 and 223 at the level_2 are corresponding to the third router in step S106. Alternatively, the routers 411 and 412 at the level_1 are corresponding to the first router in step S107, and the routers 401 to 403 at the level_0 and the routers 224 and 223 at the level_2 are corresponding to the second router in step S107.

S606. After receiving the LSU message, the router at the level_0 and the routers 223 and 224 determine, based on information that the LSU message includes no path table, not to forward the LSA, and only update local LSDBs based on the LSA.

In this case, the router at the level_0 and the routers 223 and 224 are corresponding to the second router in S108 and S109.

S607. Because a router 221 at the level_2 is a non-leaf node, the router 411 generates a path table for the neighbor router 221, and because a router 222 at the level_2 is a non-leaf node, the router 412 generates a path table for the neighbor router 222.

For example, for the path table generated for the router 222, the router 412 needs to generate the path table with reference to information that the router 412 is located at the level_1, the router 222 is located at the level_2, and routers 112, 212, and 312 are located at the level_1. The path table includes identifiers of the routers 112, 212, and 312. A method for generating a path table for another neighbor router is similar to this, and details are not described again.

In this case, the routers 411 and 412 at the level_1 are corresponding to the first router in step S102, the routers 221 and 222 at the level_2 are corresponding to the second router in step S102, and the router at the level_1 is corresponding to the third router in step S103.

S608. The routers 411 and 412 at the level_1 send an LSU message to each of the northbound routers at the level_2, where the LSU message includes the LSA and the path table generated for each router.

The router 411 at the level_1 sends the LSU message to the northbound router 221 at the level_2. The LSU message includes the LSA and the path table generated for the neighbor router 221. The router 412 at the level_1 sends the LSU message to the northbound router 222 at the level_2. The LSU message includes the LSA and the path table generated for the neighbor router 222.

In this case, the routers 411 and 412 at the level_1 are corresponding to the first router in step S103, and the routers 221 and 222 at the level_2 are corresponding to the second router in step S103.

S609. After receiving the LSU message, the routers 221 and 222 at the level_2 update local LSDBs based on the LSA, and determine, based on information that the LSU message includes the path table, to forward the LSA.

In this case, the routers 221 and 222 at the level_2 are corresponding to the second router in step S104 and step S105.

S610. Because routers 112, 211, and 311 at the level_1 are non-leaf nodes, the router 221 generates a path table for neighbor routers 111, 211, and 311, and the router 222 generates a path table for neighbor routers 112, 212, and 312.

In this case, the routers 221 and 222 at the level_2 are corresponding to the first router in step S102, the routers 112, 211, and 311 at the level_1 are corresponding to the second router in step S102, and a router at the level_0 is corresponding to the third router in step S102.

S611. The router 221 at the level_2 sends an LSU message to each of the southbound routers 111, 211, and 311 at the level_1, where the LSU message includes the LSA and the path table generated for each of the neighbor routers 111, 211, and 311, and the router 222 at the level_2 sends an LSU message to each of the southbound routers 112, 212, and 312 at the level_1, where the LSU message includes the LSA and a path table generated for the neighbor router 112.

In this case, the routers 221 and 222 at the level_2 are corresponding to the first router in step S103, and the routers 111, 211, 311, 112, 212, and 312 at the level_1 are corresponding to the second router in step S103.

S612. After receiving the LSU message, the routers 111, 211, 311, 112, 212, and 312 at the level_1 update local LSDBs based on the LSA, and determine, based on information that the LSU message includes the path table, to forward the LSA.

In this case, the routers 111, 211, 311, 112, 212, and 312 at the level_1 are corresponding to the second router in step S104 and step S105.

S613. Because a router at the level_0 is a leaf node, the routers 111, 211, 311, 112, 212, and 312 at the level_1 send an LSU message to southbound routers at the level_0 that are corresponding to identifiers in the path table, where the LSU message includes only the LSA, and includes no path table.

In this case, the routers 111, 211, 311, 112, 212, and 312 at the level_1 are corresponding to the second router in step S106, and the routers at the level_0 are corresponding to the third router in step S106. Alternatively, the routers 111, 211, 311, 112, 212, and 312 at the level_1 are corresponding to the first router in step S107, and the routers at the level_0 are corresponding to the second router in step S107.

S614. After receiving the LSU message, the routers at the level_0 determine, based on information that the LSU message includes no path table, not to forward the LSA, and only update local LSDBs based on the LSA.

In this case, the router at the level_0 is corresponding to the second router in S108 and S109.

Technical effects in Manner 5 are as follows:

It is ensured that another router at the level_0 knows latest status information of a router, serving as the advertisement router, at the level_0, so as to adjust a routing entry from the another router to another router at the level_0.

In this embodiment, necessary update, in a network, of the LSA generated by the router 404 at the level_0 is ensured, and unnecessary repetition or redundancy is also avoided, thereby greatly reducing a quantity of times of transmitting the LSA in the fat-tree network, and reducing load of processing an LSU message by a router.

For improvements that differ Manner 5 from the prior art, refer to Manner 1. Details are not described herein again.

Figure 24:
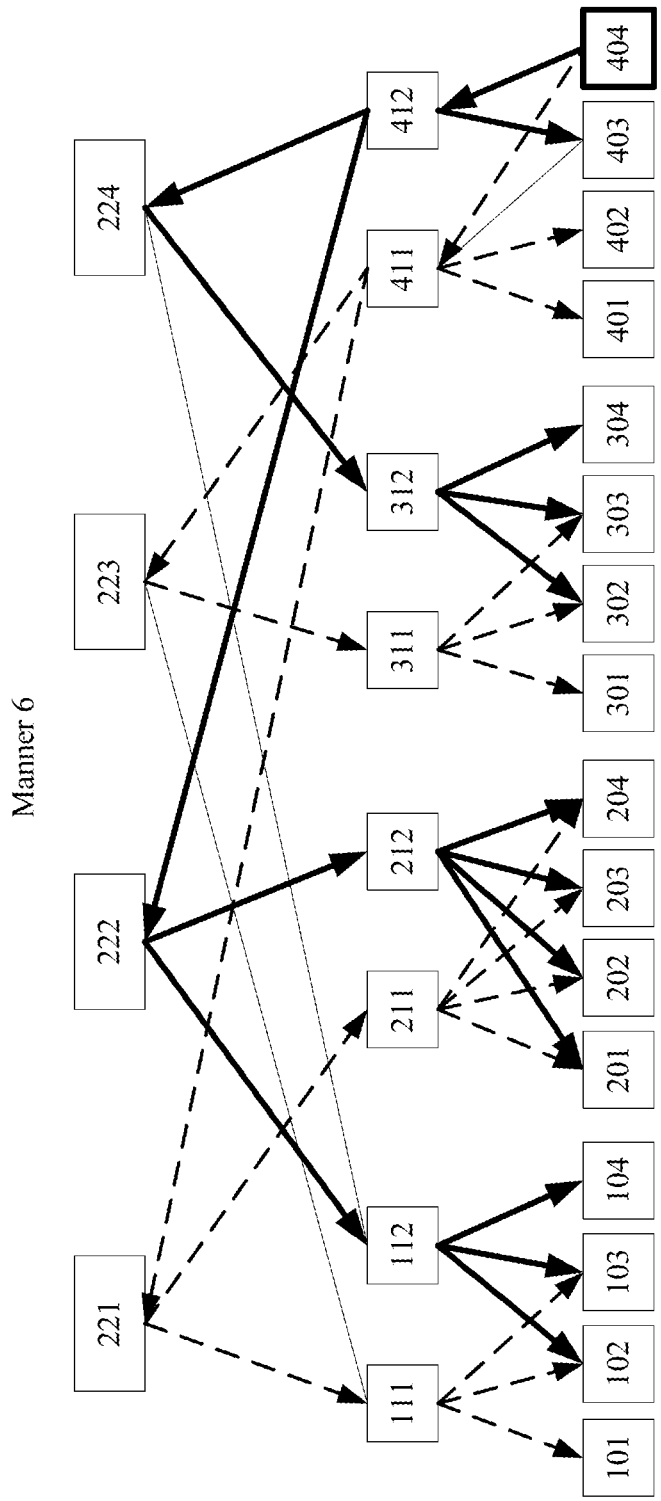
FIG. 24 is a schematic diagram of a process in which periodic LSA update is performed when a router at level_0 in an incomplete topology serves as an advertisement router according to an embodiment of this application.
Figure 25A:
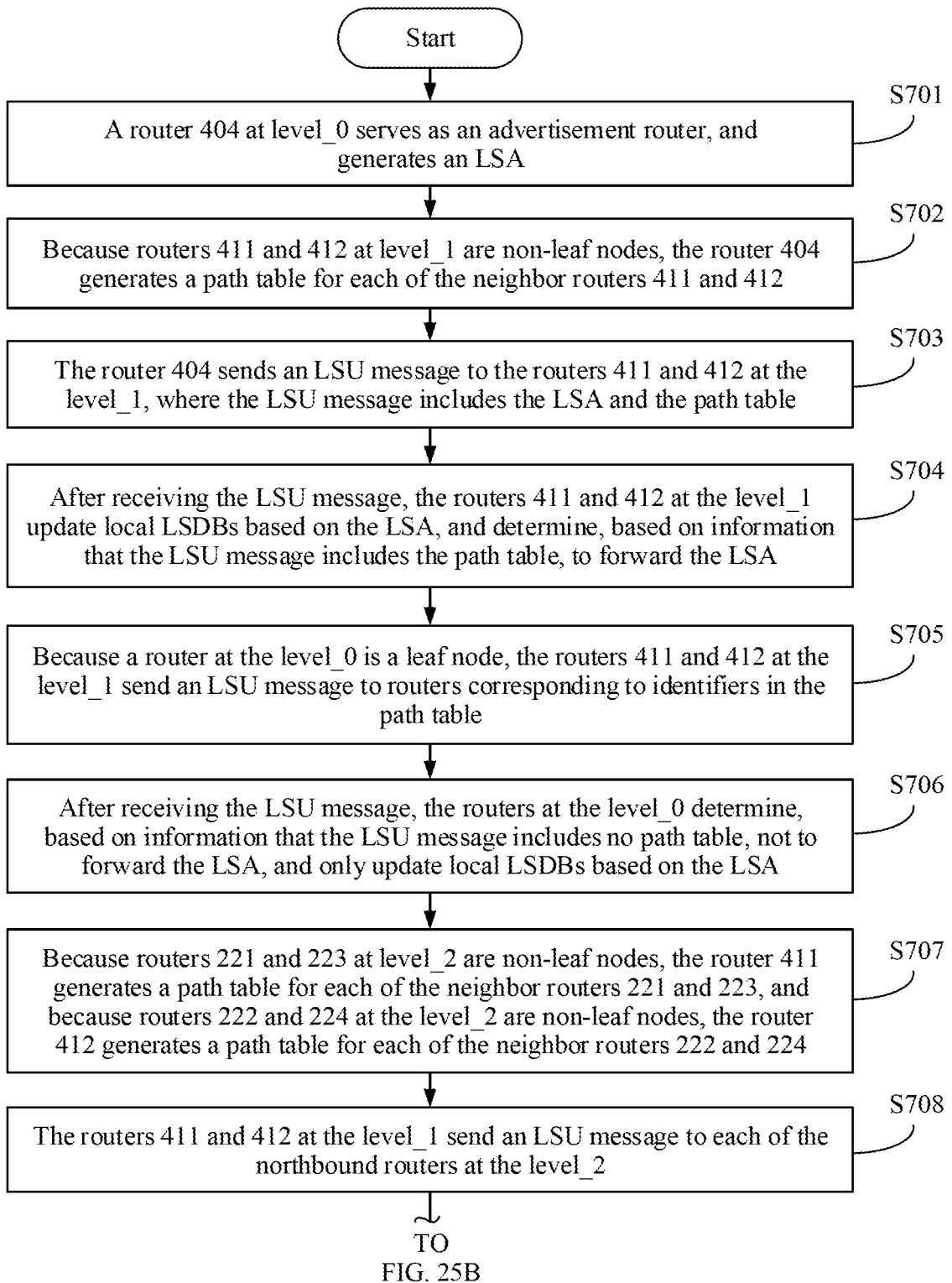

Manner 6: FIG. 24 is a schematic diagram of a process in which periodic LSA update is performed when a router at level_0 in an incomplete topology serves as an advertisement router. In comparison with FIG. 22, there is no link between routers 221 and 311, link between routers 222 and 312, link between routers 223 and 211, link between routers 224 and 212, link between routers 111 and 104, link between routers 112 and 101, link between routers 311 and 304, link between routers 312 and 301, link between routers 412 and 401, link between routers 412 and 402, or link between routers 311 and 221. As shown in FIG. 25A and FIG. 25B, the LSA sending method may include the following steps.

Steps S701 to S704 are the same as steps S601 to S604, and details are not described herein again.

S705. Because a router at the level_0 is a leaf node, the routers 411 and 412 at the level_1 send an LSU message to routers corresponding to identifiers in the path table, where the LSU message includes only the LSA, and includes no path table.

The router 411 at the level_1 sends the LSU message to the southbound routers 401 and 402 at the level_0 that are corresponding to the identifiers in the path table. The LSU message includes only the LSA, and includes no path table. The router 412 at the level_1 sends the LSU message to a southbound router 403 at the level_0 that is corresponding to the identifiers in the path table. The LSU message includes only the LSA, and includes no path table.

A difference between this step and S605 lies in that because there is no link between the routers 222 and 312, and there is a link only between the routers 224 and 312, the router 224 serves as a non-leaf node, and because there is no link between the routers 311 and 221, and there is a link only between the routers 223 and 311, the router 223 serves as a non-leaf node.

S706. After receiving the LSU message, the routers at the level_0 determine, based on information that the LSU message includes no path table, not to forward the LSA, and only update local LSDBs based on the LSA.

A difference between this step and S606 lies in that in this case, the routers 223 and 224 do not receive the LSU message that includes only the LSA, and includes no path table.

S707. Because routers 221 and 223 at level_2 are non-leaf nodes, the router 411 generates a path table for each of the neighbor routers 221 and 223, and because routers 222 and 224 at the level_2 are non-leaf nodes, the router 412 generates a path table for each of the neighbor routers 222 and 224.

A difference between this step and S607 lies in that in this case, the router 411 generates a path table for the router 223, and the router 412 generates a path table for the router 224.

S708. The routers 411 and 412 at the level_1 send an LSU message to each of the northbound routers at the level_2, where the LSU message includes the LSA and the path table generated for each router.

The router 411 at the level_1 sends the LSU message to each of the northbound routers 221 and 223 at the level_2. The LSU message includes the LSA and the path table generated for each of the neighbor routers 221 and 223. The router 412 at the level_1 sends the LSU message to each of the northbound routers 222 and 224 at the level_2. The LSU message includes the LSA and the path table generated for each of the neighbor routers 222 and 224.

A difference between this step and S608 lies in that in this case, the LSU message that includes the LSA and the path table is sent to the routers 223 and 224.

Step S705 and step S708 are performed in no particular order.

S709. After receiving the LSU message, the routers 221 to 224 at the level_2 update local LSDBs based on the LSA, and determine, based on information that the LSU message includes the path table, to forward the LSA.

A difference between this step and S609 lies in that in this case, the routers 223 and 224 update the local LSDBs based on the LSA, and determine, based on the information that the LSU message includes the path table, to forward the LSA.

S710. Because routers 111, 112, 211, 311, and 312 at the level_1 are non-leaf nodes, the router 221 generates a path table for the neighbor routers 111 and 211, the router 222 generates a path table for the neighbor routers 112 and 212, the router 223 generates a path table for the neighbor router 311, and the router 224 generates a path table for the neighbor router 312.

A difference between this step and S610 lies in that in this case, the router 223 generates the path table for the neighbor router 311, the router 224 generates the path table for the neighbor router 312, and the router 221 generates a path table for the neighbor router 111.

S711. The routers 221 to 224 at the level_2 send an LSU message to each of the southbound routers at the level_1, where the LSU message includes the LSA and the path table generated for each of the neighbor routers 111, 112, 211, 212, 311, and 312.

A difference between this step and S611 lies in that in this case, the router 223 sends the LSU message to the router 311, and the router 221 no longer sends the LSU message to the router 311, and the router 224 sends the LSU message to the router 312, and the router 222 no longer sends the LSU message to the router 312.

S712. After receiving the LSU message, the routers 111, 112, 211, 212, 311, and 312 at the level_1 update local LSDBs based on the LSA, and determine, based on information that the LSU message includes the path table, to forward the LSA.

A difference between this step and S612 lies in that in this case, the router 312 receives the LSU message from the router 224, and the router 311 receives the LSU message from the router 223.

S713. Because a router at the level_0 is a leaf node, the routers 111, 112, 211, 212, 311, and 312 at the level_1 send an LSU message to southbound routers at the level_0 that are corresponding to identifiers in the path table, where the LSU message includes only the LSA, and includes no path table.

S714. After receiving the LSU message, the routers at the level_0 determine, based on information that the LSU message includes no path table, not to forward the LSA, and only update local LSDBs based on the LSA.

Technical effects in Manner 6 are as follows:

It is ensured that another router at the level_0 knows latest status information of a router, serving as the advertisement router, at the level_0, so as to adjust a routing entry from the another router to another router at the level_0.

In this embodiment, necessary update, in a network, of the LSA generated by the router 404 at the level_0 is ensured, and unnecessary repetition or redundancy is also avoided, thereby greatly reducing a quantity of times of transmitting the LSA in the fat-tree network, and reducing load of processing an LSU message by a router.

For improvements that differ Manner 6 from the prior art, refer to Manner 1. Details are not described herein again.

Figure 26:
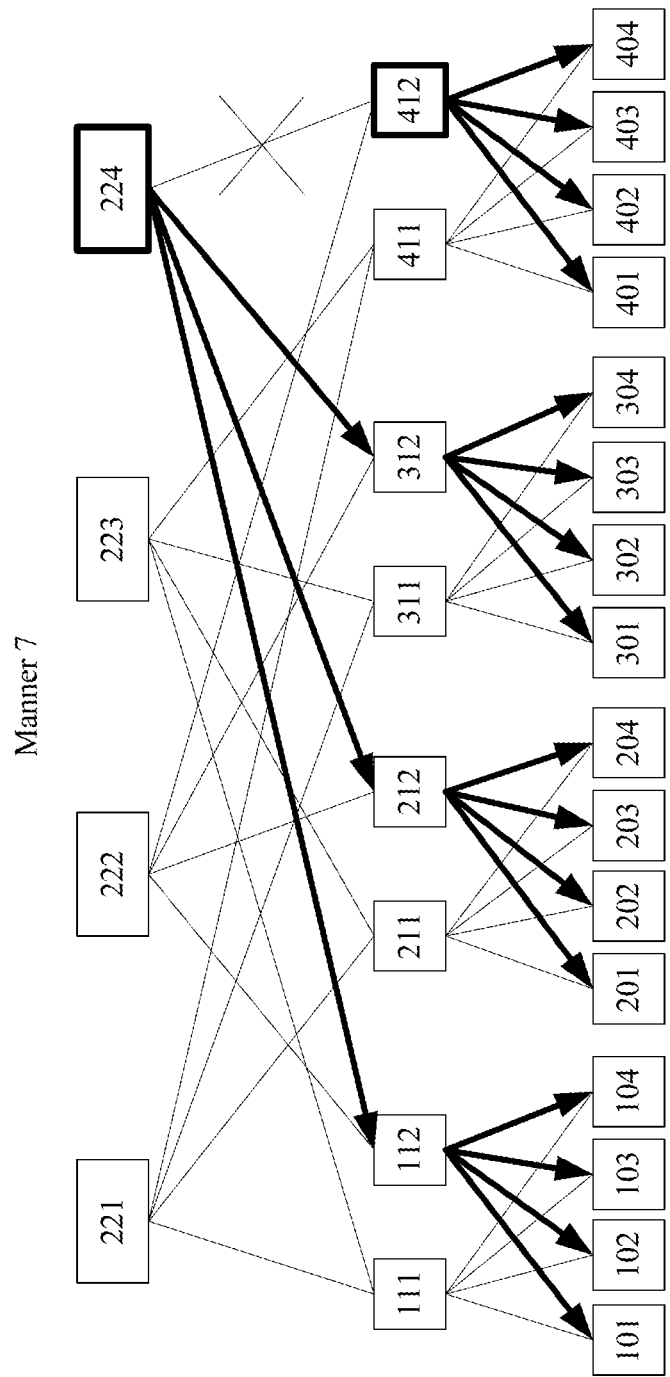
FIG. 26 is a schematic diagram of a process in which event LSA update is performed when a link between a router at level_1 and a router at level_2 in a complete topology is faulty according to an embodiment of this application.
Figure 27:
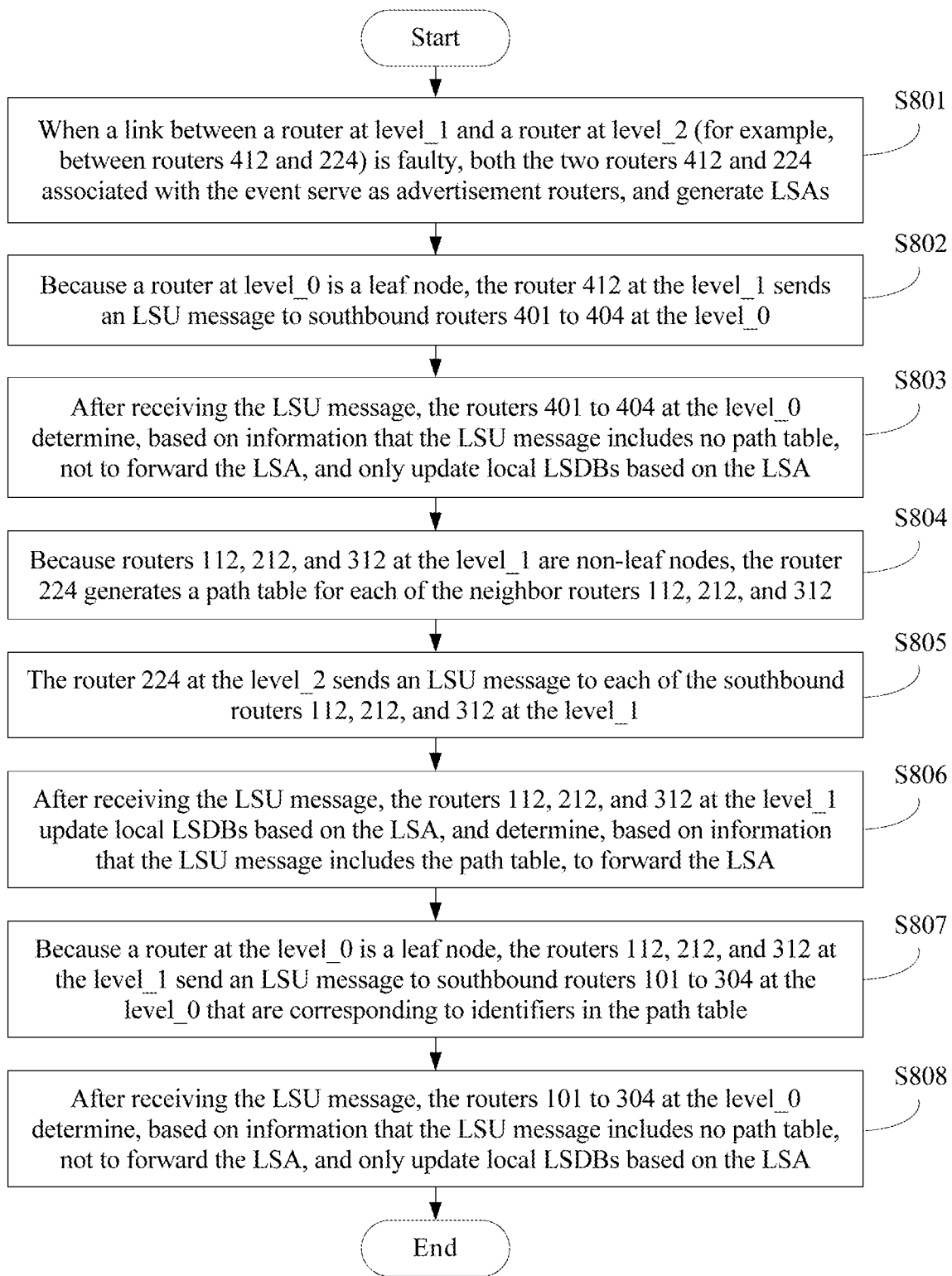
FIG. 27 is a fourteenth schematic flowchart of an LSA sending method according to an embodiment of this application.

Manner 7: FIG. 26 is a schematic diagram of a process in which event LSA update is performed when a link between a router at level_1 and a router at level_2 in a complete topology is faulty. As shown in FIG. 27, the LSA sending method may include the following steps.

S801. When a link between a router at level_1 and a router at level_2 (for example, between routers 412 and 224) is faulty, both the two routers 412 and 224 associated with the event serve as advertisement routers, and generate LSAs.

The LSA generated by the router 412 includes an identifier of the router 412 and identifiers of routers 401 to 404. The LSA may further include level location information of the router 412 and level location information of the routers 401 to 404.

The LSA generated by the router 224 includes an identifier of the router 224 and identifiers of routers 112, 212, and 312. The LSA may further include level location information of the router 224 and level location information of the routers 112, 212, and 312.

S802. Because a router at level_0 is a leaf node, the router 412 at the level_1 sends an LSU message to southbound routers 401 to 404 at the level_0, where the LSU message includes only the LSA, and includes no path table.

In this case, the router 412 at the level_1 is corresponding to the first router in step S107, and the routers 401 to 404 at the level_0 are corresponding to the second router in step S107.

S803. After receiving the LSU message, the routers 401 to 404 at the level_0 determine, based on information that the LSU message includes no path table, not to forward the LSA, and only update local LSDBs based on the LSA.

In this case, the routers 401 to 404 at the level_0 are corresponding to the second router in S108 and S109.

S804. Because routers 112, 212, and 312 at the level_1 are non-leaf nodes, the router 224 generates a path table for each of the neighbor routers 112, 212, and 312.

In this case, the router 224 at the level_2 is corresponding to the first router in step S102, the routers 112, 212, and 312 at the level_1 are corresponding to the second router in step S102, and routers 101 to 304 at the level_0 are corresponding to the third router in step S102.

S805. The router 224 at the level_2 sends an LSU message to each of the southbound routers 112, 212, and 312 at the level_1, where the LSU message includes the LSA and the path table generated for each of the neighbor routers 112, 212, and 312.

In this case, the router 224 at the level_2 is corresponding to the first router in step S102, and the routers 112, 212, and 312 at the level_1 are corresponding to the second router in step S102.

S806. After receiving the LSU message, the routers 112, 212, and 312 at the level_1 update local LSDBs based on the LSA, and determine, based on information that the LSU message includes the path table, to forward the LSA.

In this case, the routers 112, 212, and 312 at the level_1 are corresponding to the second router in step S104 and step S105.

S807. Because a router at the level_0 is a leaf node, the routers 112, 212, and 312 at the level_1 send an LSU message to southbound routers 101 to 304 at the level_0 that are corresponding to identifiers in the path table, where the LSU message includes only the LSA, and includes no path table.

In this case, the routers 112, 212, and 312 at the level_1 are corresponding to the second router in step S106, and the routers 101 to 304 at the level_0 are corresponding to the third router in step S106. Alternatively, the routers 112, 212, and 312 at the level_1 are corresponding to the first router in step S107, and the routers 101 to 304 at the level_0 are corresponding to the second router in step S107.

S808. After receiving the LSU message, the routers 101 to 304 at the level_0 determine, based on information that the LSU message includes no path table, not to forward the LSA, and only update local LSDBs based on the LSA.

In this case, the routers 101 to 304 at the level_0 are corresponding to the second router in S108 and S109.

Technical effects in Manner 7 are as follows.

It is ensured that a router at the level_0 knows a case of a link fault, so as to obtain, through calculation or refreshment based on a latest topology, a path to a router at the level_0 that is affected by the fault.

In this embodiment, necessary update, in a network, of the LSA generated by each of the router 412 at the level_1 and the router 224 at the level_2 that are associated with the fault is ensured, and unnecessary repetition or redundancy is also avoided, thereby greatly reducing a quantity of times of transmitting the LSA in the fat-tree network, and reducing load of processing an LSU message by a router.

For improvements that differ Manner 7 from the prior art, refer to Manner 1. Details are not described herein again.

Figure 28:
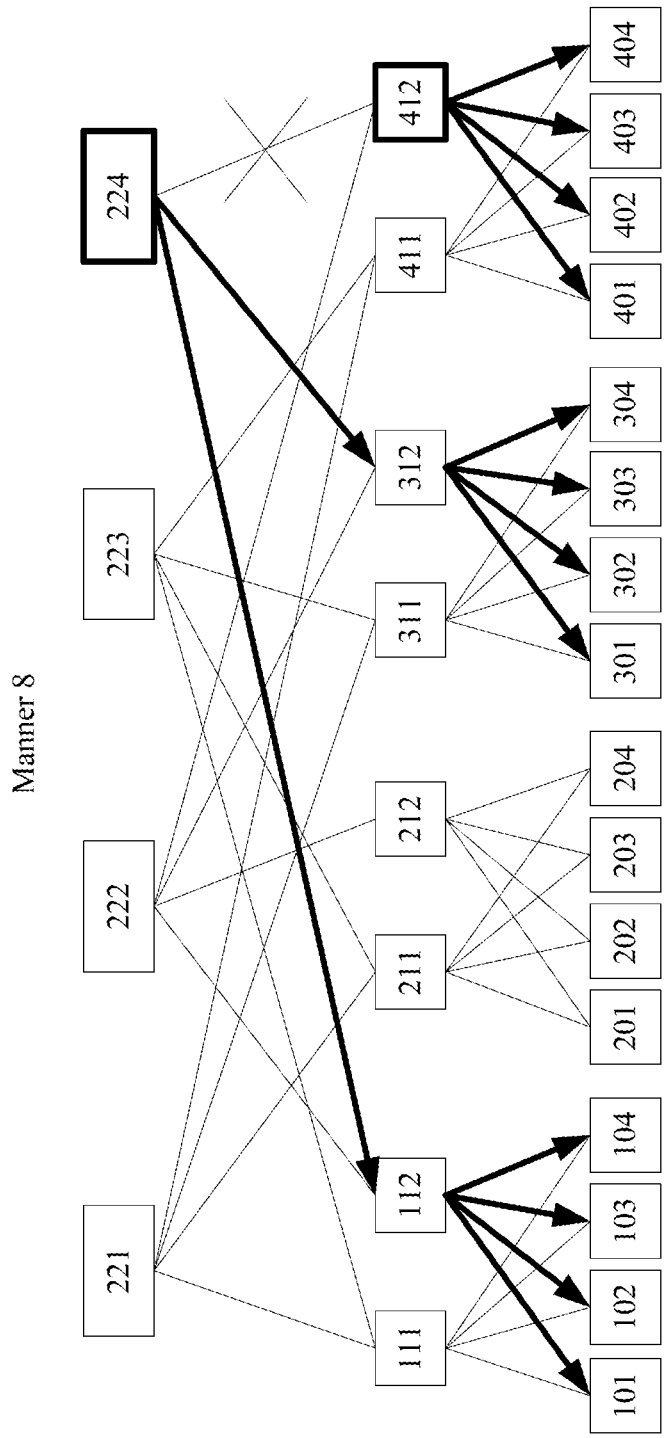
FIG. 28 is a schematic diagram of a process in which event LSA update is performed when a link between a router at level_1 and a router at level_2 in an incomplete topology is faulty according to an embodiment of this application.
Figure 29:
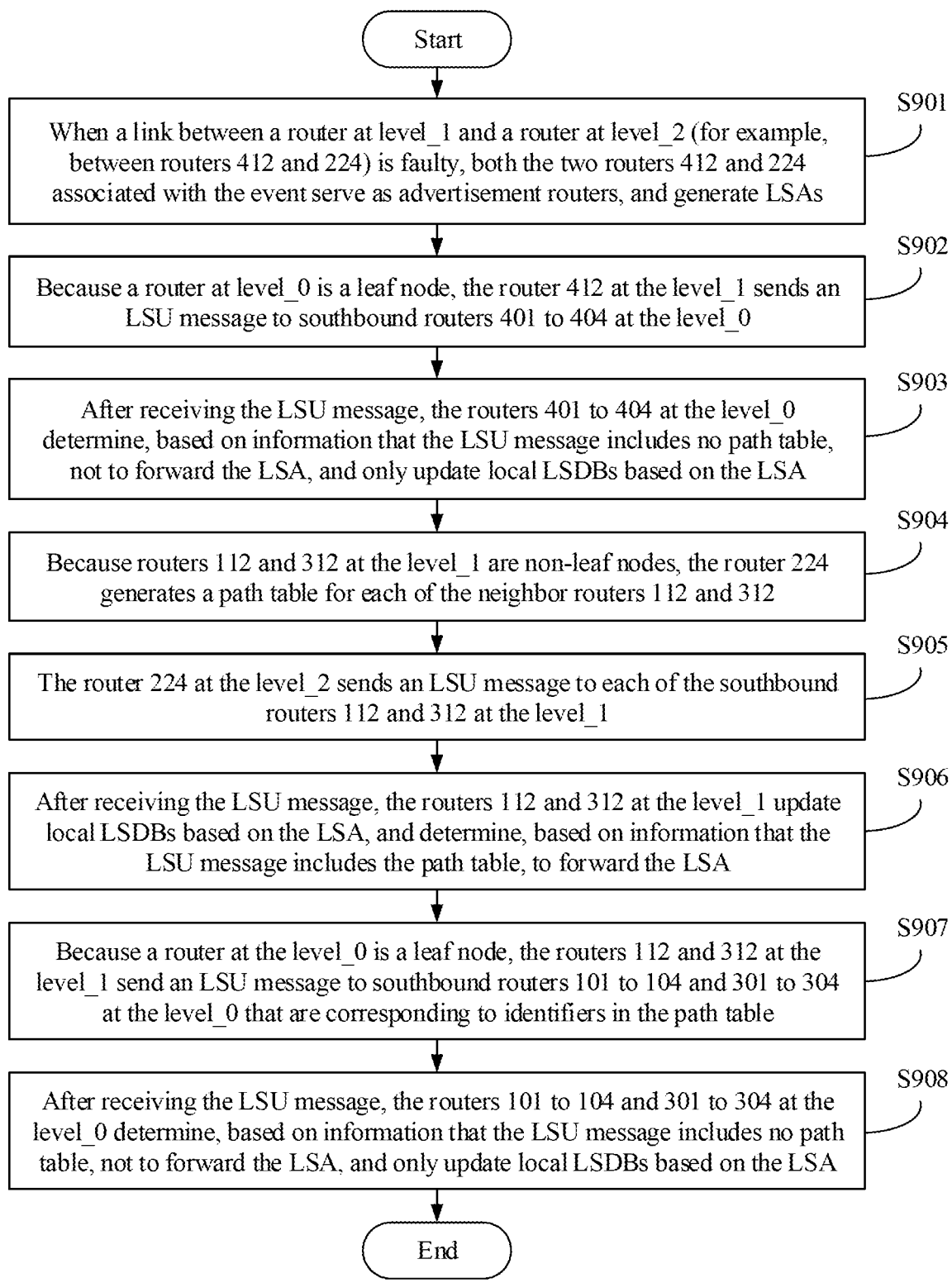
FIG. 29 is a fifteenth schematic flowchart of an LSA sending method according to an embodiment of this application.

Manner 8: FIG. 28 is a schematic diagram of a process in which event LSA update is performed when a link between a router at level_1 and a router at level_2 in an incomplete topology is faulty. In comparison with FIG. 26, there is no link between routers 224 and 212. As shown in FIG. 29, the LSA sending method may include the following steps.

Steps S901 to S903 are the same as steps S801 to S803, and details are not described herein again.

S904. Because routers 112 and 312 at the level_1 are non-leaf nodes, the router 224 generates a path table for each of the neighbor routers 112 and 312.

A difference between this step and S804 lies in that the router 224 no longer generates a path table for the neighbor router 212.

S905. The router 224 at the level_2 sends an LSU message to each of the southbound routers 112 and 312 at the level_1, where the LSU message includes the LSA and the path table generated for each of the neighbor routers 112 and 312.

A difference between this step and S805 lies in that the router 224 no longer sends the LSU message to the router 212.

S906. After receiving the LSU message, the routers 112 and 312 at the level_1 update local LSDBs based on the LSA, and determine, based on information that the LSU message includes the path table, to forward the LSA.

A difference between this step and S806 lies in that the router 212 no longer receives the LSU message.

S907. Because a router at the level_0 is a leaf node, the routers 112 and 312 at the level_1 send an LSU message to southbound routers 101 to 104 and 301 to 304 at the level_0 that are corresponding to identifiers in the path table, where the LSU message includes only the LSA, and includes no path table.

A difference between this step and S807 lies in that the router 212 does not send the LSU message to routers 201 to 204.

S908. After receiving the LSU message, the routers 101 to 104 and 301 to 304 at the level_0 determine, based on information that the LSU message includes no path table, not to forward the LSA, and only update local LSDBs based on the LSA.

A difference between this step and S808 lies in that the routers 201 to 204 no longer receive the LSU message.

Technical effects in Manner 8 are as follows:

(1) It is ensured that a router at the level_0 knows a case of a link fault, so as to obtain, through calculation or refreshment based on a latest topology, a path to a router at the level_0 that is affected by the fault.

(2) Routers (including routers 111, 211, 212, 311, and 411) at the level_1 that are not next-hop neighbors of the router at the level_2 do not receive the LSA sent by the router because data packets processed by these routers do not pass through the router 224 at a next hop, and no data packet directly sent from the router 224 is received.

In this embodiment, necessary update, in a network, of the LSA generated by each of the router 412 at the level_1 and the router 224 at the level_2 that are associated with the fault is ensured, and unnecessary repetition or redundancy is also avoided, thereby greatly reducing a quantity of times of transmitting the LSA in the fat-tree network, and reducing load of processing an LSU message by a router.

For improvements that differ Manner 8 from the prior aft, refer to Manner 1. Details are not described herein again.

Figure 30:
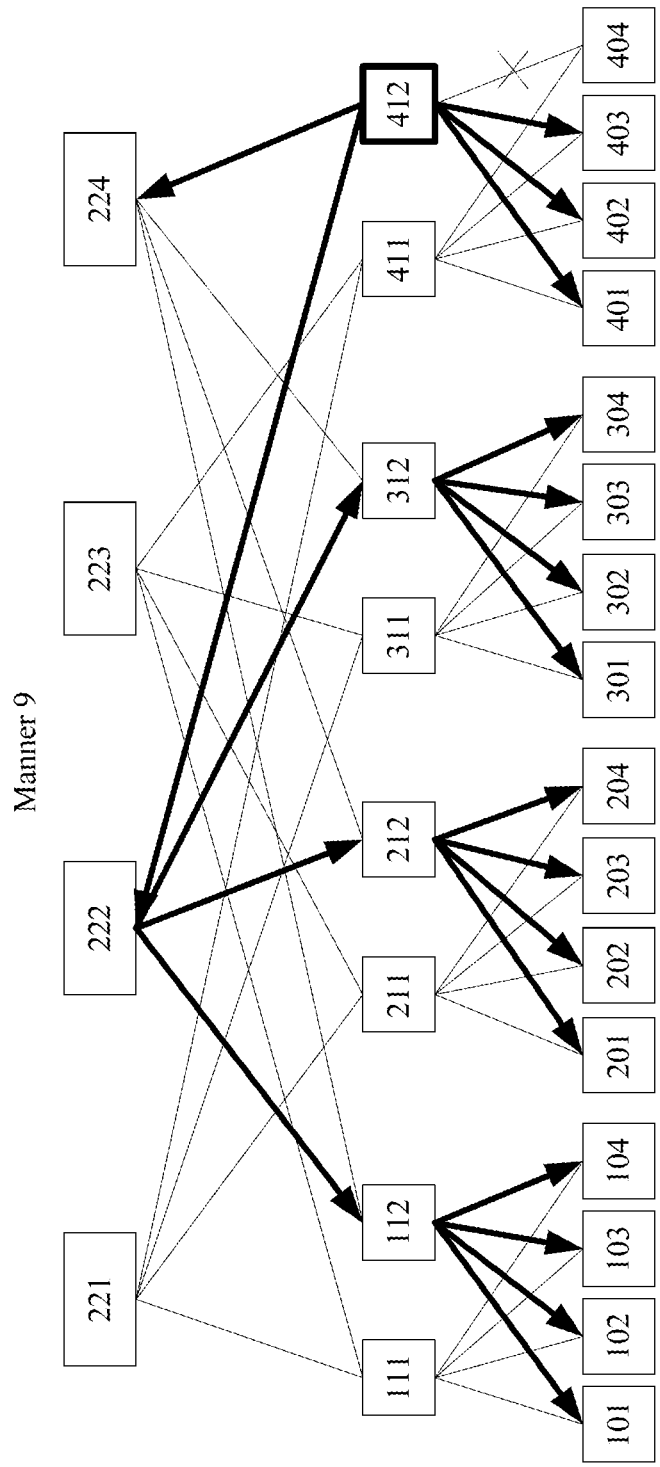
FIG. 30 is a schematic diagram of a process in which event LSA update is performed when a link between a router at level_1 and a router at level_0 in a complete topology is faulty according to an embodiment of this application.
Figure 31A:
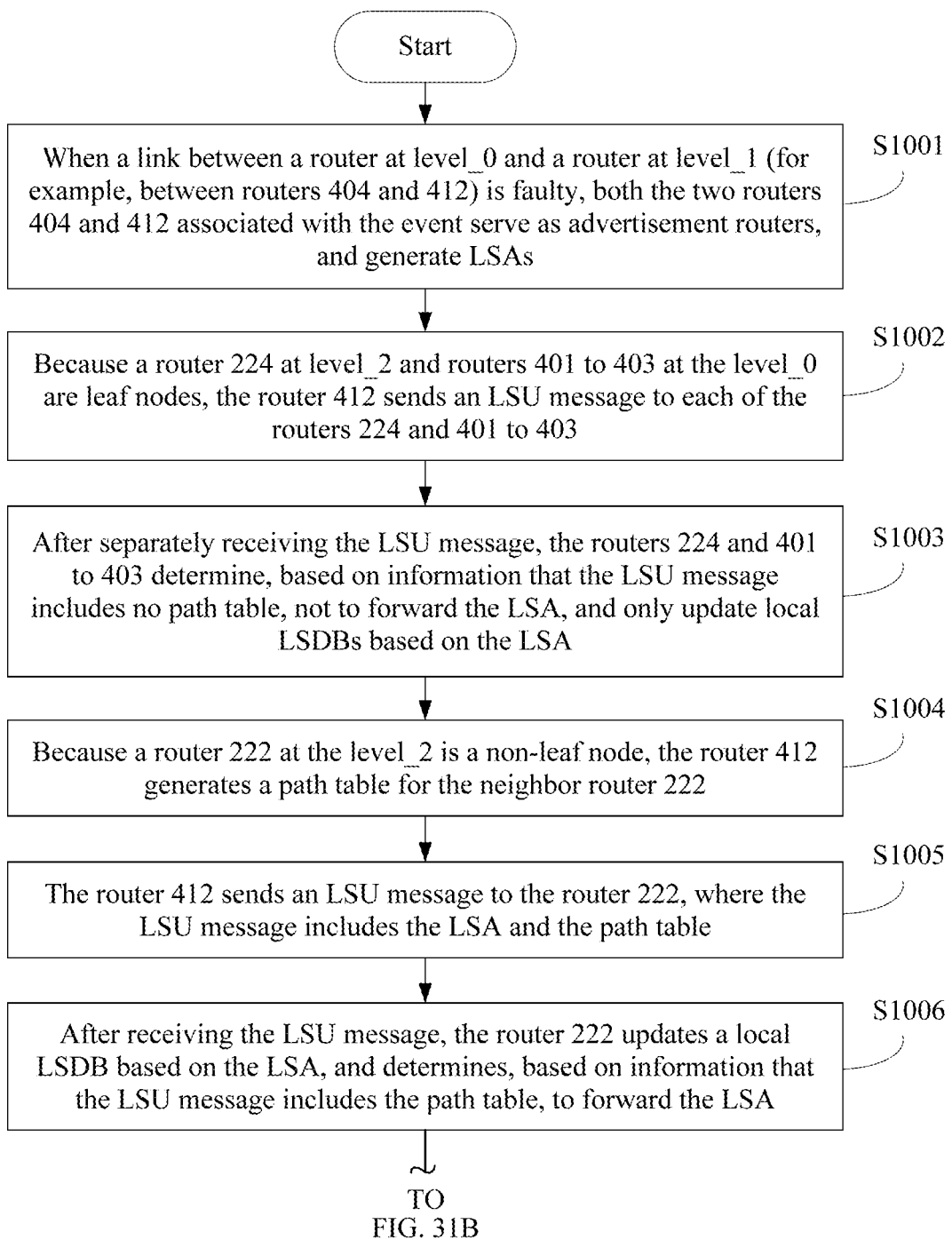
FIG. 31A and FIG. 31B are a sixteenth schematic flowchart of an LSA sending method according to an embodiment of this application.
Figure 31B:
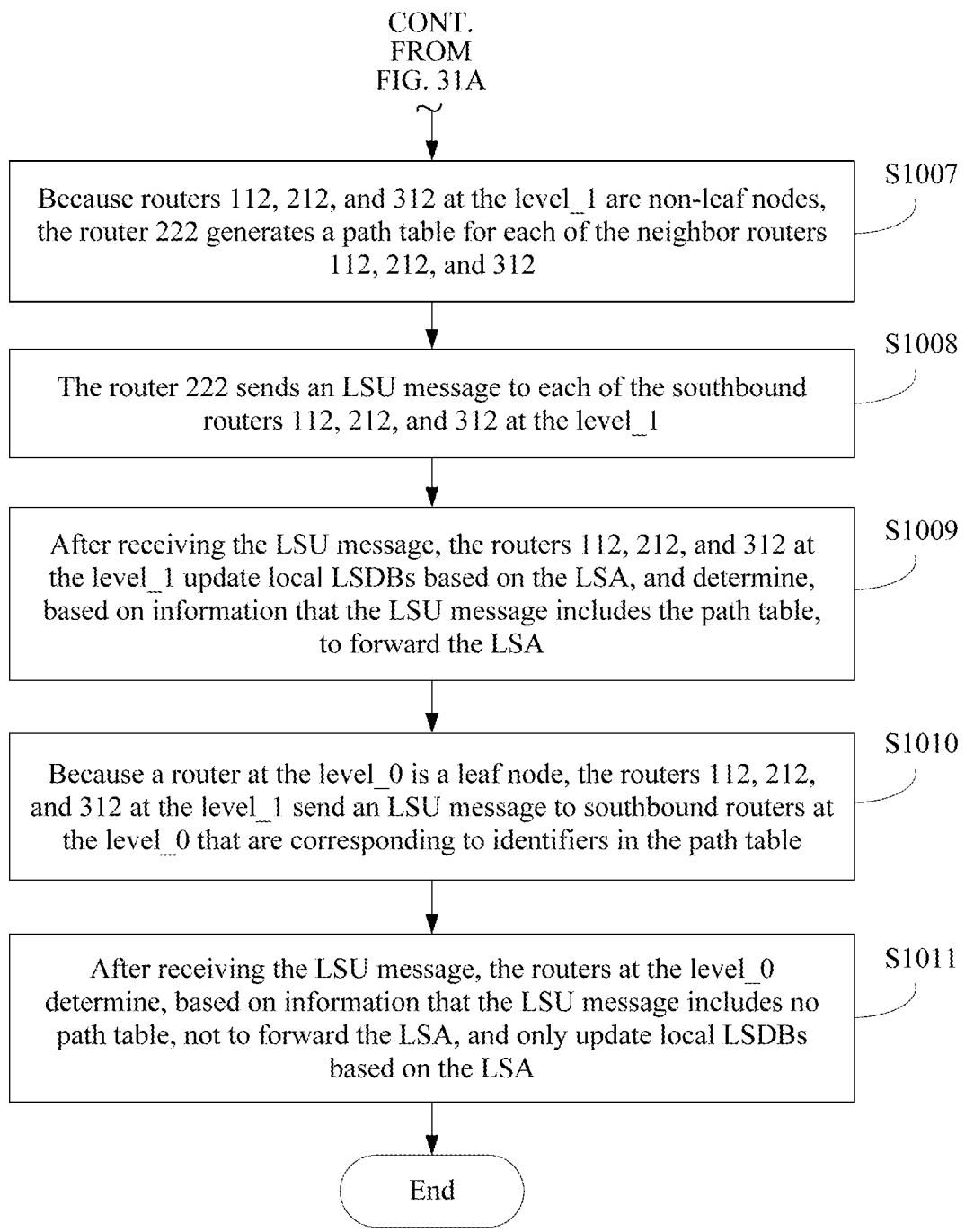

Manner 9: FIG. 30 is a schematic diagram of a process in which event LSA update is performed when a link between a router at level_1 and a router at level_0 in a complete topology is faulty. As shown in FIG. 31A and FIG. 31B, the LSA sending method may include the following steps.

When a link between a router at level_0 and a router at level_1 (for example, between routers 404 and 412) is faulty, both the two routers 404 and 412 associated with the event serve as advertisement routers, and generate LSAs.

The router 404 at the level_0 only updates a local LSDB, and does not send the LSA to a router at the level_1.

A difference from the LSA generated in step S401 lies in that the LSA generated by the router 412 at the level_1 includes neither an identifier of the router 404 nor level location information of the router 404.

S1002. Because a router 224 at level_2 and routers 401 to 403 at the level_0 are leaf nodes, the router 412 sends an LSU message to each of the routers 224 and 401 to 403, where the LSU message includes only the LSA, and includes no path table.

A difference between this step and S402 lies in that the router 412 does not send the LSU message to the router 404.

S1003. After separately receiving the LSU message, the routers 224 and 401 to 403 determine, based on information that the LSU message includes no path table, not to forward the LSA, and only update local LSDBs based on the LSA.

A difference between this step and S403 lies in that the router 404 does not receive the LSU message.

Steps S1004 to S1011 are the same as steps S404 to S411, and details are not described herein again.

Technical effects in Manner 9 are as follows:

It is ensured that a router at the level_0 knows a case of a link fault, so as to obtain, through calculation or refreshment based on a latest topology, a path to a router at the level_0 that is affected by the fault.

In this embodiment, necessary update, in a network, of the LSA generated by each of the router 412 at the level_1 and the router 404 at the level_0 that are associated with the fault is ensured, and unnecessary repetition or redundancy is also avoided, thereby greatly reducing a quantity of times of transmitting the LSA in the fat-tree network, and reducing load of processing an LSU message by a router.

For improvements that differ Manner 9 from the prior art, refer to Manner 1. Details are not described herein again.

Figure 32:
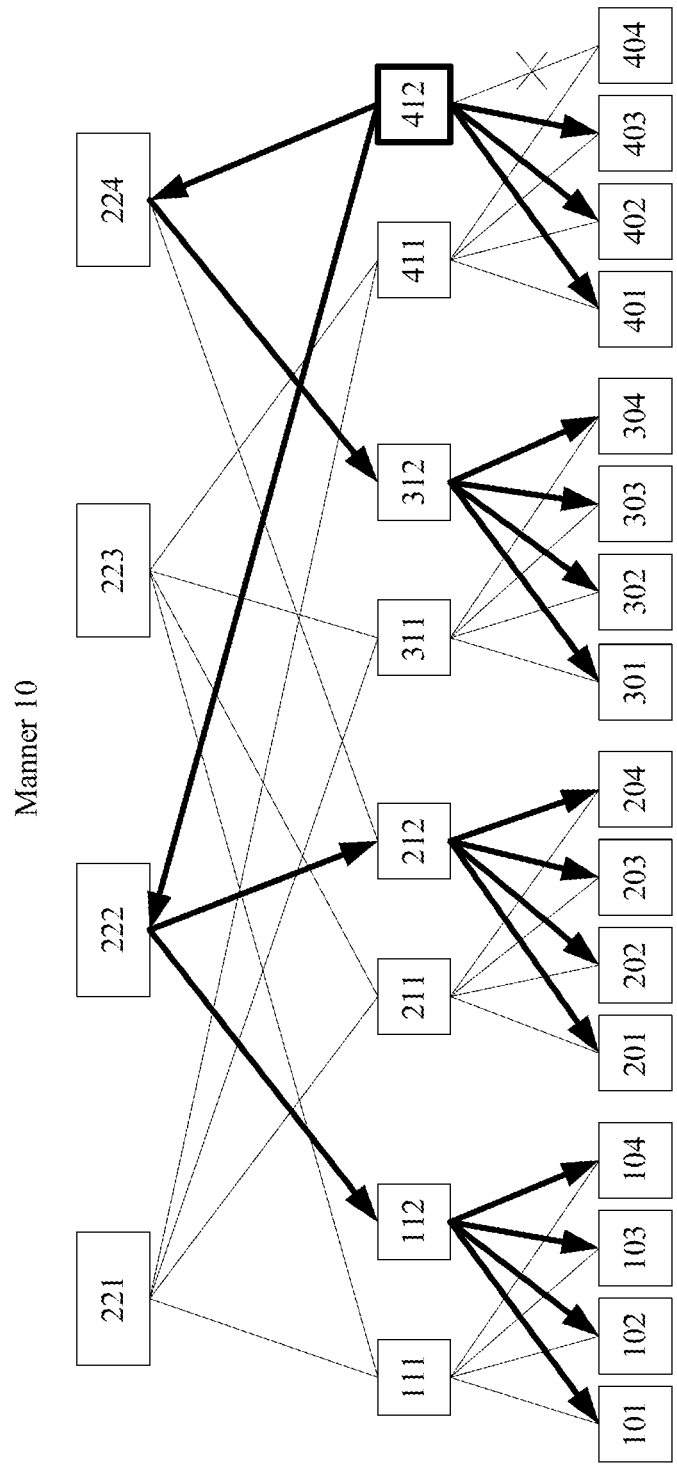
FIG. 32 is a schematic diagram of a process in which event LSA update is performed when a link between a router at level_1 and a router at level_0 in an incomplete topology is faulty according to an embodiment of this application.
Figure 33A:
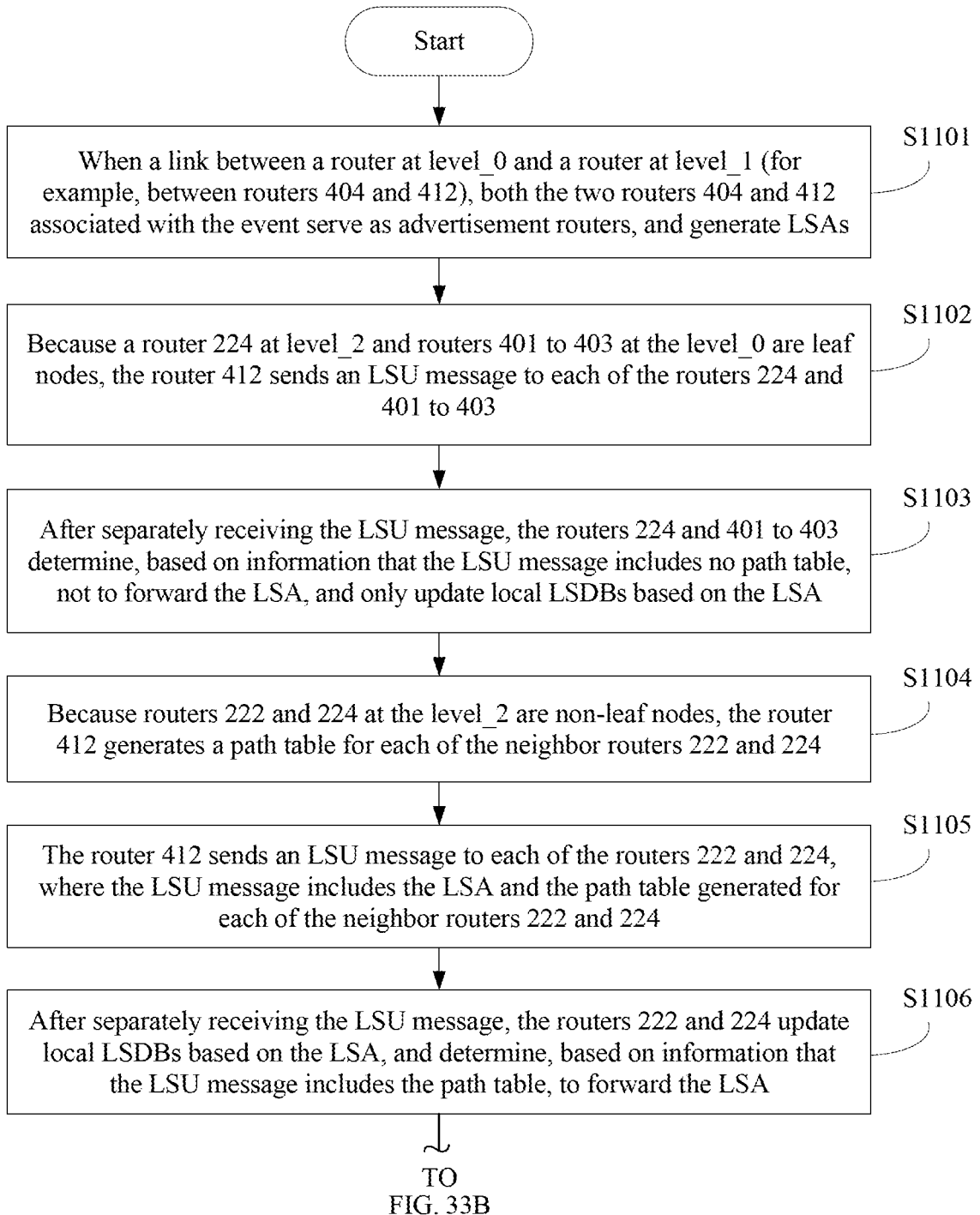

Manner 10: FIG. 32 is a schematic diagram of a process in which event LSA update is performed when a link between a router at level_1 and a router at level_0 in an incomplete topology is faulty. As shown in FIG. 33A and FIG. 33B, the LSA sending method may include the following steps.

Steps S1001 to S1103 are the same as steps S1001 to S1003, and details are not described herein again.

Steps S1104 to S11011 are the same as steps S504 to S5011, and details are not described herein again.

Technical effects in Manner 10 are as follows:

It is ensured that a router at the level_0 knows a case of a link fault, so as to obtain, through calculation/refreshment based on a latest topology, a path to a router at the level_0 that is affected by the fault.

In this embodiment, necessary update, in a network, of the LSA generated by each of the router 412 at the level_1 and the router 404 at the level_0 that are associated with the fault is ensured, and unnecessary repetition or redundancy is also avoided, thereby greatly reducing a quantity of times of transmitting the LSA in the fat-tree network, and reducing load of processing an LSU message by a router.

Figure 34:
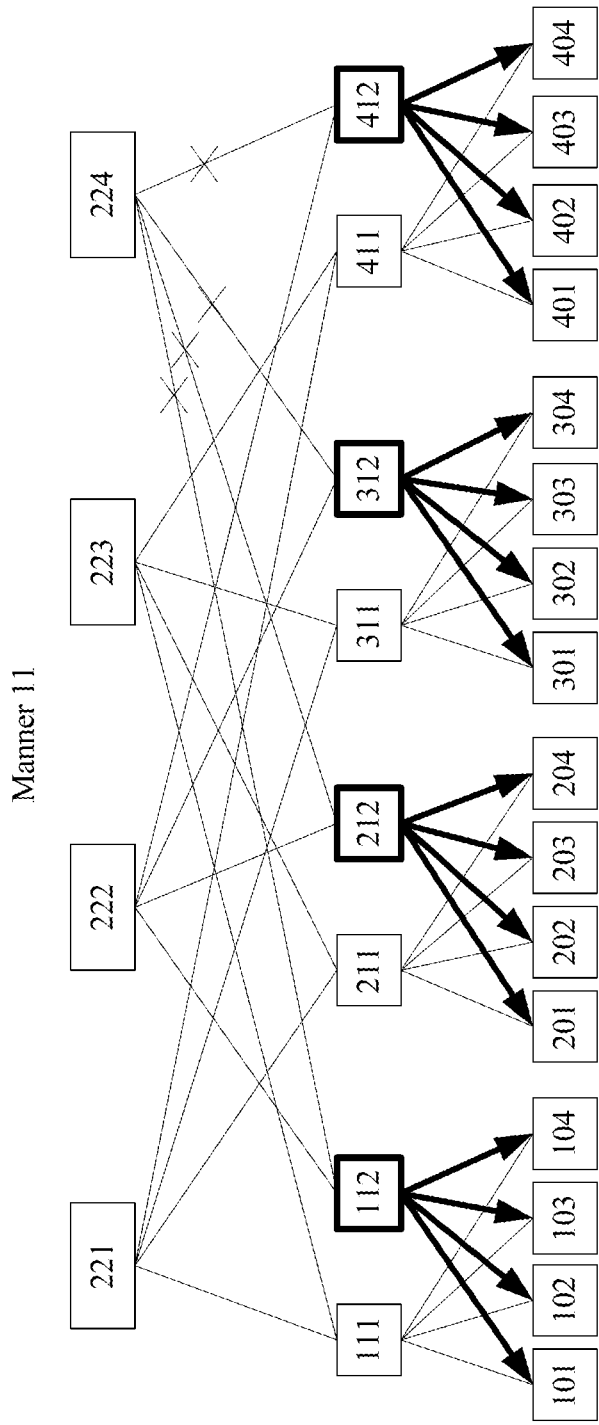
FIG. 34 is a schematic diagram of a process in which event LSA update is performed when a router at level_2 in a complete topology is faulty according to an embodiment of this application.
Figure 35:
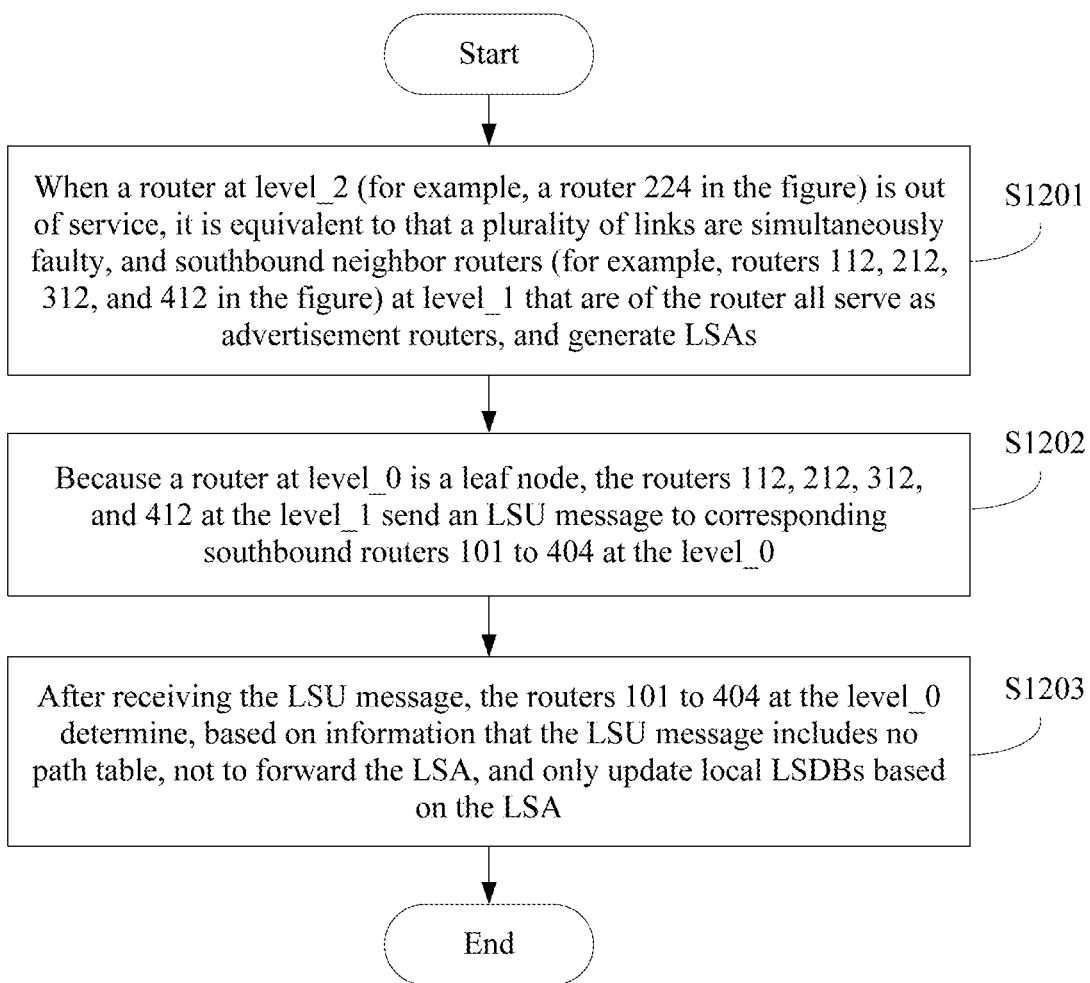
FIG. 35 is an eighteenth schematic flowchart of an LSA sending method according to an embodiment of this application.

Manner 11: FIG. 34 is a schematic diagram of a process in which event LSA update is performed when a router at level_2 in a complete topology is faulty. As shown in FIG. 35, the LSA sending method may include the following steps.

S1201. When a router at level_2 (for example, a router 224 in the figure) is out of service, it is equivalent to that a plurality of links are simultaneously faulty, and southbound neighbor routers (for example, routers 112, 212, 312, and 412 in the figure) at level_1 that are of the router all serve as advertisement routers, and generate LSAs.

For example, the LSA generated by the router 112 includes an identifier of the router 112 and identifiers of routers 101 to 104. The LSA may further include level location information of the router 112 and level location information of the routers 101 to 104.

S1202. Because a router at level_0 is a leaf node, the routers 112, 212, 312, and 412 at the level_1 send an LSU message to corresponding southbound routers 101 to 404 at the level_0, where the LSU message includes only the LSA, and includes no path table.

In this case, the routers 112, 212, 312, and 412 at the level_1 are corresponding to the second router in step S106, and the routers 101 to 404 at the level_0 are corresponding to the third router in step S106. Alternatively, the routers 112, 212, 312, and 412 at the level_1 are corresponding to the first router in step S107, and the routers 101 to 404 at the level_0 are corresponding to the second router in step S107.

S1203. After receiving the LSU message, the routers 101 to 404 at the level_0 determine, based on information that the LSU message includes no path table, not to forward the LSA, and only update local LSDBs based on the LSA.

In this case, the routers 101 to 404 at the level_0 are corresponding to the second router in S108 and S109.

Technical effects in Manner n are as follows:

It is ensured that a router at the level_0 knows a case that a router is out of service, so as to obtain, through calculation or refreshment based on a latest topology, a path to a router at the level_0 that is affected by the fault.

In this embodiment, necessary update, in a network, of the LSA generated by each of the routers 112, 212, 312, and 412 at the level_1 that are associated with the fault is ensured, and unnecessary repetition or redundancy is also avoided, thereby greatly reducing a quantity of times of transmitting the LSA in the fat-tree network, and reducing load of processing an LSU message by the router.

For improvements that differ Manner 11 from the prior art, refer to Manner 1. Details are not described herein again.

Figure 36:
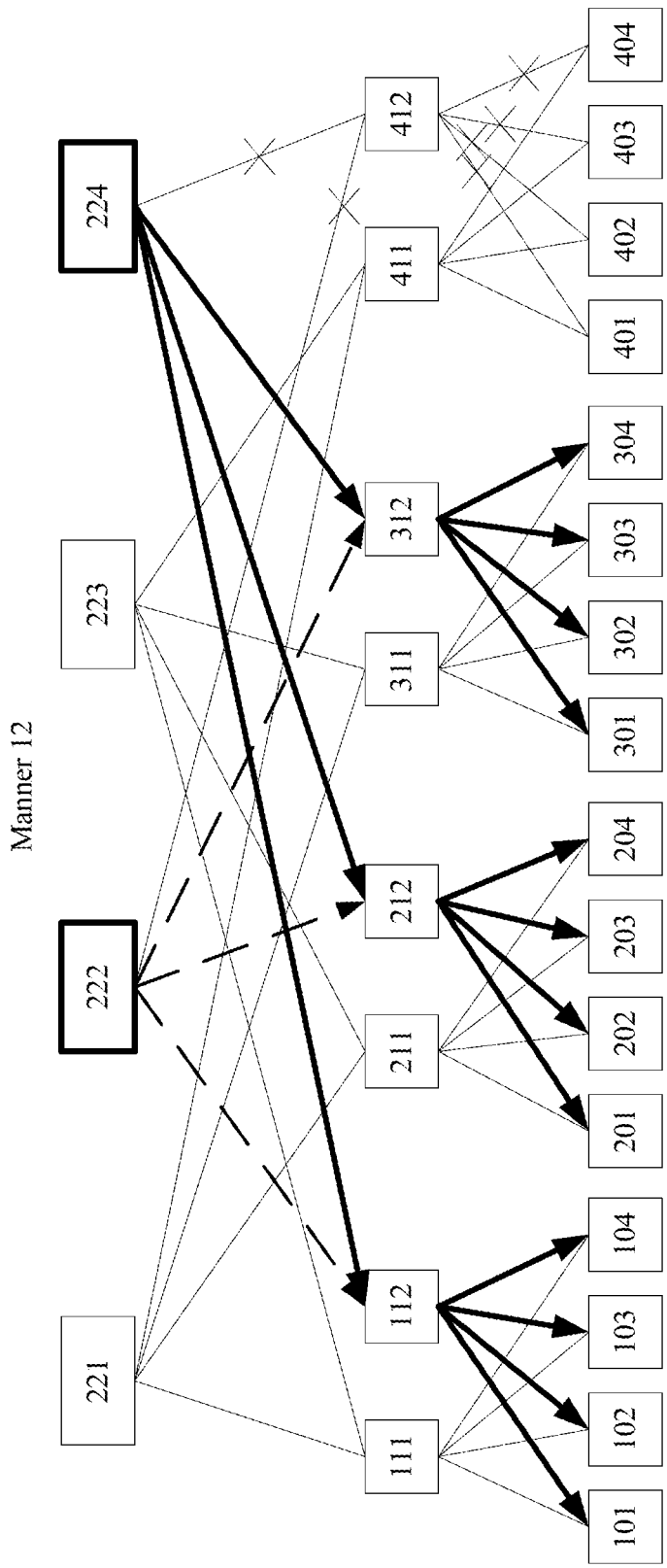
FIG. 36 is a schematic diagram of a process in which event LSA update is performed when a router at level_1 in a complete topology is faulty according to an embodiment of this application.
Figure 37:
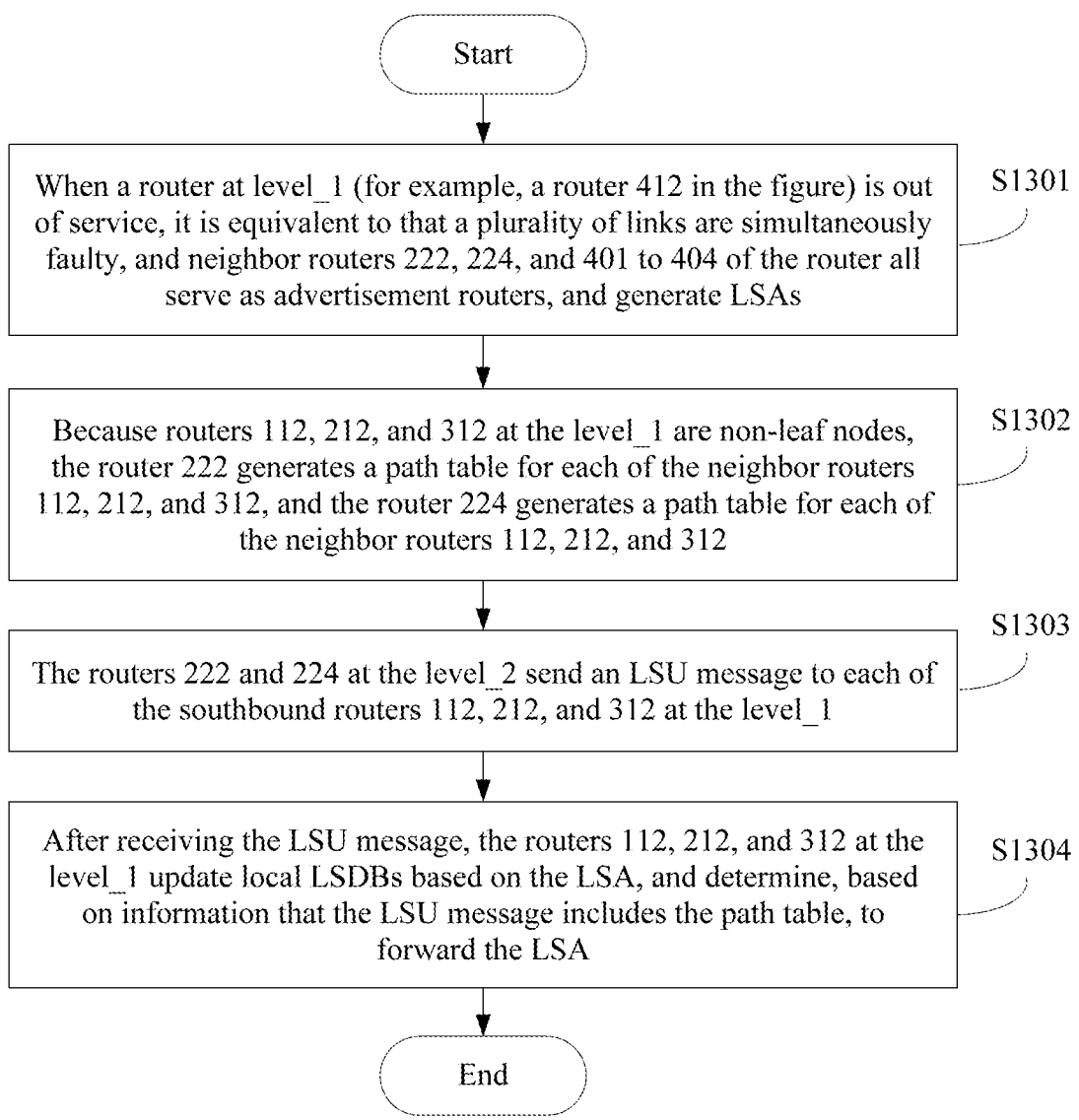
FIG. 37 is a nineteenth schematic flowchart of an LSA sending method according to an embodiment of this application.

Manner 12: FIG. 36 is a schematic diagram of a process in which event LSA update is performed when a router at level_1 in a complete topology is faulty. As shown in FIG. 37, the LSA sending method may include the following steps.

S1301. When a router at level_1 (for example, a router 412 in the figure) is out of service, it is equivalent to that a plurality of links are simultaneously faulty, and neighbor routers 222, 224, and 401 to 404 of the router all serve as advertisement routers, and generate LSAs.

The routers 401 to 404 at the level_0 only update local LSDBs, and do not send the LSA to a router at the level_1.

The LSA generated by the router 222 at the level_2 includes an identifier of the router 222 and identifiers of routers 112, 212, and 312. The LSA may further include level location information of the router 222 and level location information of the routers 112, 212, and 312.

The LSA generated by the router 224 at the level_2 includes an identifier of the router 224 and the identifiers of the routers 112, 212, and 312. The LSA may further include level location information of the router 224 and the level location information of the routers 112, 212, and 312.

S1302. Because routers 112, 212, and 312 at the level_1 are non-leaf nodes, the router 222 generates a path table for each of the neighbor routers 112, 212, and 312, and the router 224 generates a path table for each of the neighbor routers 112, 212, and 312.

In this case, the routers 222 and 224 at the level_2 are corresponding to the first router in step S102, the routers 112, 212, and 312 at the level_1 are corresponding to the second router in step S102, and routers 101 to 304 at the level_0 are corresponding to the third router in step S102.

S1303. The routers 222 and 224 at the level_2 send an LSU message to each of the southbound routers 112, 212, and 312 at the level_1, where the LSU message includes the LSA and the path table generated for each of the neighbor routers 112, 212, and 312.

In this case, the routers 222 and 224 at the level_2 are corresponding to the first router in step S103, and the routers 112, 212, and 312 at the level_1 are corresponding to the second router in step S103.

S1304. After receiving the LSU message, the routers 112, 212, and 312 at the level_1 update local LSDBs based on the LSA, and determine, based on information that the LSU message includes the path table, to forward the LSA.

In this case, the routers 112, 212, and 312 at the level_1 are corresponding to the second router in step S104 and step S105.

Technical effects in Manner 12 are as follows:

It is ensured that a router at the level_0 knows a case that a router is out of service, so as to obtain, through calculation or refreshment based on a latest topology, a path to a router at the level_0 that is affected by the fault.

In this embodiment, necessary update, in a network, of the LSA generated by each of the routers 222 and 224 at the level_2 that are associated with the fault is ensured, and unnecessary repetition or redundancy is also avoided, thereby greatly reducing a quantity of times of transmitting the LSA in the fat-tree network, and reducing load of processing an LSU message by the router.

Figure 38:
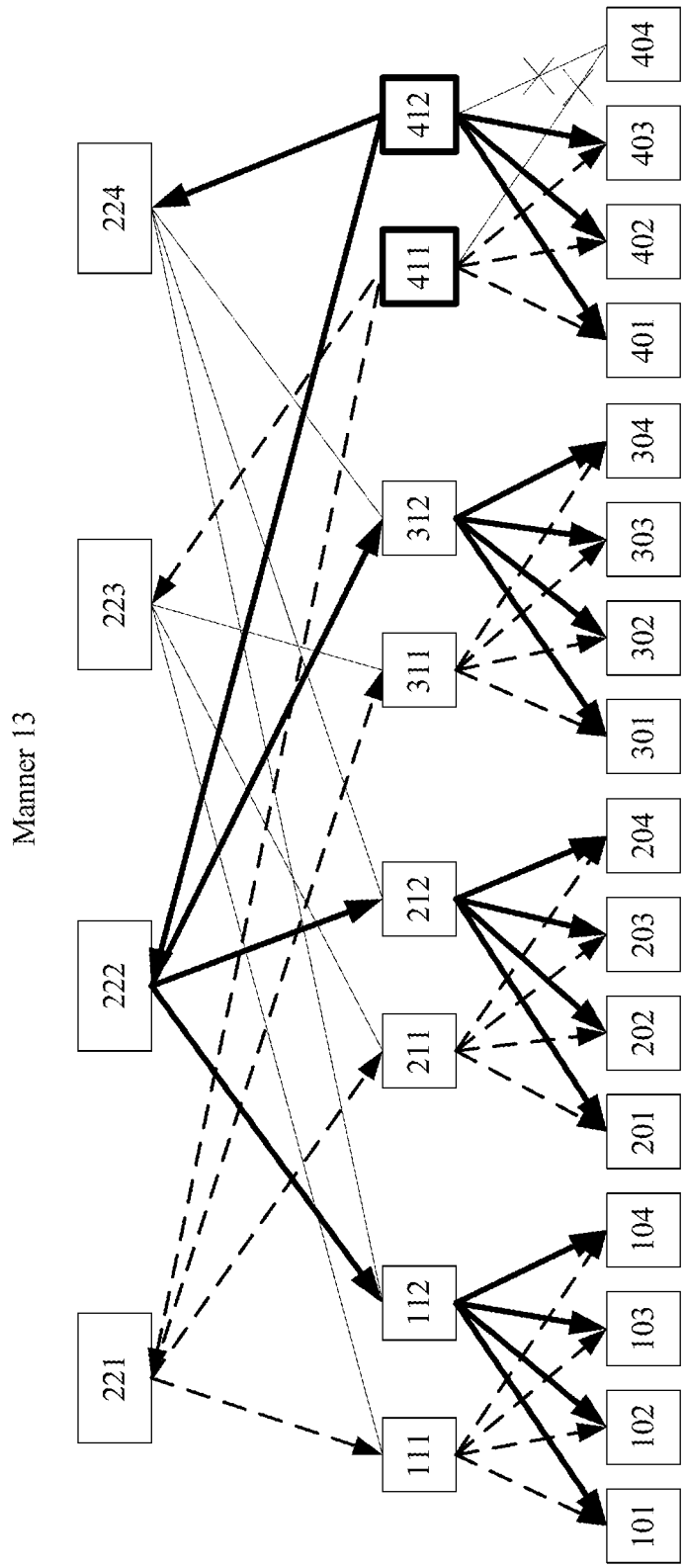
FIG. 38 is a schematic diagram of a process in which event LSA update is performed when a router at level_0 in a complete topology is faulty according to an embodiment of this application.
Figure 39A:
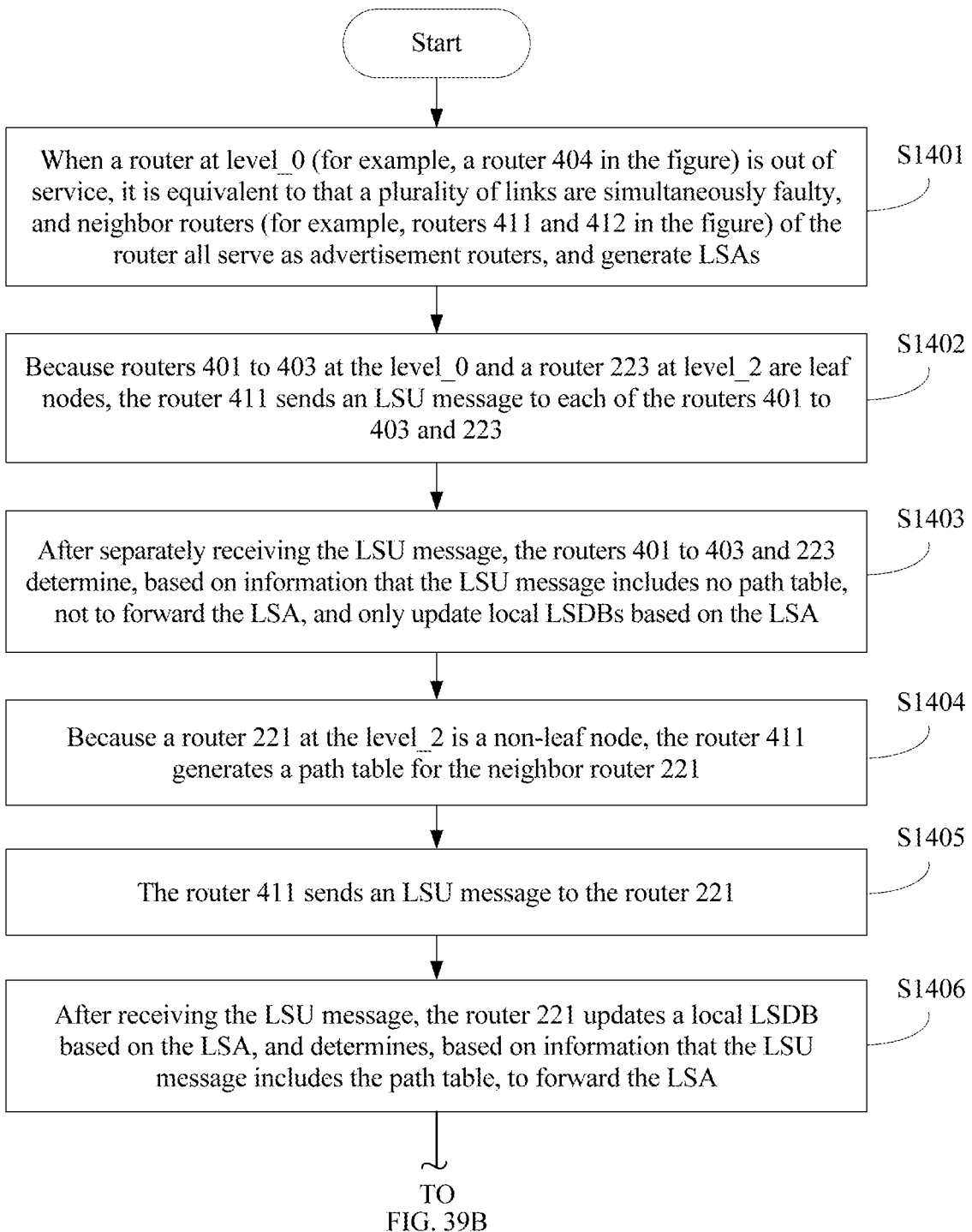
FIG. 39A and FIG. 39B are a twentieth schematic flowchart of an LSA sending method according to an embodiment of this application.
Figure 39B:
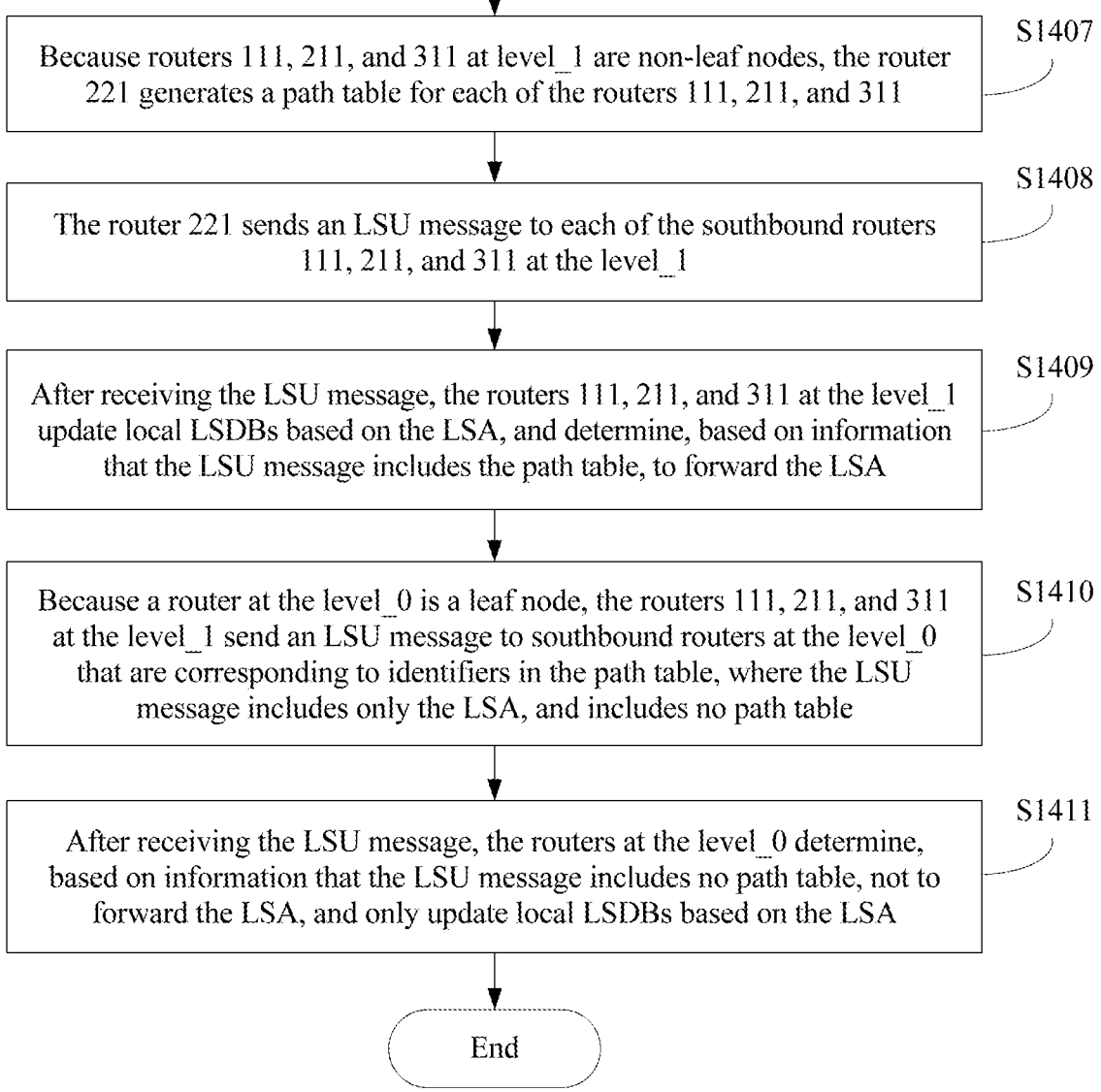

Manner 13: FIG. 38 is a schematic diagram of a process in which event LSA update is performed when a router at level_0 in a complete topology is faulty. As shown in FIG. 39A and FIG. 39B, the LSA sending method may include the following steps.

S1401. When a router at level_0 (for example, a router 404 in the figure) is out of service, it is equivalent to that a plurality of links are simultaneously faulty, and neighbor routers (for example, routers 411 and 412 in the figure) of the router all serve as advertisement routers, and generate LSAs.

For a processing process of the router 412, refer to the descriptions in step S1001 to S1011, and details are not described herein again. A processing process only of the router 411 is described below.

The LSA generated by the router 411 includes an identifier of the router 411 and identifiers of routers 221, 223, and 401 to 403. The LSA may further include level location information of the router 411 and level location information of the routers 221, 223, and 401 to 403.

The router 221 is equivalent to the router 223, and therefore one of the routers 221 and 223 may be selected as a leaf node, and the other serves as a non-leaf node.

S1402. Because routers 401 to 403 at the level_0 and a router 223 at level_2 are leaf nodes, the router 411 sends an LSU message to each of the routers 401 to 403 and 223, where the LSU message includes only the LSA, and includes no path table.

In this case, the router 411 is corresponding to the first router in step S107, and the router 223 at the level_2 and the routers 401 to 403 at the level_0 are corresponding to the second router in step S107.

S1403. After separately receiving the LSU message, the routers 401 to 403 and 223 determine, based on information that the LSU message includes no path table, not to forward the LSA, and only update local LSDBs based on the LSA.

In this case, the router 223 at the level_2 and the routers 401 to 403 at the level_0 are corresponding to the second router in step S108 and step S109.

S1404. Because a router 221 at the level_2 is a non-leaf node, the router 411 generates a path table for the neighbor router 221.

For example, the router 411 needs to generate the path table with reference to information that the router 411 is located at the level_1, the router 221 is located at the level_2, and routers 111, 211, and 311 are located at the level_1. The path table includes identifiers of the routers 111, 211, and 311.

In this case, the router 411 at the level_1 is corresponding to the first router in step S102, the router 221 at the level_2 is corresponding to the second router in step S102, and the routers 111, 211, and 311 at the level_1 are corresponding to the third router in step S102.

S1405. The router 411 sends an LSU message to the router 221, where the LSU message includes the LSA and the path table.

By using the path table, the router 411 instructs the router 221 to further send the received LSA to the southbound neighbor routers 111, 211, and 311 at the level_1 that are of the router 221.

In this case, the router 411 at the level_1 is corresponding to the first router in step S103, and the router 221 at the level_2 is corresponding to the second router in step S103.

S1406. After receiving the LSU message, the router 221 updates a local LSDB based on the LSA, and determines, based on information that the LSU message includes the path table, to forward the LSA.

In this case, the router 221 at the level_2 is corresponding to the second router in step S104 and step S105.

S1407. Because routers 111, 211, and 311 at level_1 are non-leaf nodes, the router 221 generates a path table for each of the routers 111, 211, and 311.

For example, for a path table generated for the router 111, the router 221 needs to generate the path table with reference to information that the router 221 is located at the level_2, the router 111 is located at the level_1, and routers 101 to 104 are located at the level_0. The path table includes identifiers of the routers 101 to 104. A method for generating a path table for another neighbor router is similar to this, and details are not described again.

In this case, the router 221 at the level_2 is corresponding to the first router in step S102, the routers 111, 211, and 311 at the level_1 are corresponding to the second router in step S102, and the routers at the level_0 are corresponding to the third router in step S102.

S1408. The router 221 sends an LSU message to each of the southbound routers 111, 211, and 311 at the level_1, where the LSU message includes the LSA and the path table generated for each of the neighbor routers 111, 211, and 311.

In this case, the router 221 at the level_2 is corresponding to the first router in step S103, and the routers 111, 211, and 311 at the level_1 are corresponding to the second router in step S103.

S1409. After receiving the LSU message, the routers 111, 211, and 311 at the level_1 update local LSDBs based on the LSA, and determine, based on information that the LSU message includes the path table, to forward the LSA.

In this case, the routers 111, 211, and 311 at the level_1 are corresponding to the second router in step S104 and step S105.

S1410. Because a router at the level_0 is a leaf node, the routers 111, 211, and 311 at the level_1 send an LSU message to southbound routers at the level_0 that are corresponding to identifiers in the path table, where the LSU message includes only the LSA, and includes no path table.

In this case, the routers 111, 211, and 311 at the level_1 are corresponding to the second router in step S106, and the routers at the level_0 are corresponding to the third router in step S106. Alternatively, the routers 111, 211, and 311 at the level_1 are corresponding to the first router in step S107, and the routers at the level_0 are corresponding to the second router in step S107.

S1411. After receiving the LSU message, the routers at the level_0 determine, based on information that the LSU message includes no path table, not to forward the LSA, and only update local LSDBs based on the LSA.

In this case, the routers at the level_0 are corresponding to the second router in S108 and S109.

Technical effects in Manner 13 are as follows:

It is ensured that a router at the level_0 knows a case that a router is out of service, so as to obtain, through calculation/refreshment based on a latest topology, a path to a router at the level_0 that is affected by the fault.

In this embodiment, necessary update, in a network, of the LSA generated by each of the routers 411 and 412 at the level_1 that are associated with the fault is ensured, and unnecessary repetition or redundancy is also avoided, thereby greatly reducing a quantity of times of transmitting the LSA in the fat-tree network, and reducing load of processing an LSU message by the router.

An embodiment of this application provides a router, configured to perform the foregoing method. In this embodiment of this application, a terminal device may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that the module division in this embodiment of this application is an example and is only logical function division. There may be other division in actual implementation.

Figure 40:
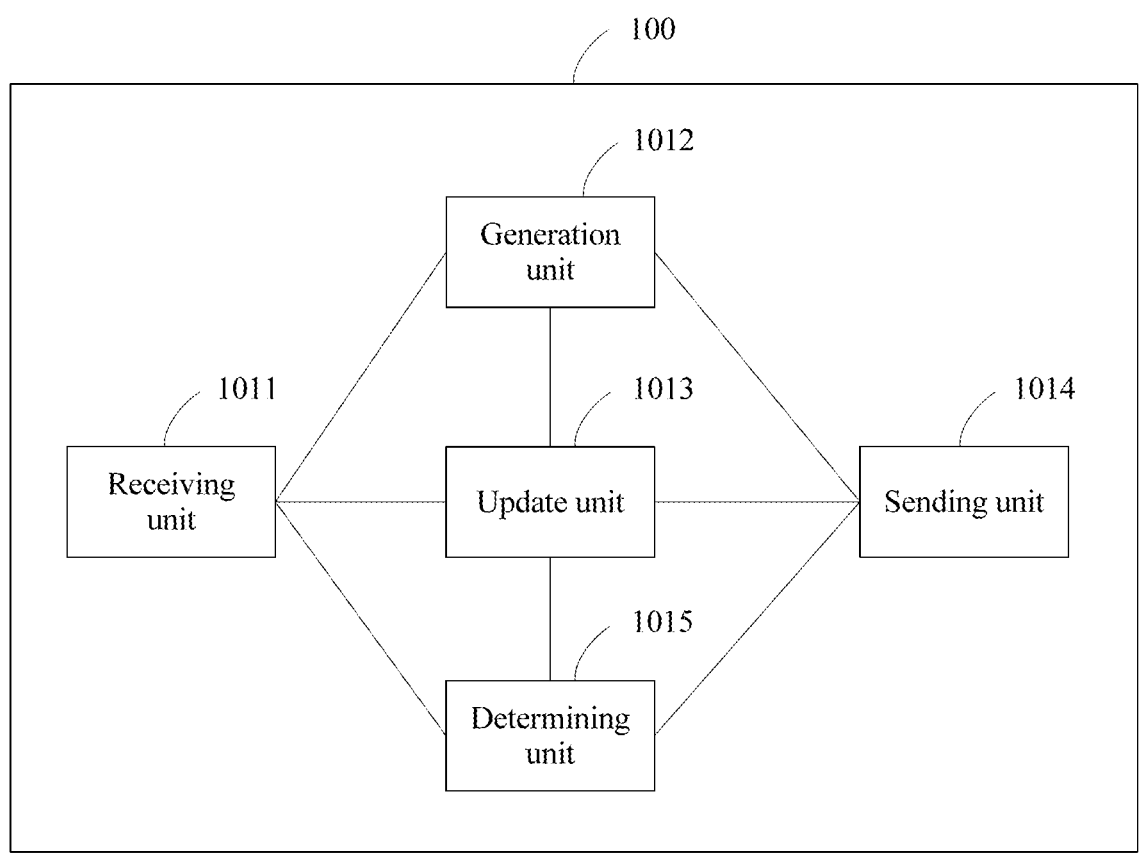
FIG. 40 is a first schematic structural diagram of a router according to an embodiment of this application.

When each function module is obtained through division based on each corresponding function, FIG. 40 is a possible schematic structural diagram of the router in the foregoing embodiment. The router 100 includes a receiving unit ion, a generation unit 1012, an update unit 1013, a sending unit 1014, and a determining unit 1015. The receiving unit ion is configured to support the router 100 in performing the processes S104 and S108 in FIG. 3, the processes S104, S108, and S121 in FIG. 6, the processes S104, S108, and S121 in FIG. 7, the processes S104 and S108 in FIG. 8A and FIG. 8B, the processes S104, S108, S162, and S164 in FIG. 10A and FIG. 10B, the processes S104 and S108 in FIG. 12, the processes S104, S108, and S181 in FIG. 13A and FIG. 13B, the processes S204 and S206 in FIG. 15, the processes S304 and S306 in FIG. 17, the processes S403, S406, S409, and S411 in FIG. 19A and FIG. 19B, the processes S503, S506, S509, and S511 in FIG. 21A and FIG. 21B, the processes S604, S606, S609, S612, and S614 in FIG. 23A and FIG. 23B, the processes S704, S706, S709, S712, and S714 in FIG. 25A and FIG. 25B, the processes S803, S806, and S808 in FIG. 27, the processes S903, S906, and S908 in FIG. 29, the processes S1003, S1006, S1009, and S1011 in FIG. 31A and FIG. 31B, the processes S1103, Snob, S1109, and S1111 in FIG. 33A and FIG. 33B, the process S1203 in FIG. 35, the process S1304 in FIG. 37, and the processes S1403, S1406, S1409, and S1411 in FIG. 39A and FIG. 39B. The generation unit 1012 is configured to support the router 100 in performing the process S102 in FIG. 3, the process S102 in FIG. 6, the process S102 in FIG. 7, the processes S102 and S151 in FIG. 8A and FIG. 8B, the process S102 in FIG. 10A and FIG. 10B, the process S102 in FIG. 12, the processes S102 and S151 in FIG. 13A and FIG. 13B, the processes S201 and S202 in FIG. 15, the processes S301 and S302 in FIG. 17, the processes S401, S404, and S407 in FIG. 19A and FIG. 19B, the processes S501, S504, and S507 in FIG. 21A and FIG. 21B, the processes S601, S602, S607, and S610 in FIG. 23A and FIG. 23B, the processes S701, S702, S707, and S710 in FIG. 25A and FIG. 25B, the processes S801 and S804 in FIG. 27, the processes S901 and S904 in FIG. 29, the processes Slow, S1004, and S1007 in FIG. 31A and FIG. 31B, the processes S1101, S1104, and S1107 in FIG. 33A and FIG. 33B, the process S1201 in FIG. 35, the processes S1301 and S1302 in FIG. 37, and the processes S1401, S1404, and S1407 in FIG. 39A and FIG. 39B. The update unit 1013 is configured to support the router 100 in performing the processes S105 and S109 in FIG. 3, the processes S105, S109, and S122 in FIG. 6, the processes S105, S109, and S122 in FIG. 7, the processes S105 and S109 in FIG. 8, the processes S105 and S109 in FIG. 10A and FIG. 10B, the processes S105 and S109 in FIG. 12, the processes S105 and S109 in FIG. 13A and FIG. 13B, the processes S204 and S206 in FIG. 15, the processes S304 and S306 in FIG. 17, the processes S403, S406, S409, and S411 in FIG. 19A and FIG. 19B, the processes S503, S506, S509, and S511 in FIG. 21A and FIG. 21B, the processes S604, S606, S609, S612, and S614 in FIG. 23A and FIG. 23B, the processes S704, S706, S709, S712, and S714 in FIG. 25A and FIG. 25B, the processes S803, S806, and S808 in FIG. 27, the processes S903, S906, and S908 in FIG. 29, the processes S1003, S1006, S1009, and S1011 in FIG. 31A and FIG. 31B, the processes S1103, S1106, S1109, and S1111 in FIG. 33A and FIG. 33B, the process S1203 in FIG. 35, the process S1304 in FIG. 37, and the processes S1403, S1406, S1409, and S1411 in FIG. 39A and FIG. 39B. The sending unit 1014 is configured to support the router 100 in performing the processes S103, S106, and S107 in FIG. 3, the processes S103, S106, and S107 in FIG. 6, the processes S1031, S106, and S107 in FIG. 7, the processes S103, S1061, and S107 in FIG. 8A and FIG. 8B, the processes S103, S106, S161, and S163 in FIG. 10A and FIG. 10B, the processes S103, S106, S107, and S171 in FIG. 12, the processes S103 and S1061 in FIG. 13A and FIG. 13B, the processes S203 and S205 in FIG. 15, the processes S303 and S305 in FIG. 17, the processes S402, S405, S408, and S410 in FIG. 19A and FIG. 19B, the processes S502, S505, S508, and S510 in FIG. 21A and FIG. 21B, the processes S603, S605, S608, S611, and S613 in FIG. 23A and FIG. 23B, the processes S703, S705, S708, S711, and S713 in FIG. 25A and FIG. 25B, the processes S802, S805, and S807 in FIG. 27, the processes S902, S905, and S907 in FIG. 29, the processes S1002, S1005, S1008, and S1010 in FIG. 31A and FIG. 31B, the processes S1102, S1105, S1108, and S1110 in FIG. 33A and FIG. 33B, the process S1202 in FIG. 35, the process S1303 in FIG. 37, and the processes S1402, S1405, S1408, and S1410 in FIG. 39A and FIG. 39B. The determining unit 1015 is configured to support the router 100 in performing the process S101 in FIG. 3, the process S101 in FIG. 6, the process S101 in FIG. 7, the process S101 in FIG. 8A and FIG. 8B, the process S101 in FIG. 10A and FIG. 10B, the process S101 in FIG. 12, and the process S101 in FIG. 13A and FIG. 13B. All related content of the steps in the foregoing method embodiments may be cited in function descriptions of corresponding function modules. Details are not described herein again.

Figure 41:
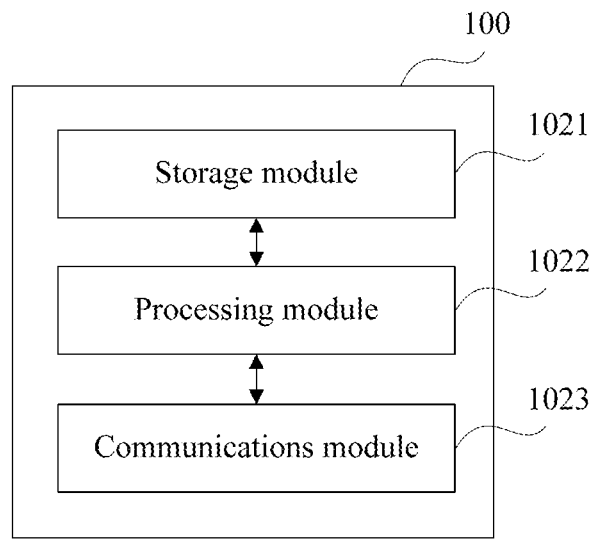
FIG. 41 is a second schematic structural diagram of a router according to an embodiment of this application.

When an integrated unit is used, FIG. 41 is a possible schematic structural diagram of the router in the foregoing embodiment. The router 100 includes a processing module 1022 and a communications module 1023. The processing module 1022 is configured to control and manage an action of the router 100. For example, the processing module 1022 is configured to support the router 100 in performing functions of the foregoing generation unit, the update unit, and the determining unit. The communications module 1023 is configured to support the router in communicating with another entity, for example, communicating with the function module or network entity shown in FIG. 1. The router 100 may further include a storage module 1021, configured to store program code and data of the router.

The processing module 1022 may be a processor or a controller, for example, may be a central processing unit (CPU), a general-purpose processor, a digital signal processor (DSP), an application-specific integrated circuit (ASIC), a field programmable gate array (FPGA), another programmable logic device, a transistor logic device, a hardware component, or a combination thereof. The processing module may implement or execute various example logical blocks, modules, and circuits described with reference to content disclosed in this application. Alternatively, the processor may be a combination for implementing a computing function, for example, a combination of one or more microprocessors, or a combination of a DSP and a microprocessor. The communications module 1023 may be a transceiver, a transceiver circuit, a network interface, a communications interface, or the like. The storage module 1021 may be a memory.

Figure 42:
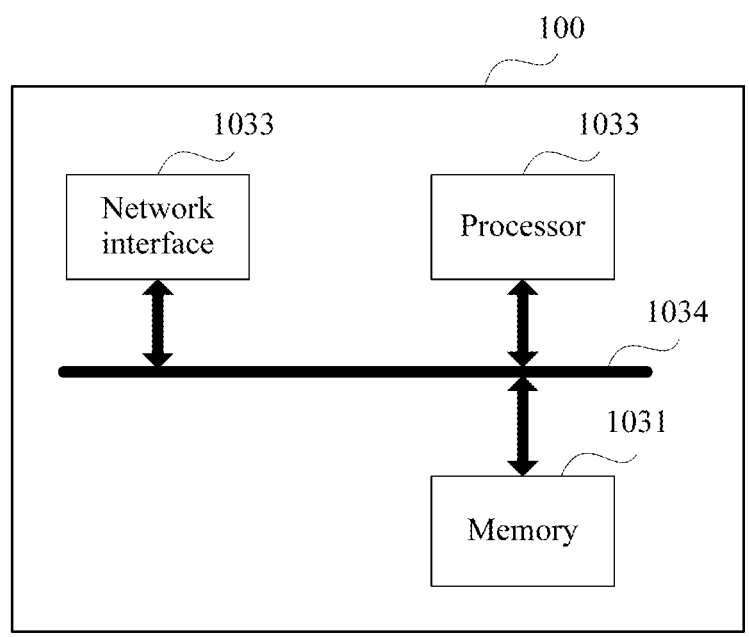
FIG. 42 is a third schematic structural diagram of a router according to an embodiment of this application.

Specifically, the processing module 1022 may be a processor 1032 in FIG. 42, the communications module 1023 may be a network interface 1033 in FIG. 42, and the storage module 1021 may be a memory 1031 in FIG. 42.

When the processing module 1022 is a processor, the communications module 1023 is a network interface, and the storage module 1021 is a memory, the router in this embodiment of this application may be a router 100 shown in FIG. 42.

As shown in FIG. 42, the router 100 includes the processor 1032, the network interface 1033, the memory 1031, and a bus 1034. The network interface 1033, the processor 1032, and the memory 1031 may be connected to each other by using the bus 1034. The bus 1034 may be a peripheral component interconnect bus, an extended industry standard architecture bus, or the like. The bus may be classified into an address bus, a data bus, a control bus, and the like. For ease of representation, only one thick line is used to represent the bus in the figure, but this does not mean that there is only one bus or only one type of bus.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for ease and brevity of description, for a detailed working process of the foregoing system, apparatus, and unit, refer to a corresponding process in the foregoing method embodiments, and details are not described herein again.

In the several embodiments provided in this application, it should be understood that the disclosed system, device, and method may be implemented in other manners. For example, the described device embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be implemented through some interfaces. The indirect couplings or communication connections between the devices or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements, to achieve the objectives of the solutions in the embodiments.

In addition, functional units in the embodiments of this application may be integrated into one processing unit, or each of the units may exist alone physically, or two or more units may be integrated into one unit.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining, by a first router, that a second router is a non-leaf node;
   generating, by the first router, a first link state update (LSU) message comprising a first link state advertisement (LSA) and a first path table, wherein:
   the first router generates the first LSU message to include the first path table, in response to the first router determining that the second router is a non-leaf node;
   the first router generates the first path table based on level location information of the first router, level location information of the second router, and level location information of a third router;
   the second router is a neighbor router of the first router that has a valid link with the first router, the third router is a neighbor router of the second router and has a valid link with the second router, and the third router is a different router than the first router; and
   the first path table comprises an identifier of the third router, the identifier of the third router being usable to instruct to send the first LSA to the third router, the first LSA comprising information of a valid link between an advertisement router and a neighbor router of the advertisement router, the advertisement router being a router that generates an LSA when a link state changes or a link state is periodically updated; and
   sending, by the first router, the first LSU message to the second router; and
   determining, by the first router, that a fourth router is a leaf node, the fourth router being a neighbor router of the first router that has a valid link with the first router, the fourth router being a different router than the second router;
   generating, by the first router, a second LSU message comprising the first LSA but not the first path table, in response to the first router determining that the fourth router is a leaf node; and
   sending, by the first router, the second LSU message to the fourth router.

2. The method according to claim 1, further comprising:
   receiving, by the first router, a third LSU message from a fifth router, wherein the third LSU message comprises the first LSA, the fifth router is a neighbor router of the first router and has a valid link with the first router, and the fifth router is a different router than the second router and the fourth router; and
   updating, by the first router, a link state database (LSDB) of the first router based on the first LSA.

3. The method according to claim 2, wherein sending, by the first router, the first LSU message to the second router comprises:
   in response to the third LSU message further comprising a second path table, sending, by the first router, the first LSU message to the second router, wherein the second path table comprises an identifier of the second router, and the identifier of the second router in the second path table is usable to instruct to send the first LSA to the second router.

4. The method according to claim 1, wherein the first router is the advertisement router.

5. The method according to claim 1, wherein the first LSA comprises level location information of the advertisement router or level location information of the neighbor router of the advertisement router, and the neighbor router of the advertisement router has a valid link with the advertisement router.

6. The method according to claim 1, wherein before generating, by the first router, the first LSU message that comprises the first path table, the method further comprises:
   receiving, by the first router, a second LSA from the second router, wherein the second LSA comprises the level location information of the second router or the level location information of the third router.

7. The method according to claim 1, wherein before generating, by the first router, the first LSU message that comprises the first path table, the method further comprises:
   sending, by the first router, a first Open Shortest Path First (OSPF) negotiation message to the second router; and
   receiving, by the first router, a second OSPF negotiation message from the second router, wherein the first OSPF negotiation message comprises the level location information of the first router, the second OSPF negotiation message comprises the level location information of the second router, and the first OSPF negotiation message and the second OSPF negotiation message are usable to establish and maintain a neighbor relationship between the first router and the second router.

8. A first router, comprising:
a non-transitory memory storing executable instructions; and
a processor coupled to the non-transitory memory to execute the instructions, the instructions including instructions to:
  determine that a second router is a non-leaf node;
  generate a first link state update (LSU) message comprising a first link state advertisement (LSA) and a first path table, wherein:
    the first LSU message includes the first path table, in response to a determination that the second router is a non-leaf node;
    the first path table is generated based on level location information of the first router, level location information of the second router, and level location information of a third router;
    the second router is a neighbor router of the first router and has a valid link with the first router, the third router is a neighbor router of the second router and has a valid link with the second router, and the third router is a different router than the first router; and
    the first path table comprises an identifier of the third router, the identifier of the third router in the first path table being usable to instruct to send the first LSA to the third router, the first LSA comprises a valid link between an advertisement router and a neighbor router of the advertisement router, and the advertisement router generates an LSA when a link state changes or a link state is periodically updated; and
  send the first LSU message to the second router; and
  determine that a fourth router is a leaf node, the fourth router being a neighbor router of the first router that has a valid link with the first router, the fourth router being a different router than the second router;
  generate a second LSU message comprising the first LSA but not the first path table, in response to a determination that the fourth router is a leaf node; and
  send the second LSU message to the fourth router.

9. The first router according to claim 8, wherein the instructions further include instructions to:
  receive a third LSU message from a fifth router, wherein the third LSU message comprises the first LSA, and the fifth router is a neighbor router of the first router and has a valid link with the first router, and the fifth router is a different router than the second router and the fourth router; and
  update a link state database (LSDB) of the first router based on the first LSA.

10. The first router according to claim 9, wherein the instructions further include instructions to:
  when the third LSU message further comprises a second path table, send the first LSU message to the second router, wherein the second path table comprises an identifier of the second router, and the identifier in the second path table is usable to instruct to send the first LSA to the second router.

11. The first router according to claim 8, wherein the first LSA comprises level location information of the advertisement router or level location information of the neighbor router of the advertisement router that has the valid link with the advertisement router.

12. The first router according to claim 8, wherein the instructions further include instructions to:
  receive a second LSA from the second router before generating the first LSU message that comprises the first path table, wherein the second LSA comprises the level location information of the second router or the level location information of the third router.

13. The first router according to claim 8, wherein the instructions further include instructions to:
  send a first Open Shortest Path First (OSPF) negotiation message to the second router before generating the first LSU message that comprises first path table; and
  receive a second OSPF negotiation message from the second router, wherein the first OSPF negotiation message comprises the level location information of the first router, the second OSPF negotiation message comprises the level location information of the second router, and the first OSPF negotiation message and the second OSPF negotiation message are usable to establish and maintain a neighbor relationship between the first router and the second router.

* * * * *